United States Patent
Sharma et al.

(10) Patent No.: US 11,693,705 B2
(45) Date of Patent: *Jul. 4, 2023

(54) GREEN CLOUD COMPUTING RECOMMENDATION SYSTEM

(71) Applicant: Accenture Global Solutions Limited, Dublin (IE)

(72) Inventors: Vibhu Sharma, Bangalore (IN); Vikrant Kaulgud, Maharashtra (IN); Mainak Basu, Bangalore (IN); Sanjay Podder, Thane (IN); Kishore P. Durg, Bangalore (IN); Sundeep Singh, Haryana (IN); Rajan Dilavar Mithani, Maharashtra (IN); Akshay Kasera, New Delhi (IN); Swati Sharma, Bangalore (IN); Priyavanshi Pathania, Chandigarh (IN); Adam Patten Burden, Tampa, FL (US); Pavel Valerievich Ponomarev, San Mateo, FL (US); Peter Michael Lacy, Bucks (GB); Joshy Ravindran, Karnataka (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,065

(22) Filed: Feb. 4, 2022

(65) Prior Publication Data
US 2022/0156120 A1    May 19, 2022

Related U.S. Application Data

(63) Continuation of application No. 17/386,804, filed on Jul. 28, 2021.

(30) Foreign Application Priority Data

Jul. 30, 2020    (IN) .............................. 202011032612

(51) Int. Cl.
*G06F 9/46*    (2006.01)
*G06F 9/455*    (2018.01)
(Continued)

(52) U.S. Cl.
CPC .......... *G06F 9/5027* (2013.01); *G06F 9/5072* (2013.01); *G06F 9/5077* (2013.01);
(Continued)

(58) Field of Classification Search
CPC .... G06F 9/5027; G06F 9/5072; G06F 9/5077; G06F 11/3006; G06F 11/328; G06F 11/3433; G06F 2209/505
See application file for complete search history.

(56) References Cited

U.S. PATENT DOCUMENTS 8,447,569 B1    5/2013    Marwah et al.
8,548,863 B2    10/2013    Diwakar
(Continued)

FOREIGN PATENT DOCUMENTS

IN    201811017376    5/2018

OTHER PUBLICATIONS

Zhang, Jie ; Chowdhury, Souma ; Messac, Achille; A comprehensive measure of the energy resource: Wind power potential (WPP); 2014, vol. 86, p. 388-398.
(Continued)

*Primary Examiner* — Bradley A Teets
(74) *Attorney, Agent, or Firm* — Fish & Richardson P.C.

(57) ABSTRACT

Methods, systems, and apparatus, including computer programs encoded on computer storage media, for generating customized recommendations for environmentally-con-
(Continued)

scious cloud computing frameworks for replacing computing resources of existing datacenters. One of the methods involves receiving, through a user interface presented on a display of a computing device, data regarding a user's existing datacenter deployment and the user's preferences for the new cloud computing framework, generating one or more recommendations for environmentally-conscious cloud computing frameworks based on the received data, and presenting such recommendations through the user interface for the user's review and consideration.

18 Claims, 67 Drawing Sheets

(51) Int. Cl.
  *G06F 9/50* (2006.01)
  *G06F 11/30* (2006.01)
  *G06F 11/32* (2006.01)
  *G06F 11/34* (2006.01)
(52) U.S. Cl.
  CPC ........ *G06F 11/3006* (2013.01); *G06F 11/328* (2013.01); *G06F 11/3433* (2013.01); *G06F 2209/505* (2013.01)

(56) References Cited

U.S. PATENT DOCUMENTS

| | | | |
|---|---|---|---|
| 8,612,599 | B2 | 12/2013 | Tung et al. |
| 9,646,074 | B2 | 5/2017 | Weinstein et al. |
| 9,888,067 | B1 | 2/2018 | Yemini et al. |
| 10,346,775 | B1 | 7/2019 | Xu et al. |
| 10,346,784 | B1 | 7/2019 | Powell et al. |
| 10,552,586 | B1 | 2/2020 | Duan et al. |
| 10,671,509 | B1 | 6/2020 | Thompson et al. |
| 10,673,952 | B1 | 6/2020 | Cohen et al. |
| 11,019,138 | B2 | 5/2021 | Dailianas et al. |
| 11,050,677 | B2 | 6/2021 | Ghosh et al. |
| 11,481,257 | B2 | 10/2022 | Sharma et al. |
| 2002/0166117 | A1 | 11/2002 | Abrams et al. |
| 2006/0059253 | A1 | 3/2006 | Goodman et al. |
| 2006/0161884 | A1 | 7/2006 | Lubrecht et al. |
| 2006/0288303 | A1 | 12/2006 | Tachihara et al. |
| 2010/0191998 | A1 | 7/2010 | Moore |
| 2012/0198073 | A1 | 8/2012 | Srikanth et al. |
| 2013/0035973 | A1 | 2/2013 | Desai et al. |
| 2013/0185433 | A1 | 7/2013 | Zhu et al. |
| 2013/0185667 | A1 | 7/2013 | Harper et al. |
| 2014/0068335 | A1 | 3/2014 | Bromley et al. |
| 2014/0089495 | A1 | 3/2014 | Akolkar et al. |
| 2014/0173601 | A1 | 6/2014 | Talia et al. |
| 2014/0236680 | A1 | 8/2014 | Chen et al. |
| 2014/0303949 | A1 | 10/2014 | Boneti et al. |
| 2014/0337808 | A1 | 11/2014 | Armitage |
| 2015/0066598 | A1 | 3/2015 | Branch et al. |
| 2015/0095405 | A1 | 4/2015 | Sun |
| 2015/0178129 | A1 | 6/2015 | Dube et al. |
| 2016/0205202 | A1 | 7/2016 | Jia et al. |
| 2016/0224392 | A1 | 8/2016 | Clarke et al. |
| 2017/0178027 | A1 | 6/2017 | Duggan et al. |
| 2017/0286187 | A1 | 10/2017 | Chen et al. |
| 2017/0315902 | A1 | 11/2017 | Moretto et al. |
| 2018/0077083 | A1 | 3/2018 | Baughman et al. |
| 2018/0081730 | A1 | 3/2018 | Duttagupta et al. |
| 2018/0107696 | A1 | 4/2018 | Moscibroda et al. |
| 2018/0173567 | A1 | 6/2018 | Olshefski et al. |
| 2018/0302335 | A1 | 10/2018 | Gao et al. |
| 2018/0349797 | A1 | 12/2018 | Garvey et al. |
| 2018/0357047 | A1 | 12/2018 | Brown et al. |
| 2019/0056927 | A1* | 2/2019 | Sato ................ H04L 67/34 |
| 2019/0123973 | A1 | 4/2019 | Jeuk et al. |
| 2019/0155651 | A1 | 5/2019 | Di Cairano-Gilfedder et al. |
| 2019/0230156 | A1 | 7/2019 | McLarty et al. |
| 2020/0004591 | A1 | 1/2020 | Das et al. |
| 2020/0125973 | A1 | 4/2020 | Townend et al. |
| 2020/0310851 | A1 | 10/2020 | Featonby et al. |
| 2021/0027401 | A1 | 1/2021 | Hovhannisyan et al. |
| 2021/0081443 | A1 | 3/2021 | Cannon et al. |
| 2021/0160191 | A1 | 5/2021 | Ghosh et al. |
| 2021/0234885 | A1* | 7/2021 | Campbell ........... H04L 63/1466 |
| 2021/0328942 | A1 | 10/2021 | Ghosh et al. |
| 2022/0035674 | A1 | 2/2022 | Sharma et al. |
| 2022/0035680 | A1 | 2/2022 | Sharma et al. |

OTHER PUBLICATIONS

Brenner et al., "Environmentally Opportunistic Computing Transforming the Data Center for Economic and Environmental Sustainability," Presented at Proceedings of the IEEE International Conference on Green Computing, Aug. 15-18, 2010, Chicago, IL, USA, 6 pages.
EP Extended Search Report in European Appln. No. 20208723.5, dated Apr. 20, 2021, 12 pages.
IN Office Action in Indian Appln. No. 202014050632, dated Feb. 25, 2022, 6 pages.
PCT International Search Report and Written Opinion in International Appln. No. PCT/US2021/043477, dated Nov. 24, 2021, 8 pages.

* cited by examiner

FIG. 12A accenture

Home > Data Collection > Data Center Energy Profile

Retail Major • Overview • Climate Change • Help

3. Is your Client aware of the PUE (Power Utilization Effectiveness) of the Data Center? ⊙
   NO   ○ PUE
        ⊙

4. Does your Client know the UPS load of the Data Center? ⊙
   NO   ○ Total UPS ⊕ kw      ○ Non-IT load ⊕ kw
        lo...

5. Does your Client know the Energy generated on-sight for Data Center (Scope 1)? ⊙
   NO   ○ Diesel ⊕ gallons    ○ Fuel oil ⊕ gallons     ○ Propane ⊕ gallons
        ○ Renewable ⊕ MWhr    ○ Natural Gas ⊕ Therms   ○ Coal ⊕ Tons
          En...
        ○ Others ⊕ MWhr 6. Does your Client know the Distribution of the energy purchased (Scope-2) for the Data Center? ⊙
   NO   ○ Electricity ⊕ MWhr  ○ Steam ⊕ MWhr           ○ Heat ⊕ MWhr
        ○ Cooling ⊕ MWhr      ○ Renewable ⊕ MWhr
                                En...

7. Does your Client procure Carbon offsets for Client's Organization? ⊙
   NO   ○ Carbon ⊕ MTCO2 Eq   ○ Percentage ⊕ %
          offset...                    of...

FIG. 12B

FIG. 12C accenture

Home > Data Collection > Data Center Energy Profile

Retail Major | Overview | Climate Change | Help

Data Center Location | Data Center Energy Profile | Migration Preferences

Complete the following survey
Select the Data Center

■ Paris
FR-PR-DC-02

1. Does your Client know the Annual Energy Consumption of the Data Center?
   YES  NO 2. Does your Client know the Annual Energy Consumption of the Facility/Building that houses Data Center?
   ⊕ 1000  ⊕ MWhr
   ⊕ 85    ⊕ %

3. Is your Client aware of the PUE (Power Utilization Effectiveness) of the Data Center?
   YES  NO 4. Does your Client know the UPS load of the Data Center?

> Gold Coast AZ-GC...
> Paris FR-PR...
> New Delhi IN-ND...
> Boston US-MA...

FIG. 13A

FIG. 13B accenture

Home › Data Collection › Data Center Energy Profile | Retail Map | ⊙ Overview ⊙ Climate Change ⊙ Help Data Center Location | Data Center Energy Profile | Migration Preferences Complete the following survey
Select the Data Center ▇ Boston
US-MA-DC-04 ▸

○→ Gold Coast AZ-GC...
○→ Paris FR-PR...
○→ New Delhi IN-ND...
○→ Boston US-MA...

1. Does your Client know the Annual Energy Consumption of the Data Center? ⊙
   YES / NO 2. Does your Client know the Annual Energy Consumption of the Facility/Building that houses Data Center? ⊙
   YES / NO 3. Is your Client aware of the PUE (Power Utilization Effectiveness) of the Data Center? ⊙
   YES / NO 4. Does your Client know the UPS load of the Data Center? ⊙
   YES / NO 5. Does your Client know the Energy generated on-sight for Data Center (Scope 1)? ⊙
   ×NO  ⊖ Diesel ⊕ gallons  ⊖ Fuel oil ⊕ gallons  ⊖ Propane ⊕ gallons

FIG. 13C accenture

Home › Data Collection › Data Center Energy Profile | Retail Major | ⊙ Overview ⊙ Climate Change ⊙ Help Boston
US-MA...

2. Does your Client know the Annual Energy Consumption of the Facility/Building that houses Data Center? ⊙
   YES 3. Is your Client aware of the PUE (Power Utilization Effectiveness) of the Data Center? ⊙
   YES 4. Does your Client know the UPS load of the Data Center? ⊙
   YES 5. Does your Client know the Energy generated on-sight for Data Center (Scope 1)? ⊙
   NO   ⊕ Diesel gallons   ⊕ Fuel oil gallons   ⊕ Propane gallons
        ⊕ Renewable En... Mwhr   ⊕ Natural Gas Therms   ⊕ Cool Tons
        ⊕ Others Mwhr 6. Does your Client know the distribution of the energy purchased (Scope.2) for the Data Center? ⊙
   NO   ⊕ Electricity Mwhr   ⊕ Steam Mwhr   ⊕ Heat Mwhr
        ⊕ Cooling Mwhr   ⊕ Renewable En... Mwhr 7. Does your Client procure Carbon offsets for Client's Organization? ⊙
   YES

FIG. 13D accenture

Home › Data Collection › Data Center Energy Profile › Retail Major ⊚ Overview ⊚ Climate Change ⊚ Help 5. Does your Client know the Energy generated on-sight for Data Center (Scope 1)? ⊚
   - NO
   - ⊕ Diesel ⊕ gallons ⊕ Fuel oil ⊕ gallons ⊕ Propane ⊕ gallons
   - ⊕ Renewable En... ⊕ Mwhr ⊕ 1000 ⊕ Therms ⊕ Coal ⊕ Tons
   - ⊕ Others ⊕ Mwhr 6. Does your Client know the distribution of the energy purchased (Scope 2) for the Data Center? ⊚
   - NO
   - ⊕ 300 ⊕ Mwhr ⊕ Steam ⊕ Mwhr ⊕ Heat ⊕ Mwhr
   - ⊕ Cooling ⊕ Mwhr ⊕ 200 ⊕ Mwhr 7. Does your Client procure Carbon offsets for Client's Organization? ⊚
   - YES 8. Does your Client have a carbon price to drive investment decisions or create funds for low carbon Solutions? ⊚
   - YES Back    Proceed Next

> accenture
>
> Home> Data Collection> Migration Preferences
> Retail Major  •Overview  •Climate Change  •Help
>
> 3. What percentage of the Data Center is to be Migrated to Cloud?*
>    Cloud ⊖ 100 ⊕ %   Colocation ⊖ ⊕ %   Retiring ⊖ ⊕ %
>    Retaining ⊖ 0 ⊕ %
>
>    | Cloud | Colocation | Retiring |
>
> 4. Do you have any constraint of Cloud Server Location?
>    ⦿ Anywhere  ○ Specific country limits  ○ Within continental/regional limits
>
> 5. How long do you intend to take for complete Migration to Cloud?
>    ⊖ 100 ⊕ %   [1 ▾] Year
>
> Back                                                    Proceed Next accenture Home > Data Collection > Migration Preferences | Retail Major ⦿Overview ⦿Climate Change ⦿Help 2. Do you have any preference for a Cloud Service Provider? ⊕
   (YES) NO  Client's preferred cloud  CSP-A  CSP-B  CSP-C ✓ Boston US-MA...

3. What percentage of the Data Center is to be Migrated to Cloud?* ⊕
   CSP A ⊖ 100 ⊕ %   Colocation ⊖ _____ ⊕ %
   Retaining ⊖ 0 ⊕ %

| CSP-A | Colocation | Retiring |

4. Do you have any constraint of Cloud Server Location? ⊕
   ⦿ Anywhere   ○ Specific country limits   ○ Within continental/regional limits 5. How long do you intend to take for complete Migration to CSP A Cloud? ⊕  [ 2 ▾ ] Years
   ⊖ ——●—— 50 ⊕ %
   ⊖ ——●—— 50 ⊕ %

FIG. 14C

FIG. 14D accenture

Home > Data Collection > Migration Preferences        Retail Major  ⦿Overview ⊛Climate Change ⦿Help 3. What percentage of the Data Center is to be Migrated to Cloud?*

CSP A      ⊖ 100 ⊕ % Colocation ⊖ 0 ⊕ %   Retiring ⊖ ___ ⊕ %
Retaining  ⊖ 0   ⊕ %

| CSPA | Colocation | Retaining |

4. Do you have any constraint of CSP A Cloud Server Location?

○ Anywhere   ○ Specific country limits   ⦿ Within continental/regional limits

[India ▼]

5. How long do you intend to take for complete Migration to CSP A cloud?   1 ▾ Year

⊖ 100 ⊕ %

100
●
○
○
○
○
○
○
○
○
○
○
○

Back                                                                                Proceed Next

FIG. 14E

FIG. 15A accenture

Home > Data Collection > Migration Preferences   Retail Major ●Overview ⓘClimate Change ⓘHelp 3. What percentage of the Data Center is to be Migrated to Cloud?*ⓘ

CSP B ⓘ __100__ ⊕ %   Colocation ⓘ __0__ ⊕ %   Retiring ⓘ ____ ⊕ %

Retaining ⓘ __0__ %

| Cloud | Colocation | Retaining |

4. Do you have any constraint of CSP B Cloud Server Location? ⓘ

○ Anywhere   ○ Specific country limits   ● Within continental/regional limits

☐ Africa   ☐ Asia Pacific   ☐ Australia NewZealand   ☑ Europe
☐ Latin America   ☐ Middle East   ☐ North America 5. How long do you intend to take for complete Migration to Cloud? ⓘ   __1 ▾__ Year

⊖——●————————————○ __100__ ⊕ %
 100

( Back )   ( Proceed Next )

Home > Data Collection > Migration Preferences | Retail Major | Overview | Climate Change | Help accenture 3. What percentage of the Data Center is to be Migrated to Cloud?*
   Cloud  50  %   Colocation  20  %   Retiring  20  %
   Retiring  10  %

| Cloud | Colocation | Retiring |

4. Do you have any constraint of Colocation?
   ○ Anywhere  ● Specific country limits  ○ Within continental/regional limits
   USA 5. How long do you intend to take for complete Migration to Colocation?
   1 ▼ Year    20  %
   20

6. Are you aware of efficiency gains from the Colocation setup?
   YES  NO

```
                                                    ┌─ 4100
4110 ─┐
┌──────────────────────────────────────────────────┐
│  Receive a First Set of Data Indicating One or    │
│  more Characteristics of an Existing Datacenter   │
└──────────────────────────────────────────────────┘
                        │
4120 ─┐                 ▼
┌──────────────────────────────────────────────────┐
│  Receive a Second Set of Data Indicating One or   │
│  more Preferred Characteristics of a Cloud        │
│  Computing Framework for Replacing Computing      │
│  Resources of the Existing Datacenter             │
└──────────────────────────────────────────────────┘
                        │
4130 ─┐                 ▼
┌──────────────────────────────────────────────────┐
│  Determine a First Set of One or more Measures    │
│  for the Existing Datacenter Based on the First   │
│  Set of Data                                      │
└──────────────────────────────────────────────────┘
                        │
4140 ─┐                 ▼
┌──────────────────────────────────────────────────┐
│  Identify One or more Candidate Cloud Computing   │
│  Frameworks for Replacing the Computing           │
│  Resources of the Existing Datacenter Based on    │
│  the Second Set of Data                           │
└──────────────────────────────────────────────────┘
                        │
4150 ─┐                 ▼
┌──────────────────────────────────────────────────┐
│  Determine a Second Set One or more Measures for  │
│  Each Candidate Cloud Computing Framework         │
│  Identified Based on the First and Second Sets    │
│  of Data                                          │
└──────────────────────────────────────────────────┘
                        │
4160 ─┐                 ▼
┌──────────────────────────────────────────────────┐
│  Present Data Indicating At Least a Portion of    │
│  the First Set of One or more Measures, Data      │
│  Identifying the One or more Candidate Cloud      │
│  Computing Frameworks, and Data Indicating At     │
│  Least a Portion of the Second Set of One or      │
│  more Measures                                    │
└──────────────────────────────────────────────────┘
```

4210
Receive Data Representing an Existing Datacenter Including a First Set of One or more Measures Including a First Measure of Environmental Sustainability Associated with the Existing Datacenter

4220
Receive Data Representing a Plurality of Candidate Cloud Computing Frameworks for Replacing Computing Resources of the Existing Datacenter Including a Second Set of One or more Measures Including a Second Measure of Environmental Sustainability Associated with Each of the Plurality of Candidate Computing Frameworks

4230
Determine, from the Plurality of Candidate Cloud Computing Frameworks for Replacing Computing Resources of the Existing Datacenter, a Subset of Candidate Cloud Computing Frameworks for Presentation in a User Interface

4240
Generate, for Presentation in the User Interface, a Visualization of the Existing Datacenter and the Subset of Candidate Cloud Computing Frameworks and a Dashboard with one or More Graphical Representations of the First Set and the Second Set of One or more Measures

4260
Provide, for Presentation Through the User Interface, the Visualization and the Dashboard

FIG. 40

GREEN CLOUD COMPUTING RECOMMENDATION SYSTEM

CROSS-REFERENCE TO RELATED APPLICATION

This application is a continuation of U.S. application Ser. No. 17/386,804, filed Jul. 28, 2021, now allowed, which claims the benefit to India Patent Application No. 202011032612, filed Jul. 30, 2020. The complete disclosures of all of the above patent applications are hereby incorporated by reference in their entirety for all purposes.

TECHNICAL FIELD

This specification relates to cloud computing technologies.

BACKGROUND

Migrating to cloud computing technologies is typically a manual and effort intensive process. There are various objectives and concerns which affect the decisions regarding choosing a particular cloud provider (or a particular mix of providers) over others and which available locations of the same to prefer over the others. Thus, as cloud computing technologies become more ubiquitous, businesses are confronted with a growing number of complex decisions regarding how to best migrate existing computing resources to the cloud.

SUMMARY

This specification describes technologies for generating customized recommendations for environmentally-conscious cloud computing frameworks for replacing computing resources of existing datacenters. Businesses typically have a variety of concerns when migrating to cloud services/storage. While businesses typically have a variety of concerns when migrating to cloud services/storage concerning cost, and technology, sustainability is rapidly becoming an important concern. The technologies described in this specification are geared toward addressing this concern by revealing the sustainability benefits of various different cloud computing frameworks and migration strategies to users in a simple yet effective manner. These technologies generally involve receiving, through a user interface presented on a display of a computing device, data regarding a user's existing datacenter deployment and the user's preferences for the new cloud computing framework, generating one or more recommendations for environmentally-conscious cloud computing frameworks based on the received data, and presenting such recommendations through the user interface for the user's review and consideration. In addition, these technologies may also enable the user to experiment with and explore the details and benefits of various different cloud computing frameworks and migrations strategies through use of a simulation toolkit.

In general, one innovative aspect of the subject matter described in this specification can be embodied in methods that include the actions of receiving, through a user interface, (i) a first set of data indicating one or more characteristics of an existing datacenter, and (ii) a second set of data indicating one or more preferred characteristics of a cloud computing framework for replacing computing resources of the existing datacenter, determining a first set of one or more measures for the existing datacenter based at least in part on the first set of data, the first set of one or more measures including a measure of environmental sustainability associated with the existing datacenter, identifying, from among a plurality of different cloud computing frameworks, one or more candidate cloud computing frameworks for replacing computing resources of the existing datacenter based at least in part on the second set of data. For each of the one or more candidate cloud computing frameworks identified, determining a second set of one or more measures for the respective candidate cloud computing framework based at least in part on the first and second sets of data, the second set of one or more measures including a measure of environmental sustainability associated with the respective candidate cloud computing framework, and presenting, through the user interface, data indicating at least a portion of the first set of one or more measures determined for the existing datacenter, data identifying one or more characteristics of each of the one or more candidate cloud computing frameworks, and data indicating at least a portion of the second set of one or more measures determined for each of the one or more candidate cloud computing frameworks.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

In some implementations, the first set of data includes data indicating a location of the existing datacenter, a rate at which the existing datacenter consumes energy, a rate at which a facility or building that houses the existing datacenter consumes energy, a Power Utilization Effectiveness (PUE) of the existing datacenter, an uninterruptible power source (UPS) load of the existing datacenter, an amount of energy generated onsite for the existing datacenter, a distribution of energy purchased for the existing datacenter, carbon offsets procured for the existing datacenter or an organization associated with the existing datacenter, contractual or financial agreements for purchasing green power for the existing datacenter, or a combination thereof.

In some implementations, the second set of data includes data indicating a preferred location of the cloud computing framework, a preferred cloud service provider (CSP) for the cloud computing framework, a preferred quantity of computing resources of the existing datacenter that are to be replaced by the cloud computing framework, a preferred amount of time to migrate from the computing resources of the existing datacenter to the cloud computing framework, or a combination thereof.

In some implementations, the methods further include presenting, through the user interface, an interactive user interface comprising a plurality of questions and a plurality of user input elements for receiving answers to the plurality of questions, wherein the first and second sets of data comprise data indicating one or more answers received through one or more of the user input elements, respectively.

In some implementations, the methods further include determining, based on the first set of data, that answers were received for a particular number of questions, and selecting, from among a plurality of mathematical models, a particular mathematical model based on the particular number of questions for which answers were received, Identifying the one or more candidate cloud computing frameworks and determining the second set of one or more measures for each of the one or more candidate cloud computing frameworks identified can include using the particular mathematical model to identify one or more candidate cloud computing frameworks for replacing the computing resources of the existing datacenter, and using the particular mathematical model to determine a second set of one or more measures for each candidate cloud computing framework identified.

In some implementations, identifying one or more candidate cloud computing frameworks for replacing the computing resources of the existing datacenter based at least in part on the second set of data includes identifying a plurality of candidate cloud computing frameworks for replacing the computing resources of the existing datacenter based at least in part on the second set of data.

In some implementations, the methods further include ranking the plurality of candidate cloud computing frameworks based at least in part on the second set of one or more measures determined for each candidate cloud computing framework.

In some implementations, the methods further include selecting, from among the plurality of candidate cloud computing frameworks identified, a set of one or more of the plurality of the cloud computing frameworks based on the ranking, wherein presenting, through the user interface, data identifying the one or more characteristics of each of the one or more identified candidate cloud computing frameworks and data indicating at least a portion of the second set of one or more measures determined for each candidate cloud computing framework includes presenting, through the user interface, data identifying one or more characteristics of each of the selected set of one or more of the plurality of candidate cloud computing frameworks and data indicating at least a portion of the second set of one or more measures determined for each candidate cloud computing framework in the selected set of one or more of the plurality of candidate cloud computing frameworks.

In some implementations, presenting, through the user interface, data identifying the one or more characteristics of each of the selected set of one or more of the plurality of candidate cloud computing frameworks includes presenting, through the user interface, data identifying the one or more characteristics of each of the selected set of one or more of the plurality of candidate cloud computing frameworks in an order based on ranking.

In some implementations, presenting, through the user interface, data identifying the one or more characteristics of each of the one or more candidate cloud computing frameworks includes presenting, through the user interface, data identifying the one or more characteristics of each of the plurality of candidate cloud computing frameworks in an order based on ranking.

In some implementations, presenting the plurality of candidate cloud computing frameworks identified include a first candidate cloud computing framework that is associated with a first cloud service provider (CSP) and a second candidate cloud computing framework that is associated with a second CSP, the second CSP being different from the first CSP.

In some implementations, the methods further include, for each of the one or more candidate cloud computing frameworks identified: computing a quantitative difference between the measure of environmental sustainability associated with the existing datacenter and the measure of environmental sustainability associated with the respective candidate cloud computing framework, and presenting, through the user interface, data indicating the computed quantitative difference.

In some implementations, the methods further include, for each of one or more measures included in the second set of one or more measures determined for each of the one or more candidate cloud computing frameworks identified: computing a quantitative difference between the respective measure included in the second set of one or more measures determined for the respective candidate cloud computing framework and a corresponding measure in the first set of one or more measures determined for the existing datacenter, and where presenting, through the user interface, data indicating at least a portion of the first set of one or more measures determined for the existing datacenter and data indicating at least a portion of the second set of one or more measures determined for each candidate cloud computing framework identified includes presenting, through the user interface, data indicating the computed quantitative differences between one or more measures included in the second set of one or more measures and one or more corresponding measures included in the first set of one or more measures, respectively.

In some implementations, the first set of one or more measures determined for the existing datacenter further includes one or more measures of energy consumption associated with operating the existing datacenter, one or more measures of carbon emissions associated with operating the existing datacenter, one or more costs associated with operating the existing datacenter, or a combination thereof.

In some implementations, the second set of one or more measures determined for each candidate cloud computing framework identified further includes one or more measures of energy consumption associated with operating the respective candidate cloud computing framework, one or more measures of carbon emissions associated with operating the respective candidate cloud computing framework, one or more costs associated with operating the respective candidate cloud computing framework, or a combination thereof.

In some implementations, the methods further include identifying, based on the first set of data, an additional set of data associated with a location of the existing datacenter, wherein determining the first set of one or more measures for the existing datacenter based at least in part on the first set of data includes determining a first set of one or more measures for the existing datacenter based at least in part on the first set of data and further on the additional set of data associated with the location of existing datacenter.

In some implementations, the additional set of data associated with the location of existing datacenter includes data indicating one or more economic incentive programs for reducing carbon emissions for which the existing datacenter is eligible, carbon taxes associated with the location of the existing datacenter, current emission factors of the location of the existing datacenter, future greenness aspirations of one or more governing bodies associated with the location of the existing datacenter, a level of readiness of one or more governing bodies associated with the location of the existing datacenter to transition to green energy, or a combination thereof.

In some implementations, determining the second set of one or more measures for each candidate cloud computing framework identified based at least in part on the first and second sets of data includes determining a second set of one or more measures for each candidate cloud computing framework identified based at least in part on the first and second sets of data and further on an additional set of data associated with the respective candidate cloud computing framework, the additional set of data associated with the respective candidate cloud computing framework including data indicating one or more economic incentive programs for reducing carbon emissions for which the respective candidate cloud computing framework is eligible, carbon taxes associated with a location of the respective candidate cloud computing framework, current emission factors of the location of the respective candidate cloud computing framework, future greenness aspirations of one or more governing bodies associated with the location of the respective candidate cloud computing framework, a level of readiness of one or more governing bodies associated with the location of the respective candidate cloud computing framework to transition to green energy, a level of sustainability associated with a cloud service provider (CSP) associated with the respective candidate cloud computing framework, or a combination thereof.

In some implementations, presenting, through the user interface, data indicating the computed quantitative differences between one or more measures included in the second set of one or more measures and one or more corresponding measures included in the first set of one or more measures, respectively, includes: for each of the one or more candidate cloud computing frameworks identified, presenting, through the user interface, data indicating one or more of an estimated reduction in energy consumption achievable by replacing the computing resources of the existing datacenter with the respective candidate cloud computing framework, an estimated reduction in carbon emissions achievable by replacing the computing resources of the existing datacenter with the respective candidate cloud computing framework, and an estimated reduction in operating costs achievable by replacing the computing resources of the existing datacenter with the respective candidate cloud computing framework.

In general, another innovative aspect of the subject matter described in this specification can be embodied in methods that include the actions of receiving data representing an existing datacenter including a first set of one or more measures including a first measure of environmental sustainability associated with the existing datacenter based in part on a first set of data indicating one or more characteristics of an existing datacenter, receiving data representing a plurality of candidate cloud computing frameworks for replacing computing resources of the existing datacenter including a second set of one or more measures including a second measure of environmental sustainability associated with each of the plurality of candidate cloud computing frameworks based on a second set of data indicating one or more preferred characteristics of a cloud computing framework for replacing computing resources of the existing datacenter, determining, from the plurality of candidate cloud computing frameworks for replacing computing resources of the existing datacenter, a subset of candidate cloud computing frameworks for presentation in a user interface, generating, for presentation in the user interface, a visualization of the existing datacenter and the subset of candidate cloud computing frameworks and a dashboard with one or more graphical representations of the first set of one or more measures and the respective second set of one or more measures determined for each of the subset of candidate cloud computing frameworks, and presenting, through the user interface, the visualization of the existing datacenter and each of the subset of candidate cloud computing frameworks and the dashboard with one or more graphical representations of the first set of one or more measures and the respective second set of one or more measures determined for each of the subset of candidate cloud computing frameworks.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

In some implementations, presenting the visualization of the subset of candidate cloud computing frameworks further includes generating a list of one or more locations, wherein each location included on the list is representative of a location of one or more of the subset of candidate cloud computing frameworks identified, and presenting, through the user interface, data indicating the generated list of one or more locations.

In some implementations, determining, from the plurality of candidate cloud computing frameworks for replacing computing resources of the existing datacenter, a subset of candidate cloud computing frameworks for presentation in a user interface includes ranking the plurality of candidate cloud computing frameworks based at least in part on the second set of one or more measures determined for each of the plurality of candidate cloud computing frameworks.

In some implementations, the methods further include, for each of the subset of candidate cloud computing frameworks, using the first and second sets of data to perform a simulation in which the respective candidate cloud computing framework is deployed as a replacement for the computing resources of the existing datacenter, wherein determining the measure of environmental sustainability associated with the respective candidate cloud computing framework includes determining a measure of environmental sustainability associated with the respective candidate cloud computing framework based at least in part on the simulation.

In some implementations, the methods further include receiving, through the user interface, a third set of data indicating one or both of an updated set of one or more characteristics of the existing datacenter and an updated set of one or more preferred characteristics of a cloud computing framework for replacing computing resources of the existing datacenter, and in response to receiving the third set of data, presenting, through the user interface, an updated version of one or both of the visualization and the dashboard.

In some implementations, presenting, through the user interface, an updated version of one or both of the visualization and the dashboard includes selecting, from the plurality of candidate cloud computing frameworks, at least one new candidate cloud computing framework not included in the subset of cloud computing frameworks, and presenting, the updated version of the visualization including the at least one new candidate cloud computing framework not included in the subset of cloud computing frameworks, where the at least one new candidate cloud computing framework includes one or more of the updated set of one or more preferred characteristics.

In some implementations, receiving the third set of data indicating one or more of an updated set of one or more preferred characteristics of the cloud computing framework for replacing computing resources of the existing datacenter includes receiving, through the user interface, an indication of an interaction by a user with at least one location of the subset of candidate cloud computing frameworks or the existing datacenter.

In some implementations, the methods further include receiving, through the user interface, data indicating a selection of a particular location from the generated list of one or more locations, the particular location being representative of a location of a particular set of the subset of candidate cloud computing frameworks, and in response to receiving data indicating the selection of the particular location, presenting, through the user interface, additional data identifying one or more characteristics of each of the particular set of the subset of candidate cloud computing frameworks.

In some implementations, the visualization of the existing datacenter and the subset of candidate cloud computing frameworks includes geographical representations of a location of the existing datacenter and a location of each the subset of candidate cloud computing frameworks.

In some implementations, computing resources of the existing datacenter host a particular set of data, applications, and workloads, where the plurality of candidate cloud computing frameworks for replacing the computing resources of the existing datacenter based at least in part on the second set of data comprise one or more candidate cloud computing frameworks that are each capable of hosting the particular set of data, applications, and workloads.

In some implementations, presenting, through the user interface, data identifying the one or more characteristics of each of the subset of candidate cloud computing frameworks includes: for each of the subset of candidate cloud computing frameworks identified, presenting, through the user interface, data identifying the one or more characteristics of each of the respective candidate cloud computing framework as a recommended cloud computing framework for replacing the computing resources of the existing datacenter.

In some implementations, presenting, through the user interface, the dashboard with one or more graphical representations of the first set of one or more measures determined for the existing datacenter and the second set of one or more measures determined for each the subset of candidate cloud computing frameworks includes: for each of the subset of candidate cloud computing frameworks identified, presenting, through the user interface, data representing a comparison of at least a portion of the first set of one or more measures determined for the existing datacenter and at least a portion of the second set of one or more measures determined for the respective candidate cloud computing framework.

In some implementations, presenting, through the user interface, the dashboard with one or more graphical representations of the first set of one or more measures determined for the existing datacenter and the second set of one or more measures determined for each the subset of candidate cloud computing frameworks includes: for each of the subset of candidate cloud computing frameworks, presenting, through the user interface, data identifying one or both of a location of the respective candidate cloud computing framework and a cloud service provider (CSP) associated with the respective candidate cloud computing framework.

In some implementations, the measure of environmental sustainability associated with the existing datacenter is indicative of one or both of an estimation of the existing datacenter's current carbon emissions and one or more measures of greenness with a location of the existing datacenter, and where the measure of environmental sustainability associated with the respective candidate cloud computing framework is indicative of one or both of an estimation of the respective candidate cloud computing framework's expected carbon emissions and one or more measures of greenness associated with a location of the respective candidate cloud computing framework.

In some implementations, the location of the respective candidate cloud computing framework corresponds to one or more of a city or town within which the respective candidate cloud computing framework is located, a state or province within which the respective candidate cloud computing framework is located, and a country within which the respective candidate cloud computing framework is located.

In some implementations, presenting, through the user interface, the dashboard with one or more graphical representations of the first set of one or more measures determined for the existing datacenter and the second set of one or more measures determined for each the subset of candidate cloud computing frameworks includes presenting, through the user interface, data identifying a location of the existing datacenter, wherein the location of the existing datacenter corresponds to one or more of a city or town within which the existing datacenter is located, a state or province within which the existing datacenter is located, and a country within which the existing datacenter is located.

In some implementations, receiving data representing the plurality of candidate cloud computing frameworks for replacing the computing resources of the existing datacenter including the second set of one or more measures including a measure of environmental sustainability associated with the respective candidate cloud computing framework based on the second set of data indicating one or more preferred characteristics of a cloud computing framework for replacing computing resources of the existing datacenter includes identifying two one or more candidate cloud computing frameworks for replacing the computing resources of the existing datacenter based at least in part on the second set of data from among a plurality of cloud computing frameworks having different characteristics, where the identified two one or more candidate cloud computing frameworks each include the one or more preferred characteristics indicated by the second set of data.

In some implementations, the two one or more cloud computing frameworks are associated with two or more different cloud service providers (CSPs), respectively.

In some implementations, presenting, through the user interface, data identifying the one or more characteristics of each of the subset of candidate cloud computing frameworks includes presenting data indicating target cloud providers, target locations, carbon emissions, CO2 emission reduction and sustainability improvement for each of the subset of candidate cloud computing frameworks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 7-21D show an example sequence of screens presented by a system similar or equivalent to the example system of FIG. 1.

FIG. 39 is a flow diagram of an example process for generating customized recommendations for environmentally-conscious cloud computing frameworks for replacing computing resources of existing datacenters.

FIG. 40 is a flow diagram of another example process for generating customized recommendations for environmentally-conscious cloud computing frameworks for replacing computing resources of existing datacenters.

Like reference numbers and designations in the various drawings indicate like elements.

DETAILED DESCRIPTION

Figure 1:
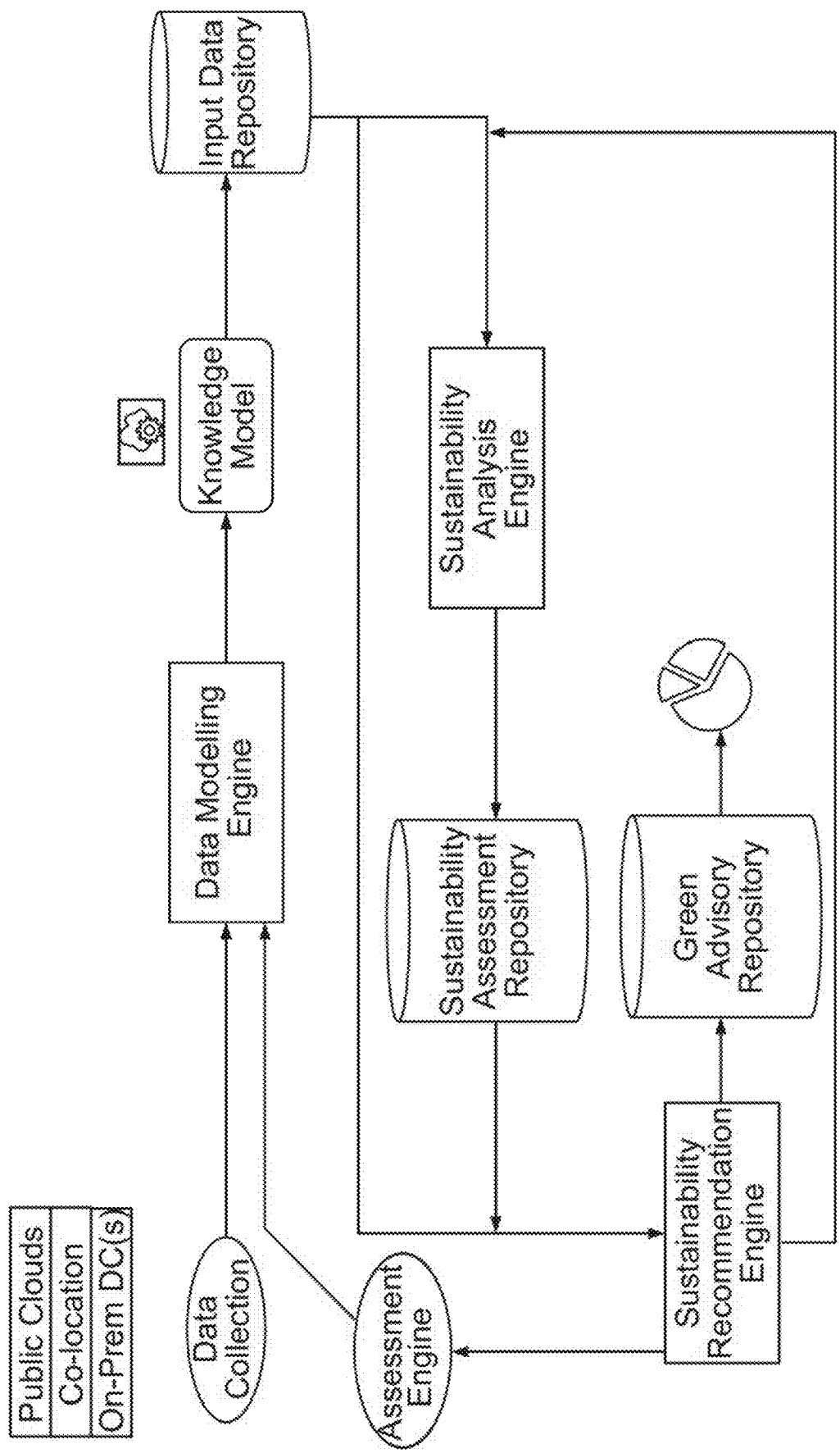
FIG. 1 is a diagram of an example system for generating customized recommendations for environmentally-conscious cloud computing frameworks for replacing computing resources of existing datacenters.

Companies typically have a variety of concerns when migrating to cloud services/storage. While traditionally those concerns have centered around cost, and technology, increasingly, sustainability is becoming an important concern. Thus, it is advantageous to be able to reveal the sustainability benefits of a particular company's potential migration to the cloud including how those benefits can be maximized, and what unique possibilities exist specific to a client's current datacenter or Cloud context. However, typically it is non-trivial to address these aspects objectively.

The systems and techniques described herein are directed to automated cross-platform approaches which can help explore, calculate and optimize the sustainability benefits of migrating to specific different cloud providers and locations/geographies. In some examples, one or more of the systems described herein may serve to advise users (e.g., companies) on how moving workloads to the cloud would be environmentally friendly and sustainable, in terms of reducing carbon footprint, and for helping optimize the migration with respect to important constraints and considerations for the user. The approach utilizes in part an interactive system to determine in the business case, energy use and technical infrastructure aspects of the user's/company's current datacenter deployments, along with the cloud migration/adoption strategy parameters, to determine the cloud and location greenness of the strategy in terms of possible reduction in energy demands and eCO2 emissions. The approaches also allow for determining objective measurements and technical architecture of the company's as-is deployment to provide a view into their current sustainability score and then allows for simulating various sustainable cloud migration strategies across different providers and locations. The approach estimates corresponding sustainability scores for each of those so that the realizable green benefits of the migration strategies can be compared. The approach also provides "recommended" migration strategies that optimize sustainability with other cloud migration goals important to the company.

The systems and techniques described herein present an approach to advise the client on how moving to cloud-based service providers can be more sustainable and can lead to significant reduction in their carbon footprint. The systems and techniques can be utilized to optimize migration benefits while balancing client constraints and restrictions. The process employed by the systems and techniques described herein includes a question-based approach to input the business application, technical infrastructure, migration strategy and energy consumption for the Client's current deployment of data centers. The process is further augmented by providing features to assess their sustainability score with the client's current technical deployment architecture and allows them to simulate different migration strategies and explore their impact (sustainability score) through an interactive simulation environment. The simulation environment can allow the Client to explore various scenarios outside a first determined set of cloud migration preferences and/or cloud-based server parameters, and gain insight into how alternative requirements can influence the sustainable cloud migration strategies. The approach also recommends a greenness strategy to effectively reduce the energy demands and eCO2 emissions. Such systems and techniques are described in further detail below with reference to FIGS. 1-40.

FIG. 1 shows an example system for generating customized recommendations for environmentally-conscious cloud computing frameworks for replacing computing resources of existing datacenters. In some instances, the example system of FIG. 1 is also referred to herein as a "Green Cloud Advisor" system. More specifically, the Green Cloud Advisor system of FIG. 1 may include a data modelling engine, a sustainability analysis engine, and a sustainability recommendation engine. The Green Cloud Advisor system of FIG. 1 may include an assessment engine to aggregate data from various sources. In some examples, the Green Cloud Advisor system of FIG. 1 may also include, maintain, or otherwise have access to one or more repositories or databases, such as an input data repository, a sustainability assessment repository, and a green advisory repository.

Briefly, and as described in further detail below, the Green Cloud Advisor system of FIGS. 1-5 may collect data from a user (e.g., by way of a questionnaire or through another interactive user interface) regarding aspects of their current datacenter deployment(s) (and/or current public cloud deployment(s)) and their cloud migration goals, process the collected data to make an assessment of the client's current sustainability score(s) (e.g., indicator of their estimated current carbon emissions), and provide a recommendation on a location and a cloud provider to migrate to and information on how the recommended migration strategy might impact (e.g., improve) their sustainability score(s). Additionally, as described in further detail below with reference to FIG. 5, in some implementations, the system may further provide the user with the ability to evaluate several different cloud migration strategies and their respective trade-offs (e.g., in terms of sustainability) through the use of an interactive simulation toolkit and interaction with a simulation environment.

Figure 2:
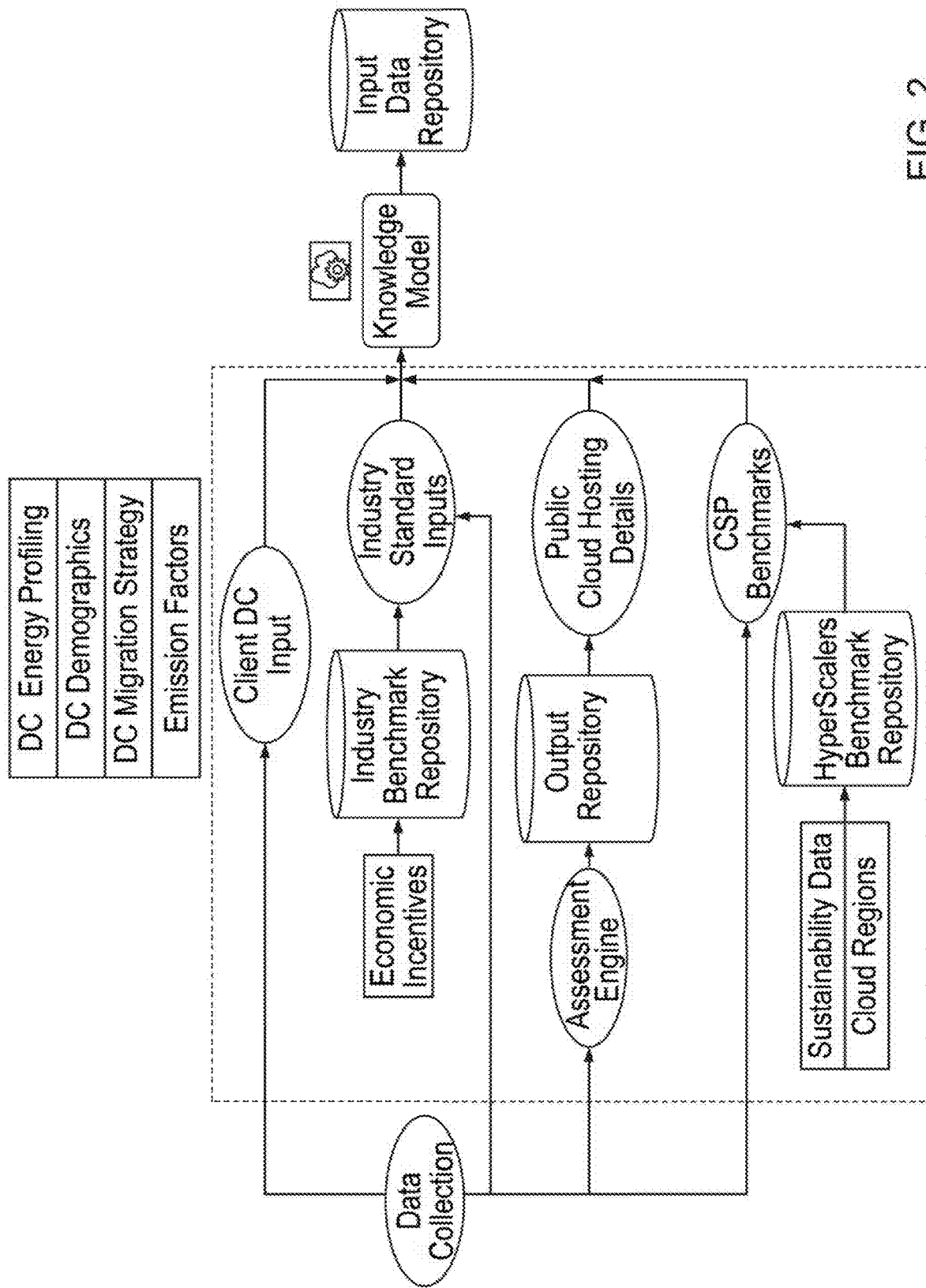
FIG. 2 is a diagram of the example system of FIG. 1 in which data collection and data modelling engine components of the system are depicted with additional detail.

FIG. 2 shows a diagram of the example system of FIG. 1 in which data collection and data modelling engine components of the system are depicted with additional detail. The data modelling engine may receive data as input or otherwise obtain data from a variety of different sources and process the data to generate a knowledge model. The knowledge model may be stored (e.g., in the input data repository) or otherwise made accessible to other components of the Green Cloud Advisor system, such as the sustainability analysis engine and/or the sustainability recommendation engine. In some implementations, the data that is received or otherwise obtained and leveraged by the data modelling engine to generate knowledge models may include data indicative of client datacenter ("DC") input, industry standard inputs, public cloud hosting details, and/or cloud service provider (CSP) benchmarks.

As shown in FIG. 2, the data modelling engine of the Green Cloud Advisor system may receive multiple levels of client DC input, e.g., four levels of client DC input, including datacenter energy profiling data, datacenter demographics data (e.g., information about where the datacenter is geographically located), datacenter migration strategy data (e.g., data indicative of what percentage of computing resources of the datacenter they wish to migrate to the cloud, data indicative of one or more preferred locations for the one or more cloud computing frameworks that will replace computing resources of the datacenter, etc.), and emission factor data. Though depicted in FIG. 2 as four levels of client DC input, more or fewer levels of input are possible, and can include alternatives to the four levels displayed depending in part, for example, on availability of client data, client DC configuration, etc. As mentioned above, some or all of this data may be obtained through a user interface that is presented to the user, such as an interactive questionnaire. Examples of such an interactive user interface can be seen in one or more of FIGS. 7-15D.

The data indicating industry standard inputs may include data indicative of benchmarks in the user's specific industry, such as data pertaining to various economic incentive programs for reducing $CO_2$ emissions for which one or more existing datacenters associated with the user may be eligible and/or carbon taxes associated with the locations of one or more existing datacenters associated with the user. In some implementations, some or all of this data may be obtained from one or more repositories or databases that are maintained by or otherwise accessible to the data modelling engine, such as an industry benchmark repository. In at least some of these implementations, the data modelling engine may select or otherwise identify industry standard inputs, from among the data stored in the industry benchmark repository, based at least in part on client DC input. For instance, in some examples, the industry benchmark repository may store data pertaining to economic incentive programs and carbon taxes in association with each of a variety of different locations and/or industries. In these examples, the data modelling engine may, for instance, determine a location of a particular existing datacenter and/or an industry associated with the particular existing datacenter based on client DC input received through an interactive user interface (e.g., DC demographics data), and may identify, from among the data stored in the industry benchmark repository, data that is associated with the determined location and/or industry as industry standard inputs for the particular existing datacenter. For example, if DC demographics data received through the interactive user interface includes data indicating that the user wishes to migrate computing resources of existing datacenters, e.g., located in Boston, USA and Gold Coast, Australia, to the cloud (e.g., as is the case in the example of FIGS. 7-21D), then the data modelling engine may identify, from among the data stored in the industry benchmark repository, data pertaining to various economic incentive programs for reducing $CO_2$ emissions in the USA, carbon taxes that are to be paid by entities operating in the USA, economic incentive programs for reducing $CO_2$ emissions in Australia, and carbon taxes that are to be paid by entities operating in Australia.

The data indicating public cloud hosting details may include data indicative of architectural characteristics of one or more public cloud computing frameworks and/or energy usage characteristics of one or more public cloud computing frameworks. For example, the public cloud hosting details may include data indicating the types and quantities of servers and other network devices that are included in each of one or more public cloud computing frameworks and/or data indicating utilization and energy consumption statistics associated with each of one or more public cloud computing frameworks. In some examples, some or all of this data may be obtained from one or more repositories or databases that are maintained by or otherwise accessible to the data modelling engine, such as repositories of output data produced or aggregated by one or more engines. In at least some of these implementations, the data modelling engine may select or otherwise identify public cloud hosting details associated with one or more public cloud computing frameworks, from among the data stored in the output repository, based at least in part on client DC input. For instance, in some examples, the output repository may store data pertaining to the capabilities and locations of each of a variety of different public cloud computing frameworks. In these examples, the data modelling engine may, for instance, determine what percentage or quantity of computing resources of a particular datacenter the Client wishes to migrate to the cloud and/or one or more preferred locations for the one or more cloud computing frameworks that will replace computing resources of the particular datacenter based on client DC input received through an interactive user interface (e.g., DC migration strategy data), and may identify, from among the data stored in the output repository, public cloud hosting details for each of one or more cloud computing frameworks that have the technical capabilities to replace the specified percentage or quantity of computing resources of the particular datacenter and/or are located at the one or more preferred locations specified by the user.

For example, if client DC input data received through the interactive user interface includes data indicating that the user wishes to migrate ten servers from each of one or more existing datacenters to the cloud and data indicating that the user wishes to use Cloud Service Provider A (CSP A) and Cloud Service Provider C (CSP C) as their cloud service providers (CSPs) (e.g., as is the case in the example of FIGS. 7-21D, specifically FIGS. 14A-15D), then the data modelling engine may identify, from among the data stored in the output repository, public cloud hosting details for each of one or more cloud computing frameworks that are operated by CSP A and/or CSP C and have the technical capabilities to replace ten servers from each of one or more existing datacenters. As another example, if client DC input data received through the interactive user interface includes data indicating that the user wishes to migrate computing resources of one or more existing datacenters to one or more public cloud computing frameworks that are located in either Latin America or the Asia Pacific and data indicating that the user wishes to use a CSP A as their cloud service provider (CSP), then the data modelling engine may identify, from among the data stored in the output repository, public cloud hosting details for each of one or more public cloud computing frameworks that are located in either Latin America or the Asia Pacific and are operated by a CSP A.

The data indicating cloud service provider (CSP) benchmarks may include data indicative of one or more measures of sustainability associated with each of one or more CSPs. In some implementations, some or all of this data may be obtained from one or more repositories or databases that are maintained by or otherwise accessible to the data modelling engine, such as a HyperScalers benchmark repository. In at least some of these implementations, the data modelling engine may select or otherwise identify CSP benchmarks, from among the data stored in the industry benchmark repository, based at least in part on client DC input. For instance, in some examples, the HyperScalers benchmark repository may store data indicative of one or more measures of sustainability in association with each of a variety of different CSPs. In these examples, the data modelling engine may, for instance, determine which CSP(s) the user prefers based on client DC input received through an interactive user interface, and may identify, from among the data stored in the HyperScalers benchmark repository, data indicating benchmarks for each of the one or more CSPs preferred by the user. For example, if client DC input data received through the interactive user interface includes data indicating that the user wishes to use CSP A and/or CSP C as their CSP(s) (e.g., as is the case in the example of FIGS. 7-21D, specifically FIGS. 14A-15D), then the data modelling engine may identify, from among the data stored in the HyperScalers benchmark repository, data indicative of one or more measures of sustainability associated with each of CSP A and/or CSP C. As another example, if client DC input data received through the interactive user interface includes data indicating that the user wishes to use CSP A as their CSP, then the data modelling engine may identify, from among the data stored in the HyperScalers benchmark repository, data indicative of one or more measures of sustainability associated with CSP A.

In some implementations, the Green Cloud Advisor system may operate to advise the user on strategies for moving from an existing cloud computing platform to another, greener cloud computing platform. In such implementations, the data collected by the data modelling engine may include data indicating one or more characteristics of each of one or more existing cloud computing frameworks.

The data modelling engine may generate a knowledge model based on some or all of the aforementioned inputs. In some examples, the knowledge model may serve to represent some or all of the aforementioned inputs in a form that is more readily usable by other components of the Green Cloud Advisor system and/or other computing devices in communication therewith. In some implementations, the knowledge model may further reflect relationships between various pieces of some or all of the aforementioned data. Upon generating the knowledge model, the data modelling engine may store the knowledge model in the input data repository or otherwise make the knowledge model available for use by other components of the Green Cloud Advisor system, such as the sustainability analysis engine and/or sustainability recommendation engine.

Figure 3:
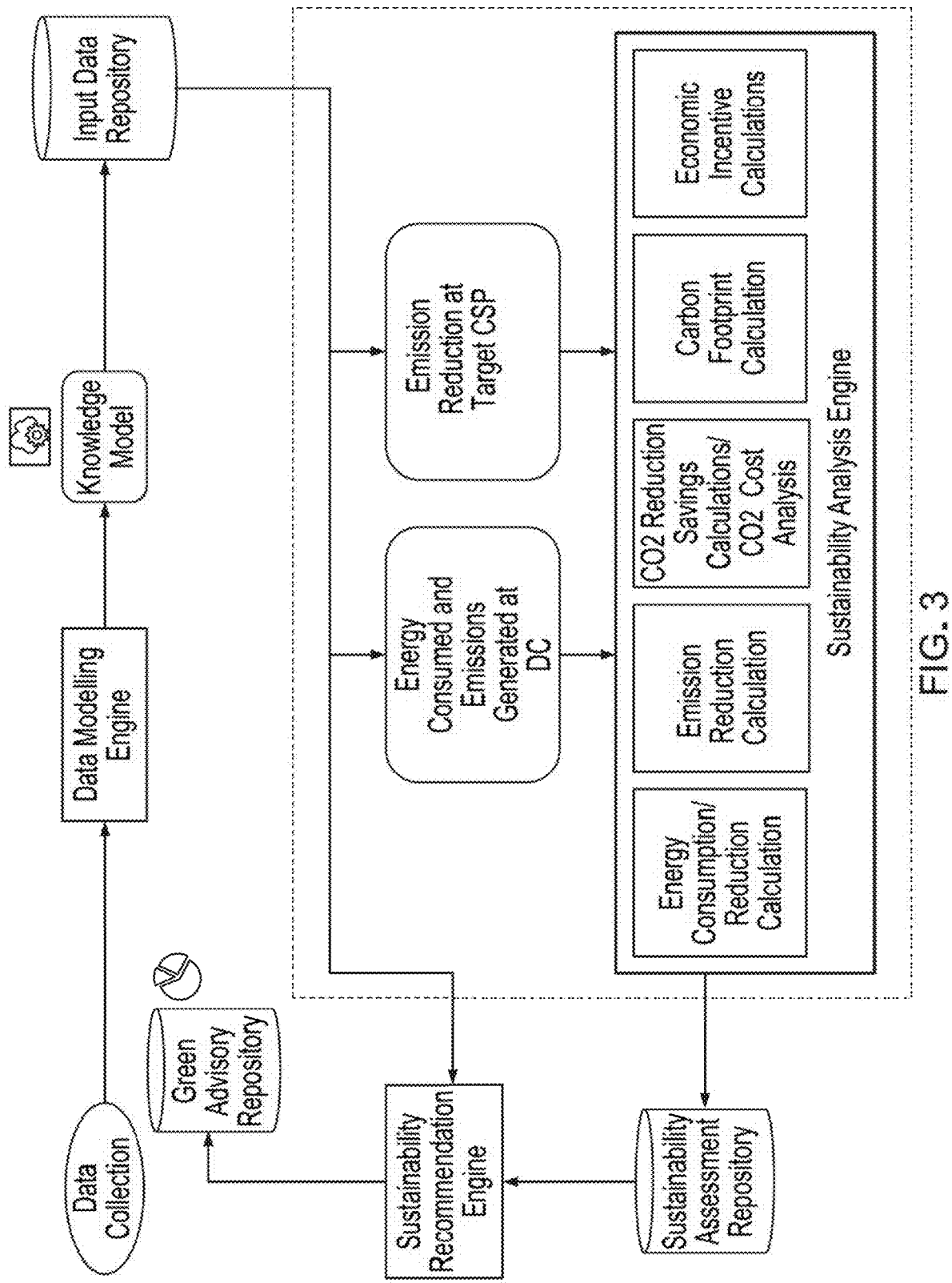
FIG. 3 is a diagram of the example system of FIG. 1 in which the sustainability analysis engine of the system is depicted with additional detail.

Next, as shown in FIG. 3, the sustainability analysis engine may use the knowledge model generated by the data modelling engine to determine (i) an estimated amount of energy consumed at one or more existing datacenters, (ii) an estimated amount of emissions generated at one or more existing datacenters, and (iii) an estimated energy reduction at each of one or more candidate cloud computing frameworks. The sustainability analysis engine may use the aforementioned determined values (i) through (iv) to determine an estimated reduction in energy consumption achievable by replacing computing resources of the one or more existing datacenters with one or more candidate cloud computing frameworks and an estimated consumption/reduction in carbon emissions achievable by replacing computing resources of the one or more existing datacenters with one or more candidate cloud computing frameworks. The sustainability analysis engine may additionally use values (i) through (iv) to perform a CO2 reduction savings calculations/CO2 cost analysis, a carbon footprint calculation, and determine economic incentives related to the determine values (i) through (iv). As depicted in FIG. 3, the sustainability analysis engine may leverage energy reduction calculation logic and emission reduction calculation logic to determine these measures. In some implementations, the estimated reduction in energy consumption achievable by replacing computing resources of the one or more existing datacenters with one or more candidate cloud computing frameworks may correspond to a quantitative difference between values (i) and (iii). Similarly, in some examples, the estimated reduction in carbon emissions achievable by replacing computing resources of the one or more existing datacenters with one or more candidate cloud computing frameworks may correspond to a quantitative difference between values (ii) and (iv). Upon determining the aforementioned measures, the sustainability analysis engine may store some or all of these measures in one or more repositories or databases, such as the sustainability assessment repository, or may otherwise make some or all of the aforementioned measures available for use by other components of the Green Cloud Advisor system, such as the sustainability recommendation engine.

Figure 4:
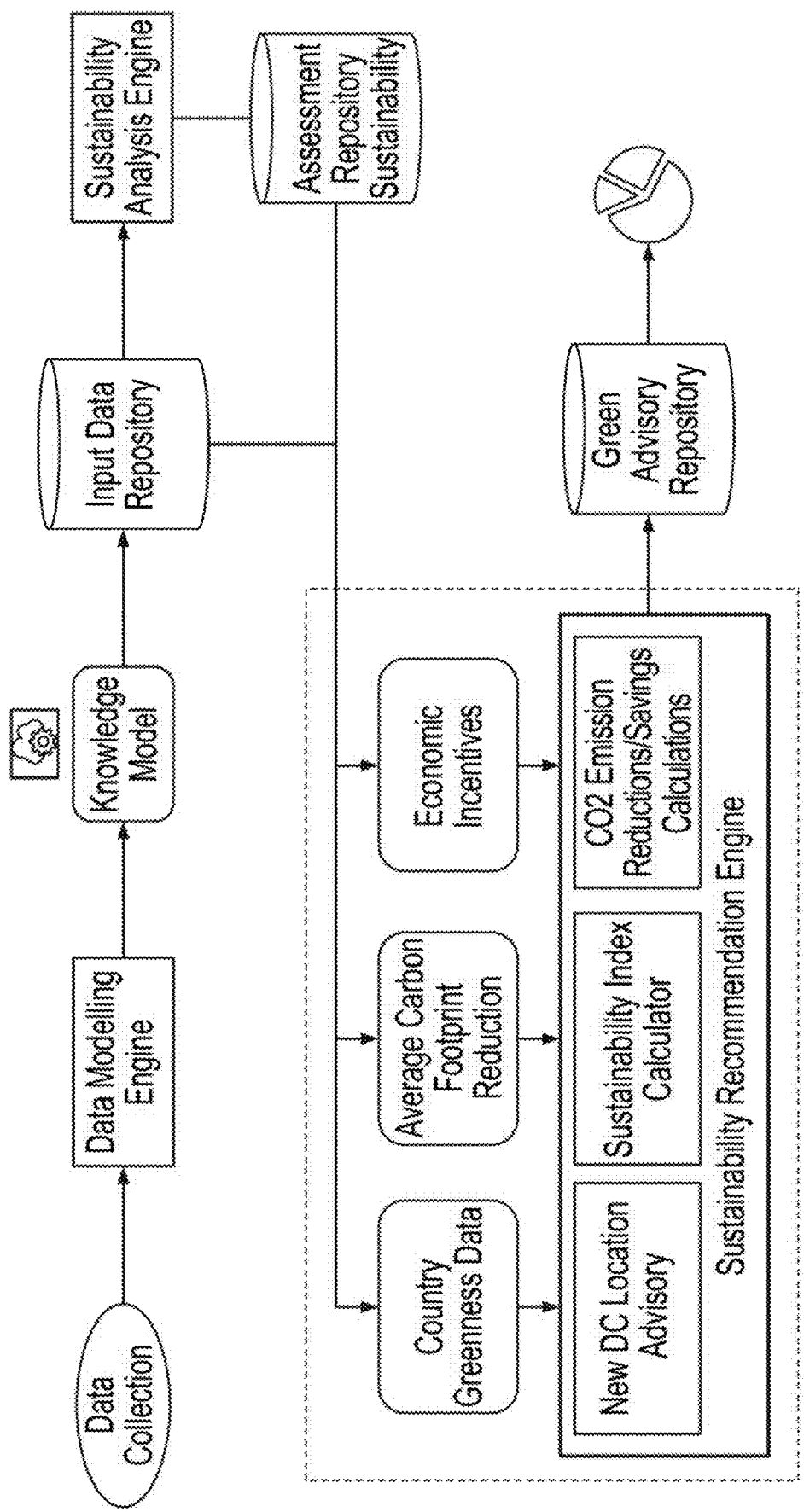
FIG. 4 is a diagram of the example system of FIG. 1 in which the sustainability recommendation engine of the system is depicted with additional detail.

Next, as shown in FIG. 4, the sustainability recommendation engine may use the knowledge model generated by the data modelling engine and the measures determined by the sustainability analysis engine to generate customized recommendations for environmentally-conscious cloud computing frameworks for replacing computing resources of existing datacenters. To generate each recommendation, the sustainability recommendation engine may further utilize country greenness data (e.g., data indicative of whether the CSPs associated with the candidate cloud computing frameworks have renewable farms and "green" data centers), average carbon footprint reduction data, and economic incentive data. The main components of each recommendation generated by the sustainability recommendation engine include new datacenter (DC) location advisory information, sustainability index information, and CO2 reduction/savings information. As depicted in FIG. 4, the sustainability recommendation engine may leverage new DC location advisory logic, sustainability index calculation logic, and CO2 reduction savings logic. More specifically, the sustainability recommendation engine may leverage new DC location advisory logic to determine which one or more candidate cloud computing frameworks would be the most sustainable choice(s) for replacing computing resources of one or more existing datacenters. The sustainability recommendation engine may leverage sustainability index calculation logic to determine a sustainability index value, which is a novel metric of a level of improvement in environmental sustainability achievable by replacing computing resources of the one or more existing datacenters with the one or more candidate cloud computing frameworks/cloud migration strategies that are determined to be the most sustainable choice(s). The sustainability recommendation engine may leverage CO2 reduction savings logic to determine an estimated reduction in operating costs achievable (e.g., estimated amount of money that can be saved by the user) by replacing computing resources of the one or more existing datacenters with the one or more candidate cloud computing frameworks/cloud migration strategies that are determined to be the most sustainable choice(s).

In some examples, the sustainability recommendation engine may be configured to rank the various candidate cloud computing frameworks/cloud migration strategies based on any of a variety of information. For instance, the sustainability recommendation engine may be configured to rank the various candidate cloud computing frameworks/cloud migration strategies based on their respective sustainability index and/or the estimated reduction in operating costs associated therewith. In some of these examples, the sustainability recommendation engine may only generate a recommendation for each of a set of the highest ranking candidate cloud computing frameworks/cloud migration strategies. For instance, the sustainability recommendation engine may only generate recommendations for the top three ranked candidate cloud computing frameworks/cloud migration strategies or may only generate a single recommendation for the top ranked candidate cloud computing framework/cloud migration strategy. In some implementations, the recommendation(s) generated by the sustainability recommendation engine may ultimately be presented to the user (e.g., through an interactive user interface) in a spatial and/or temporal order corresponding to ranking. For example, the Green Cloud Advisor system may present a recommendation for the top ranked candidate cloud computing framework/ cloud migration strategy through a first screen of the user interface, and further present recommendations for the second, third, and fourth top ranked candidate cloud computing frameworks/cloud migration strategies through a second screen the user interface as a set of "alternate" options.

Upon generating each recommendation, the sustainability recommendation engine may store each recommendation in the green advisory repository or otherwise make each recommendation available for use by other components of the Green Cloud Advisor system and/or other systems and components in communication therewith. For example, the sustainability recommendation engine may perform one or more operations to provide each recommendation for output through an interactive user interface that is presented on a display.

In some examples, instead of asking the user which CSP(s) they prefer, the Green Cloud Advisor system may simply recommend cloud computing frameworks corresponding to whichever CSP(s) yield the best results (e.g., most sustainable results and/or most cost effective results).

Figure 5:
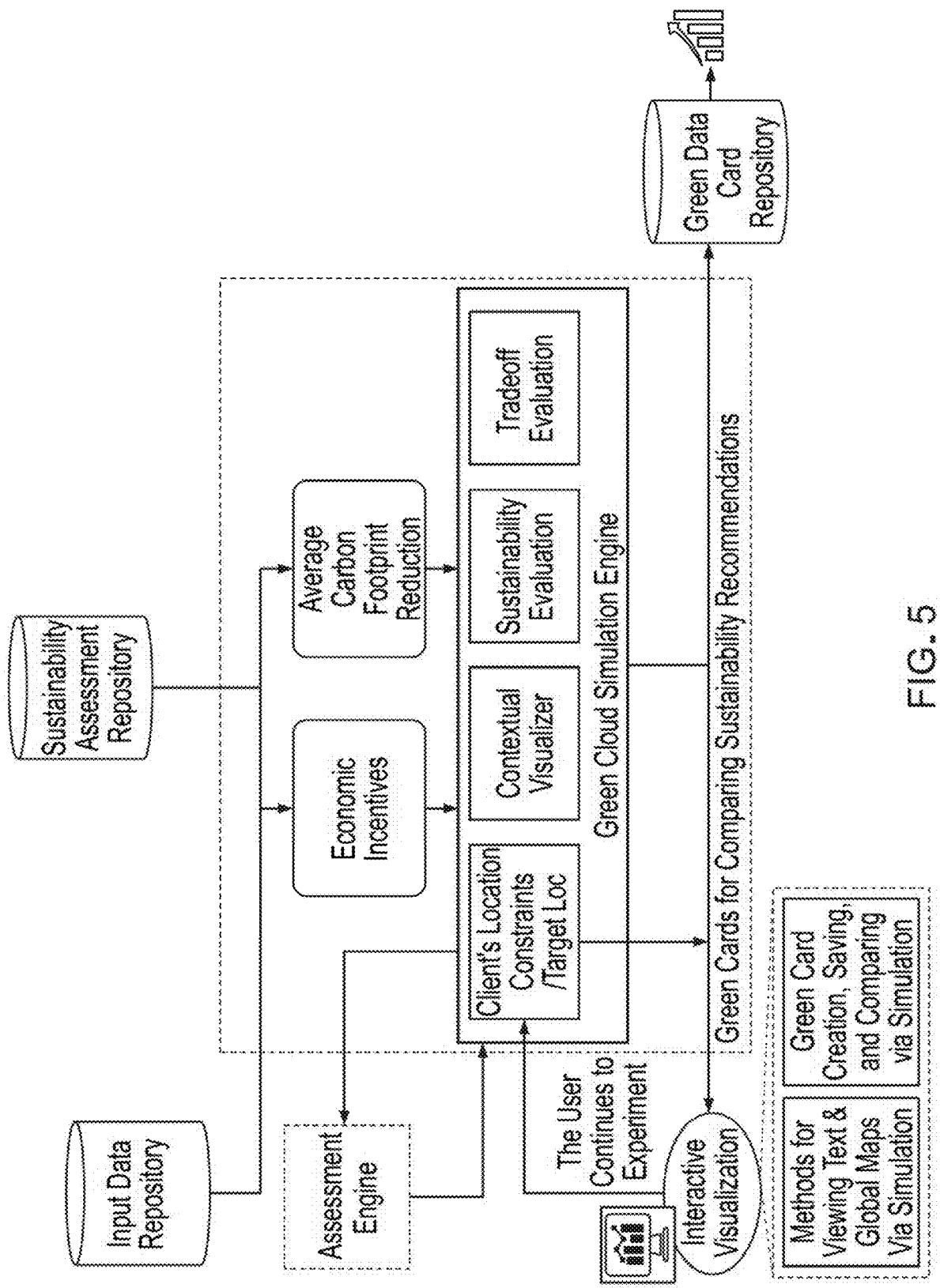
FIG. 5 is a diagram of an example simulation engine that may be employed as part of or in conjunction with the example system of FIG. 1.

FIG. 5 shows an example simulation engine that may be employed as part of or in conjunction with the Green Cloud Advisor system of FIG. 1. As mentioned above, in some implementations, the Green Cloud Advisor system of FIG. 1 may further provide the user with the ability to evaluate several different cloud migration strategies and their respective trade-offs (e.g., in terms of sustainability) through the use of an interactive simulation toolkit presented in a simulation environment. Such an interactive simulation toolkit may be driven by the simulation engine of FIG. 5.

The simulation engine of FIG. 5 provides for an interactive user experience via a simulation environment in which users can drag and move a set of servers from one datacenter location (which could be in-premise or at a particular cloud provider) to another cloud datacenter location and the advisor shows the impact on greenness of such possible migration. This allows for a what-if analysis wherein users may explore multiple such locations across various cloud providers, and allow the users to revisit previously expressed preferences (and make updated choices) as they run one or more iterations of the simulation. The simulation engine may generate and save graphical representations of the different cloud migration strategies (also referred to herein as "green cards" or "data cards") for each of the iterations in a dashboard of the user interface. The user may review and compare the one or more generated green cards to explore available options that were generated using multiple sets of preferences by interacting with the dashboard of the user interface, e.g., via "my green cards" element depicted, for example, in FIGS. 27-37. For example, the user may review two or more generated green cards each representative of a different iteration of the simulation, where each of the two or more generated green cards presents information related to a different CSP migration strategy.

Each green card of the multiple green cards can include one or more of i) data indicating at least a portion of the first set of one or more measures related to an existing datacenter, ii) data identifying characteristics of the one or more candidate cloud computing frameworks, and iii) data indicating at least a portion of the second set of one or more measures related to the one or more candidate cloud computing frameworks.

A user may interact with the dashboard to select, via a drop-down menu, one or more of the generated and saved green cards. In this way, the simulation engine can update, in real-time, the algorithms utilized to calculate a sustainability report, and provide real-time updated aggregation/ presentation of data (e.g., via real-time generated green cards) to increase awareness of a user to options for cloud migration. Examples of such information can be seen in one or more of the screens of FIGS. 34-40. This is achieved through a multilevel drill down approach for each target location. Thus, the simulation engine may help users make an informed decisions for achieving greener cloud deployment and environmental sustainability. Additionally, the simulation engine can reveal advantages of particular preferences/parameters for CSP migration that may be different than an initial set of preferences/parameters provided by a user to the simulation engine.

The simulation engine of FIG. 5 may effectively enable the user to experiment with migrating computing resources of their existing datacenters to different cloud computing frameworks and view the various corresponding pros and cons. To do so, as depicted in FIG. 5, the simulation engine may leverage location logic, contextual visualizer logic, sustainability evaluation logic, and tradeoff evaluation logic. The simulation engine may also include, maintain, or otherwise have access to one or more repositories or databases, such as an input data repository, a sustainability assessment repository, and a green data card repository. In some examples, one or both of the aforementioned input data repository and the sustainability assessment repository may correspond to input data repository and sustainability assessment repository as described above with reference to FIGS. 1-4. Furthermore, in some implementations, the simulation engine may also include or otherwise communicate with one or more engines, such as the assessment engine depicted in FIG. 5.

The simulation engine of FIG. 5 may leverage the location logic to obtain data indicating a user-specified target location to which user wants to migrate their datacenter. In some examples, the data obtained through use of the location logic may include data similar or equivalent to that of data indicating client DC input (e.g., data received through the user interface) as described above with reference to FIG. 2. The simulation engine may leverage the sustainability evaluation logic to determine whether the target location is "greener" than the location of the user's current deployment. The simulation engine may leverage the tradeoff evaluation logic to compute tradeoffs of migrating to the target location. The simulation engine may leverage the contextual visualizer logic to generate data for informing the user of various each of the various pros and cons of migrating to the target location. Examples of an interactive user interface that is managed by the simulation in each of various states can be seen in one or more of FIGS. 22A-29C, and 30-38.

Simulation engine may include an interactive visualization presented to a user in a simulation environment. The interactive visualization can include methods of viewing and interacting with text and global maps presented to the user in the simulation environment. For example, the user can drag and drop entities presented on the map that are representative of a current location of a DC to a new different location to indicate a desired location of a CSP to migrate a portion or all of the DC. In another example, the user can drag and drop entities presented on the map that are representative of suggested locations of CSPs by the simulation engine to indicate a new preference for a location of the CSP to migrate a portion or all of a DC.

The interactive visualization presented to the user in the simulation environment can include methods for green card creation via the simulation engine. In other words, a user may, through interactions with the interactive visualization, create one or more green cards representative of the interactions of the user with the simulation environment. For example, when the user interacts with entities presented on the map that are representative of a suggested CSP location for migrating a portion or all of a DC, e.g., moves the CSP location to a different location and/or to a different CSP, a new green card can accordingly be generated and saved in a dashboard of the user interface that is representative of this interaction. The new green card can include data indicating an updated set of one or more of i) data indicating at least a portion of the first set of one or more measures related to an existing datacenter, ii) data identifying characteristics of the one or more candidate cloud computing frameworks, and iii) data indicating at least a portion of the second set of one or more measures related to the one or more candidate cloud computing frameworks.

Figure 6A:
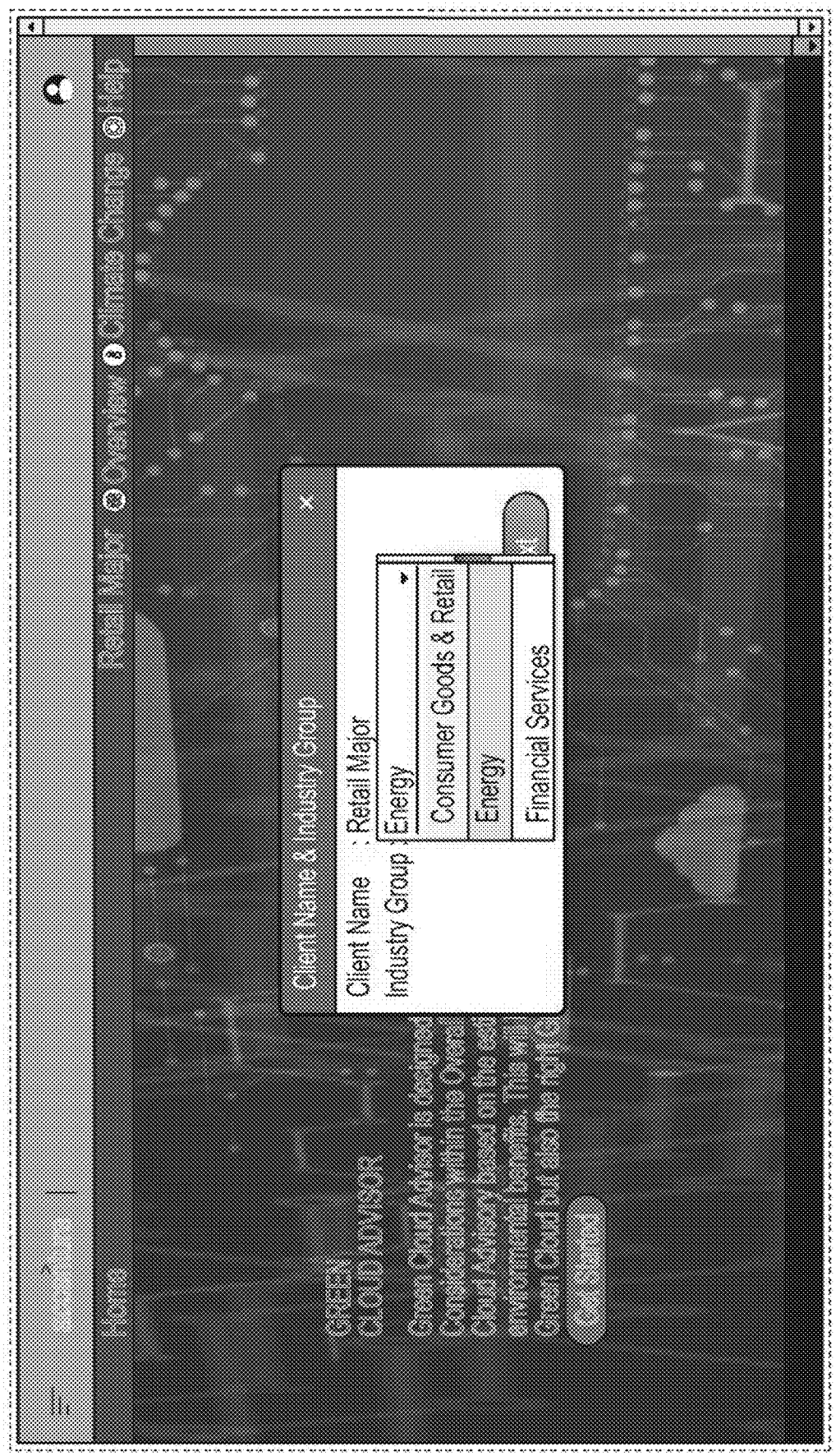
FIGS. 6A-6B shows an example home screen presented by a system similar or equivalent to the example system of FIG. 1.
Figure 6B:
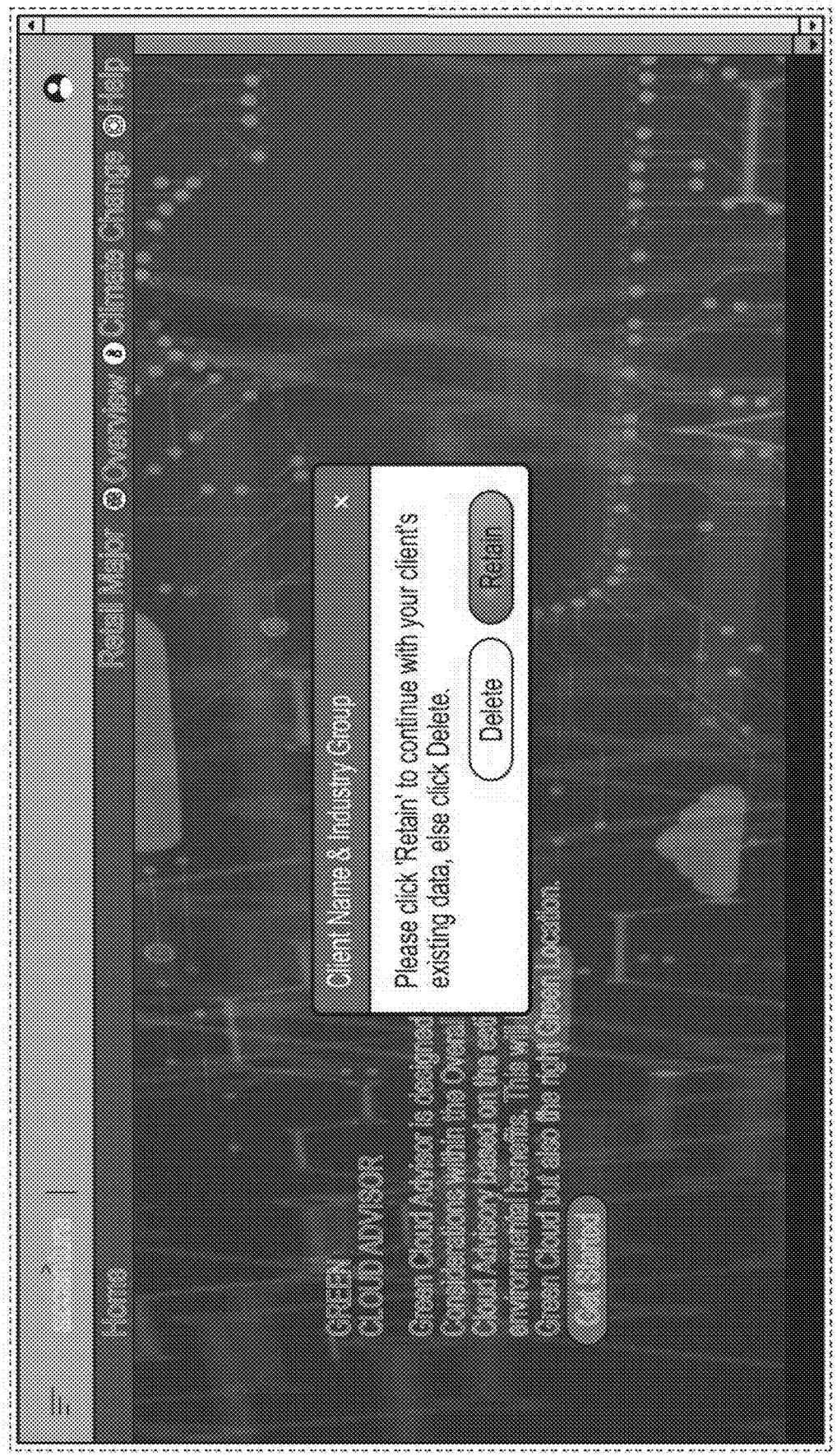
Figure 7:
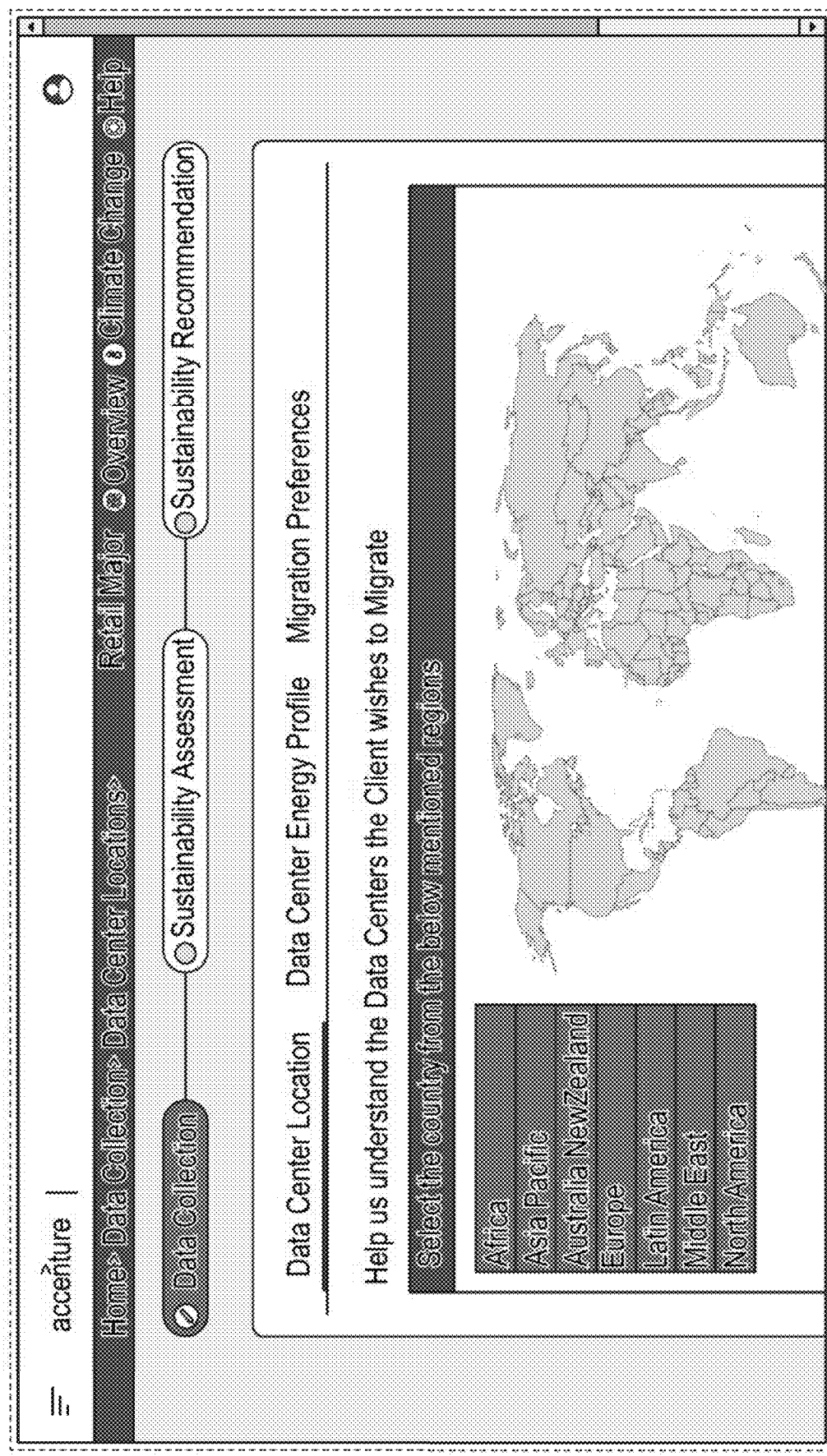
Figure 8:
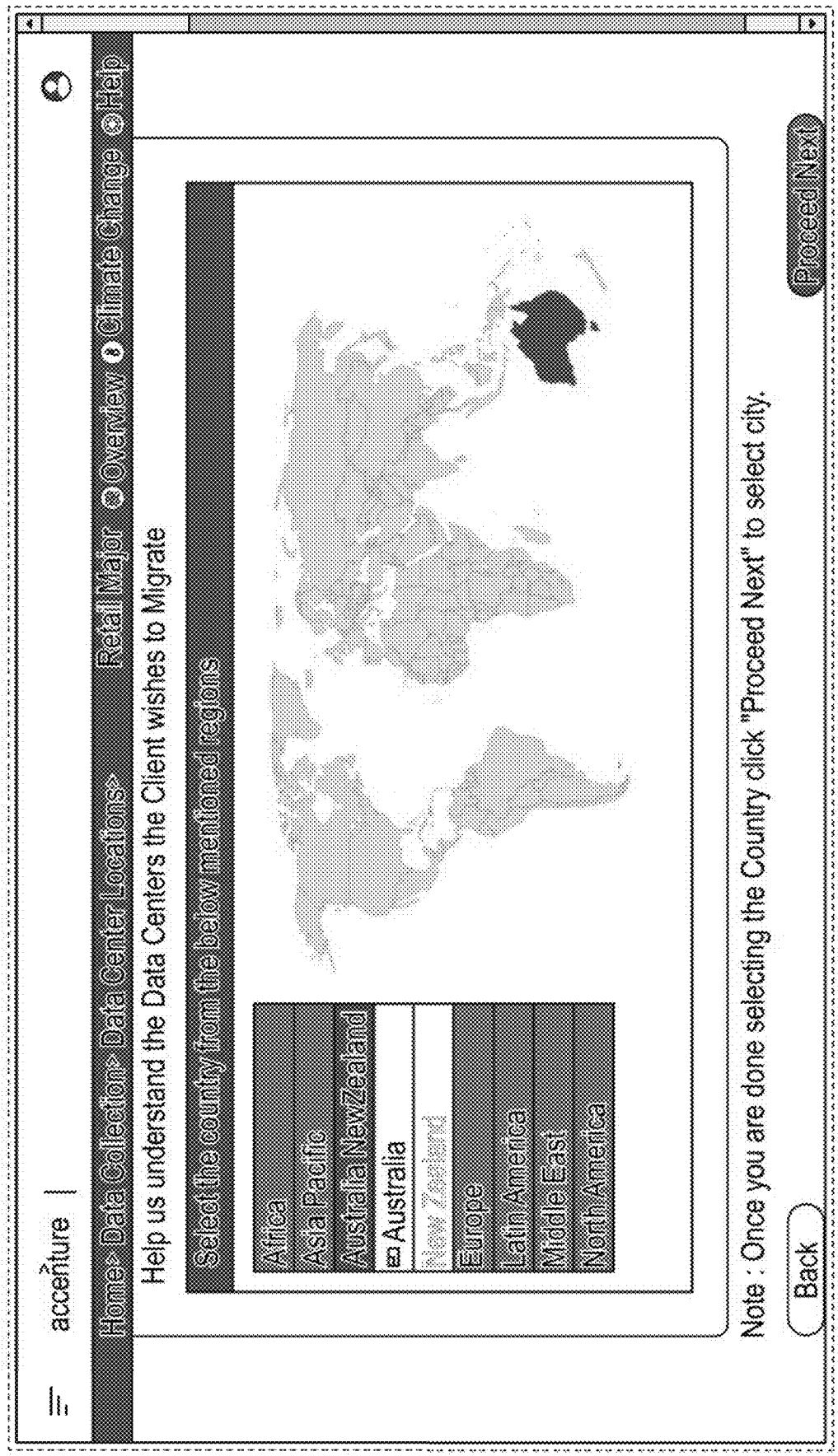
Figure 9:
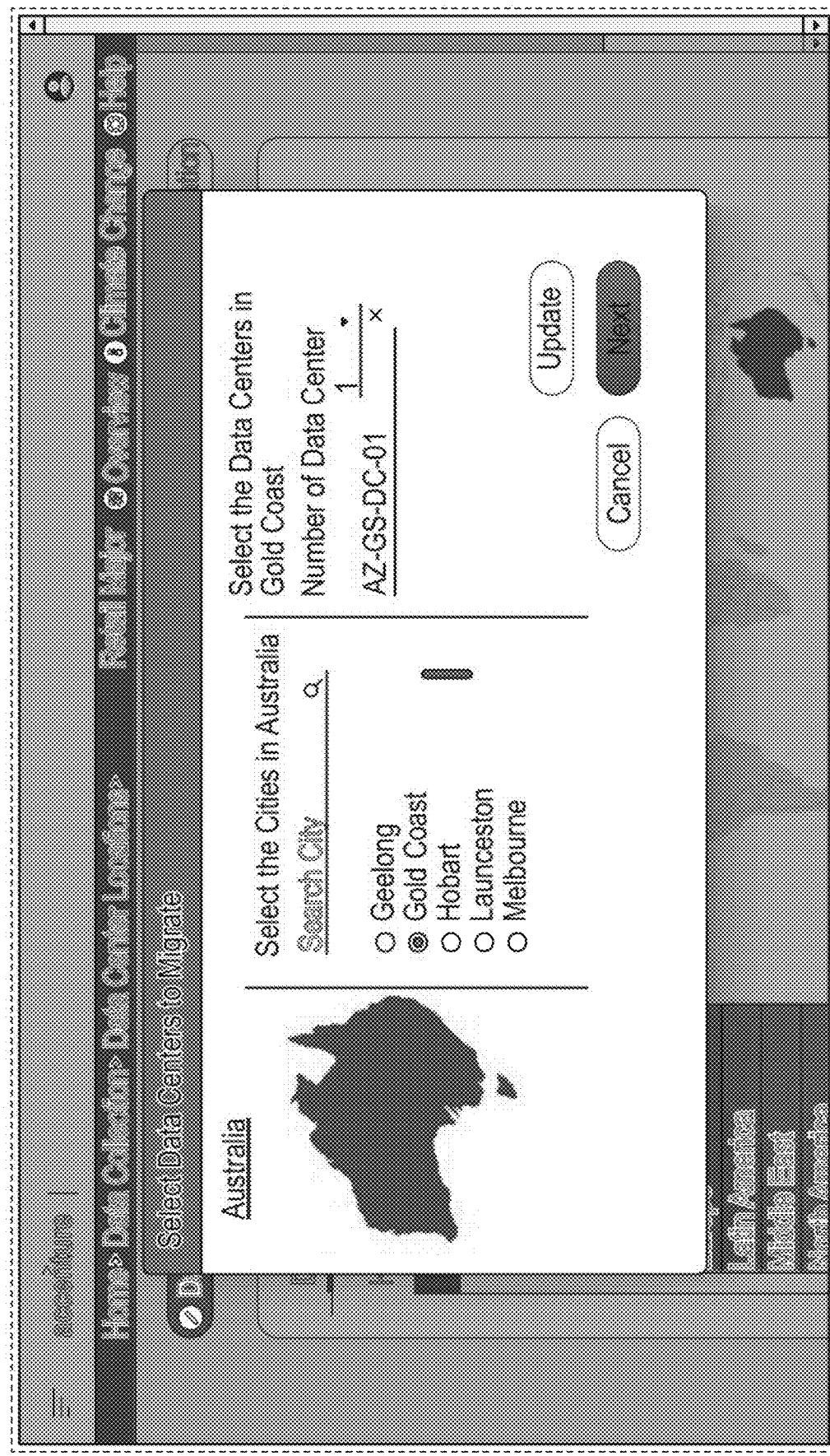
Figure 10:
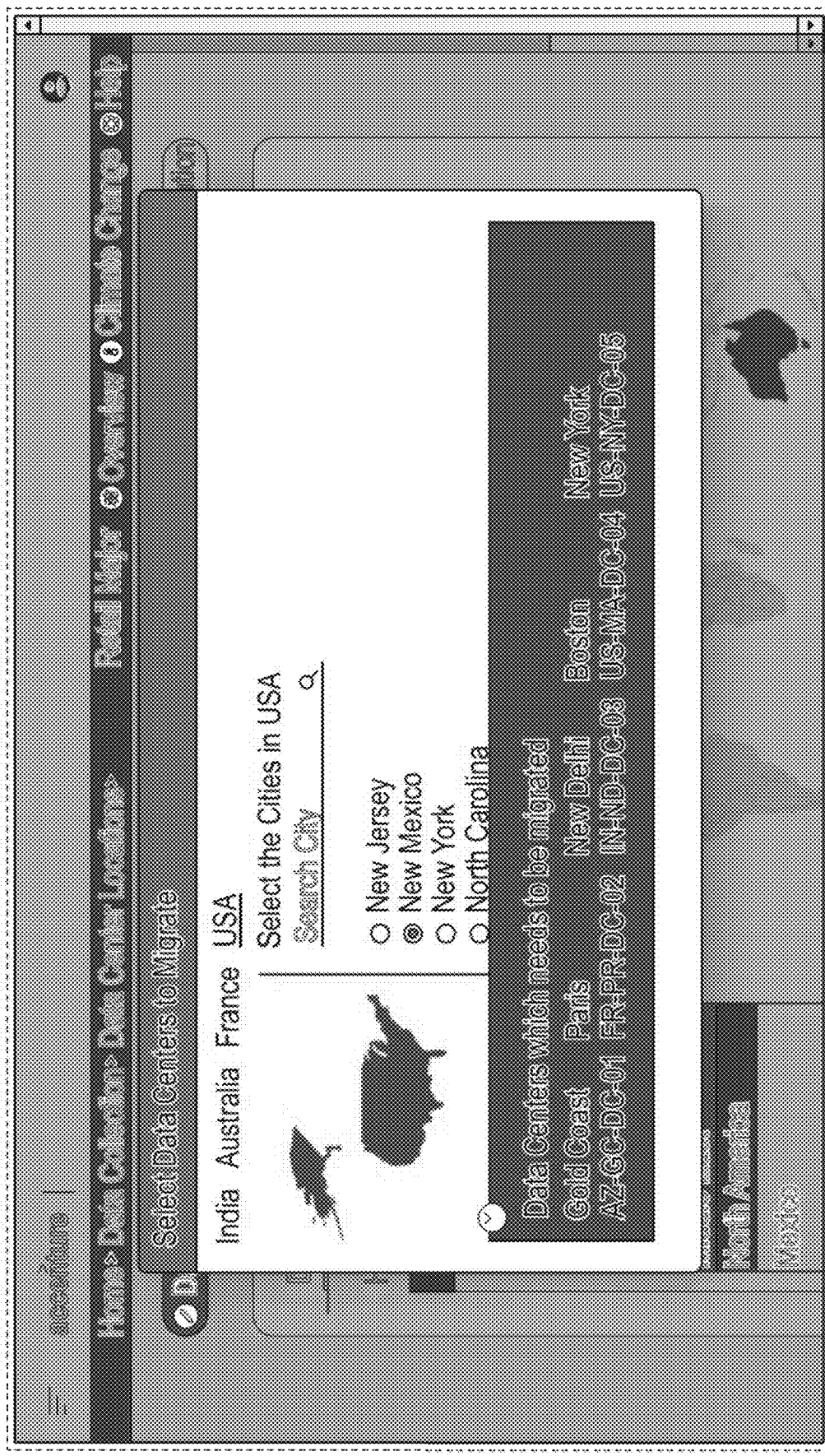
Figure 11:
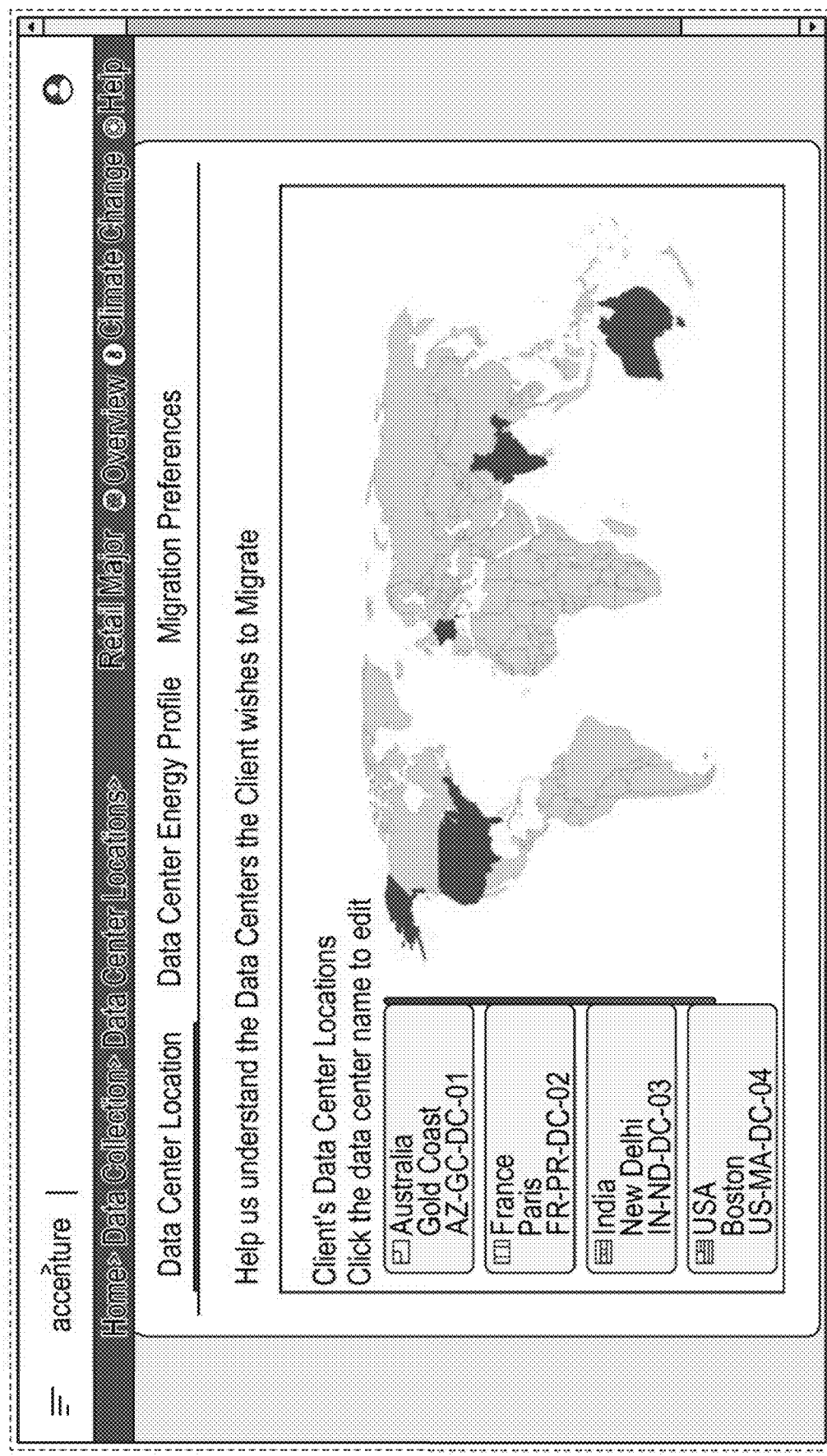
Figure 15D:
Figure 16A:
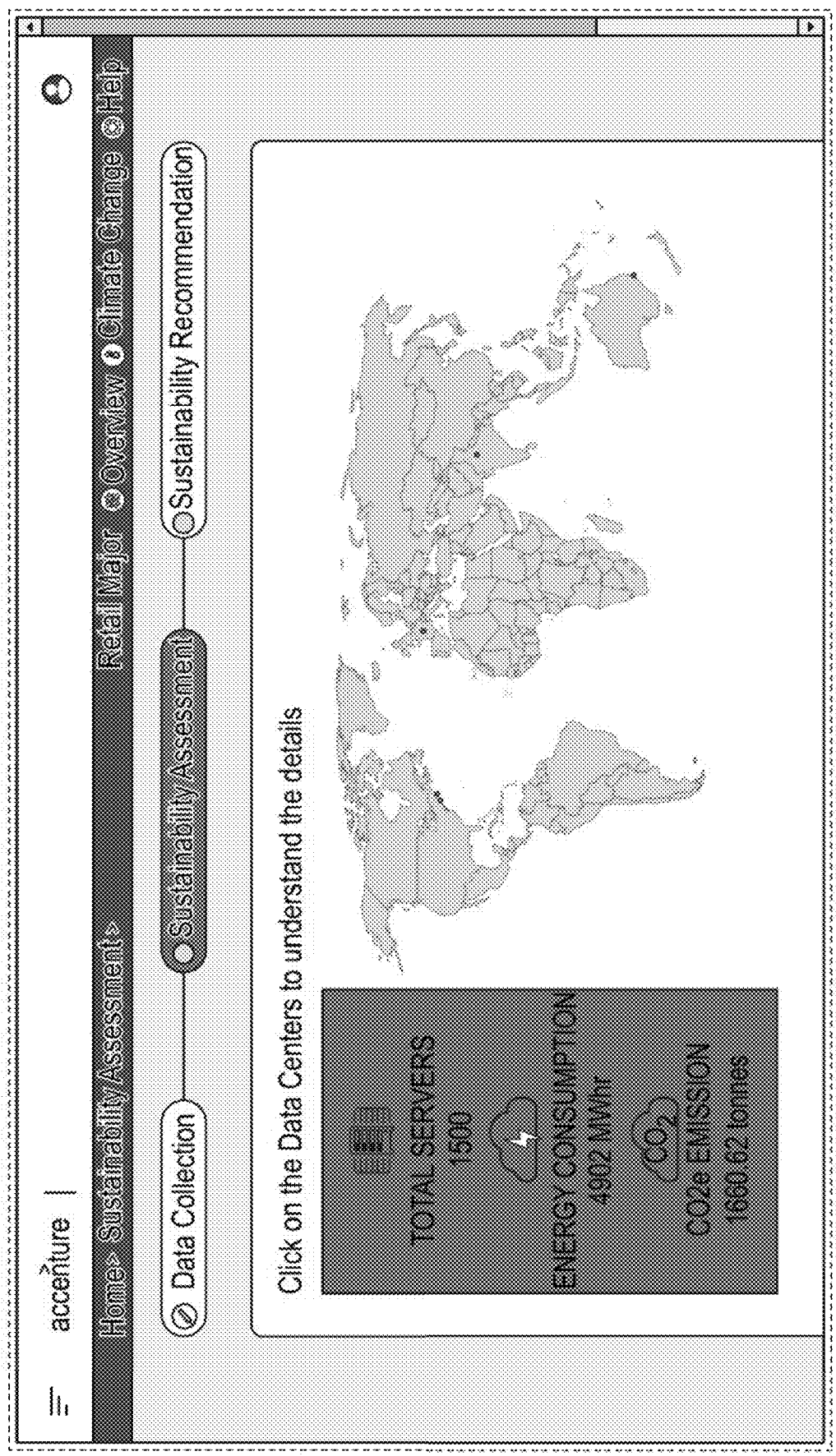
Figure 16B:
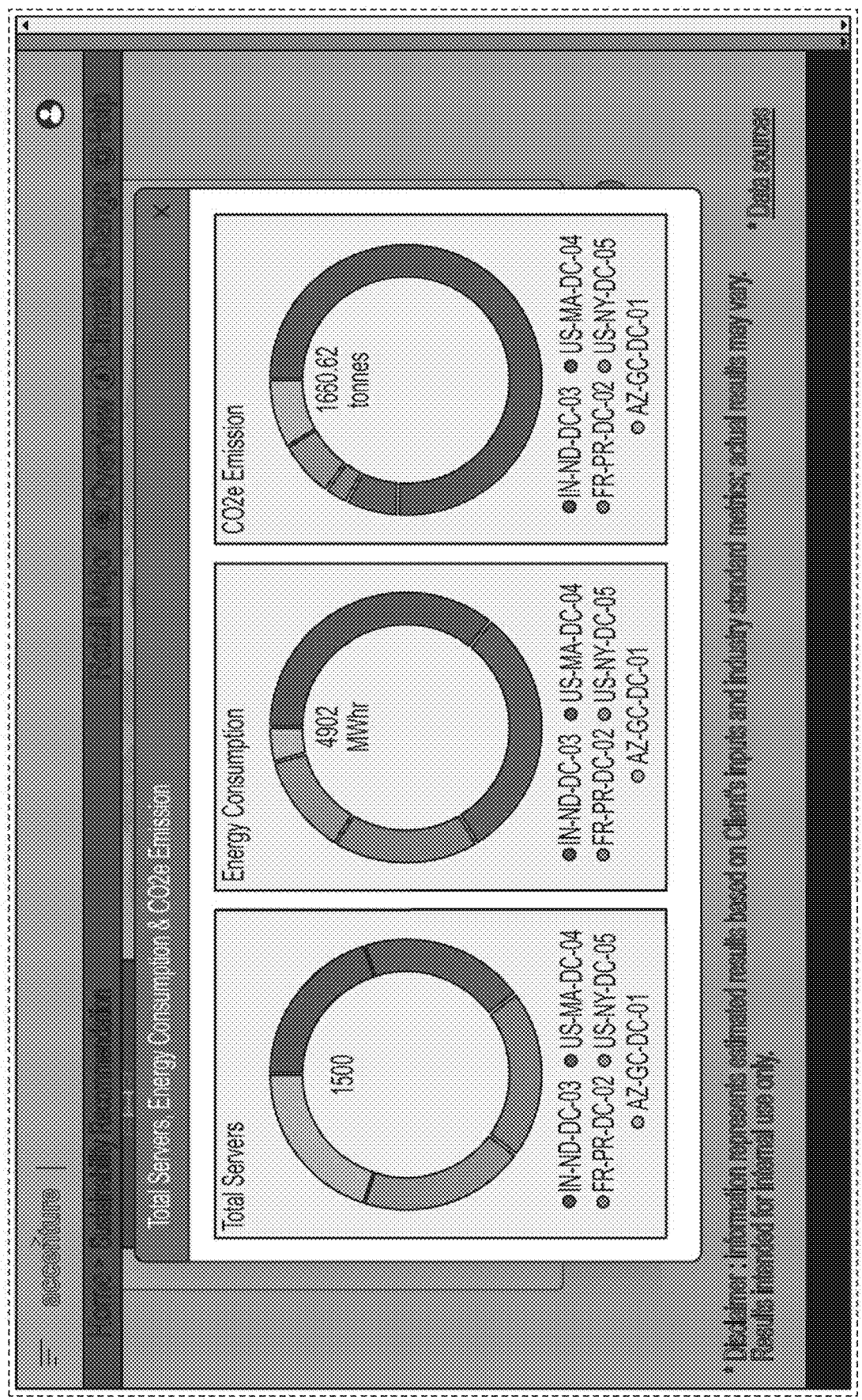
Figure 16C:
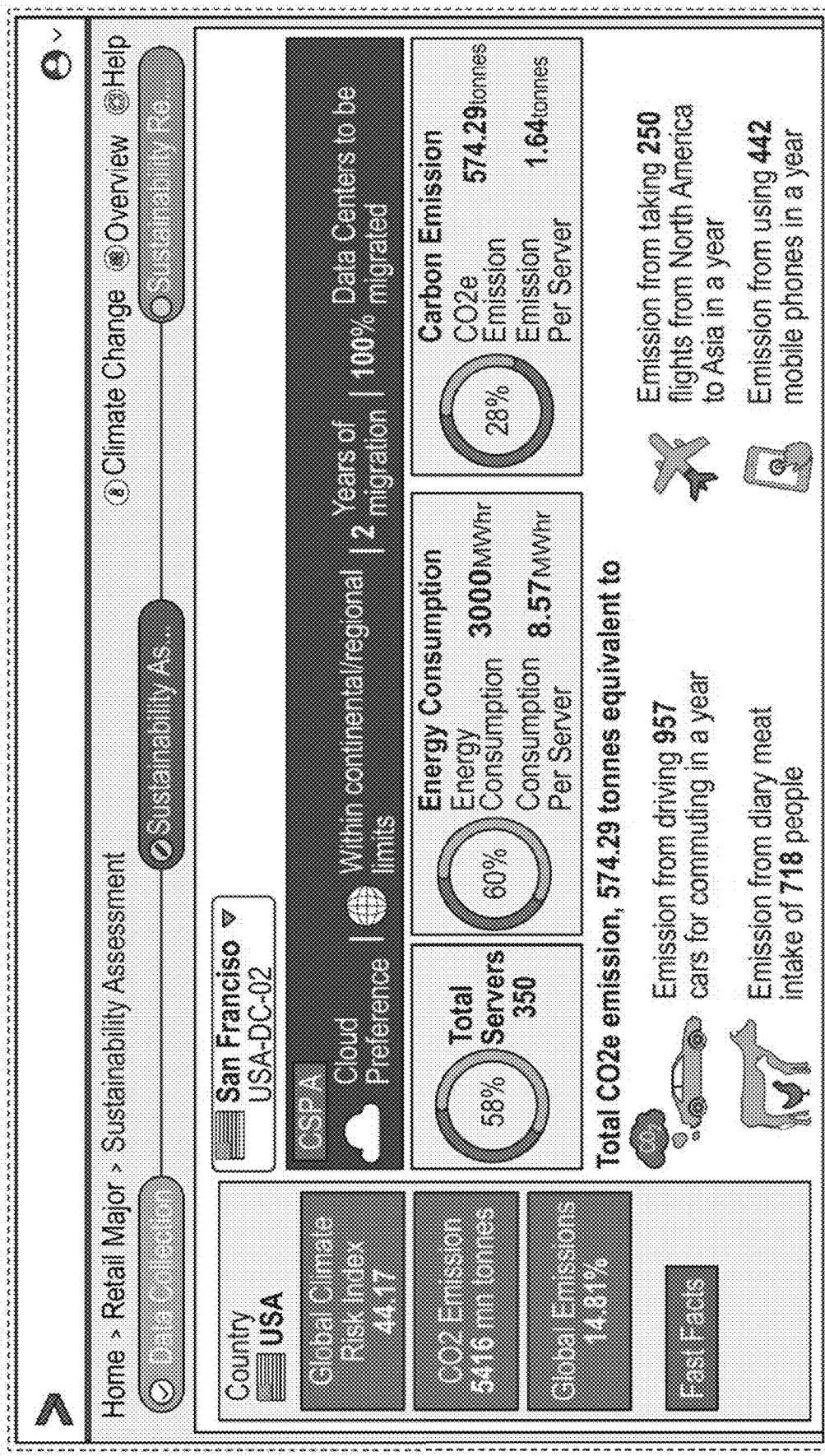
Figure 16D:
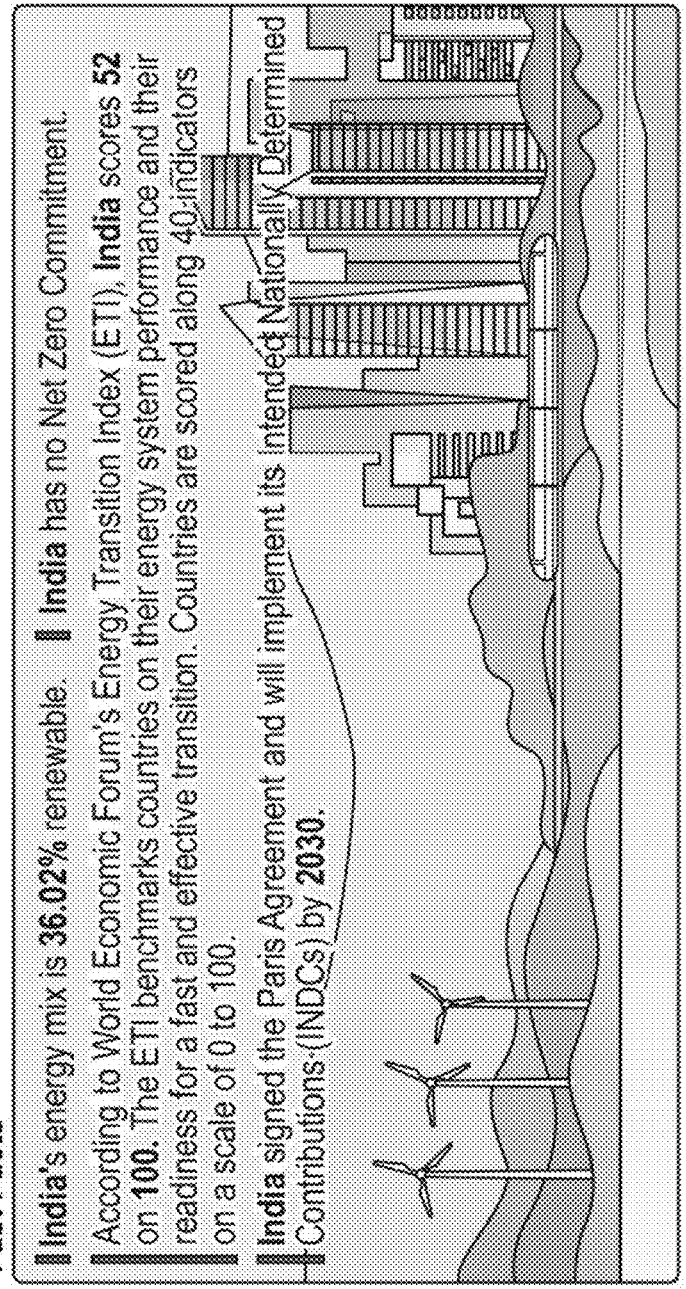
Figure 17A:
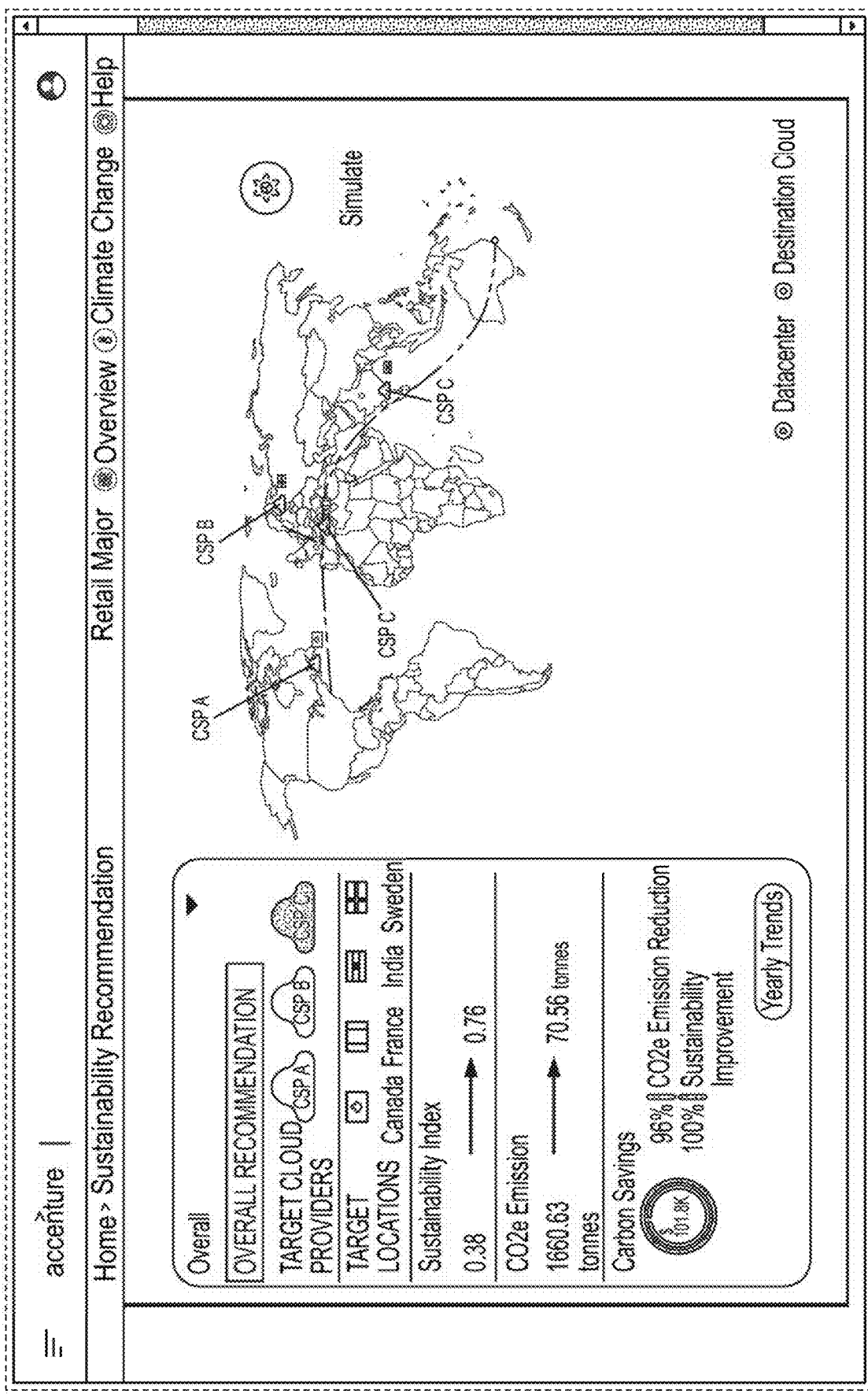
Figure 17B:
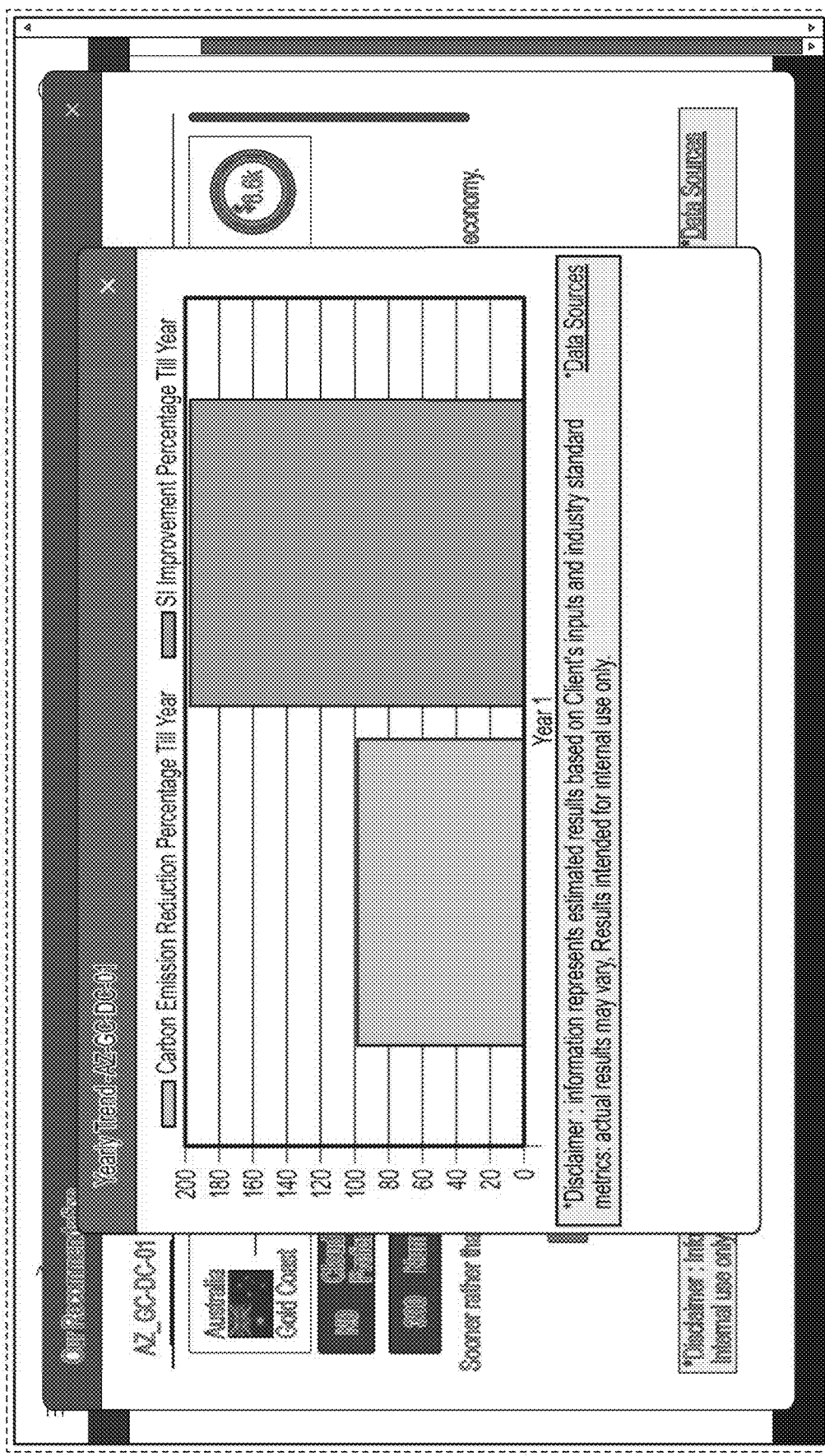
Figure 19:
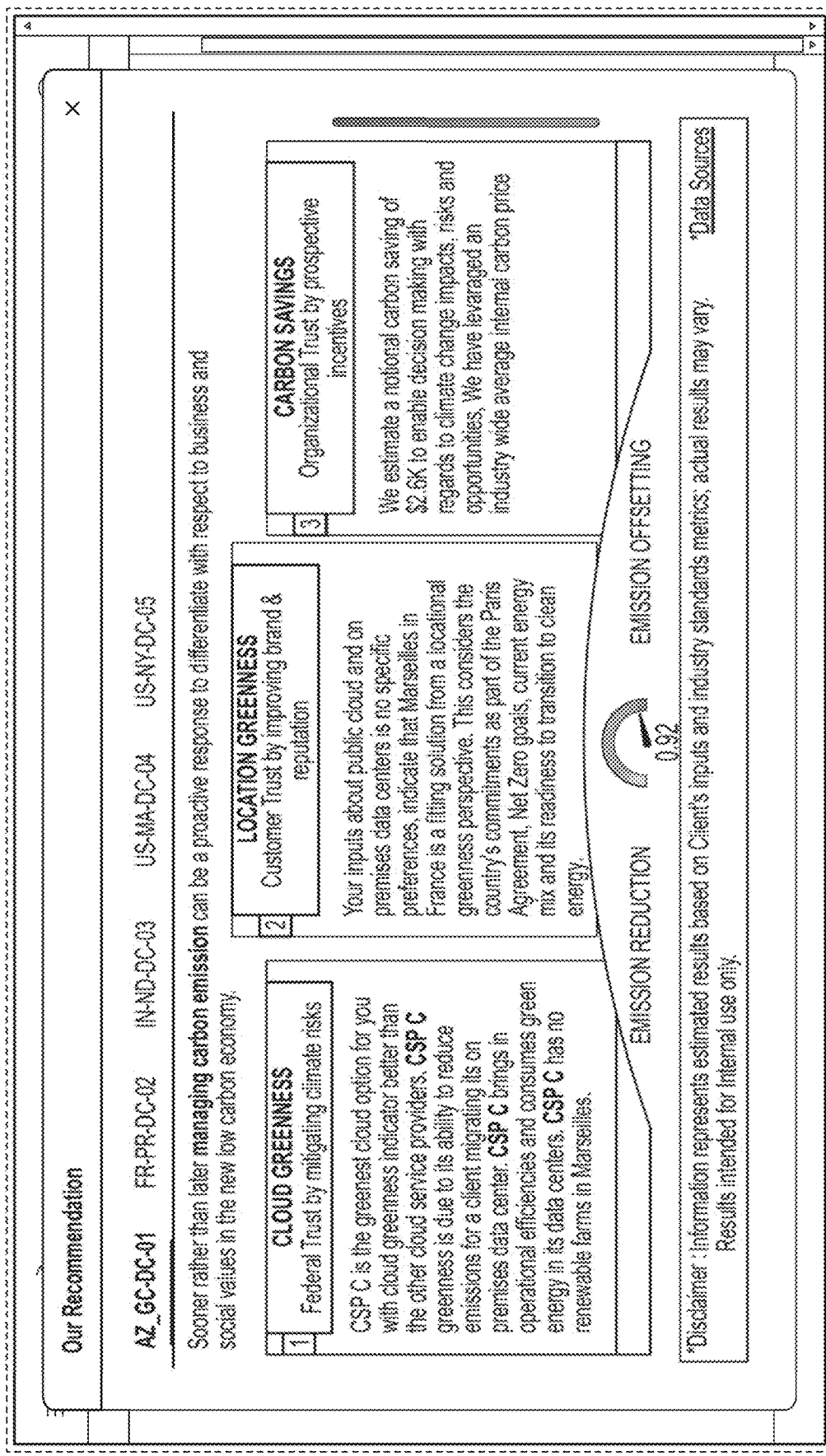
Figure 20:
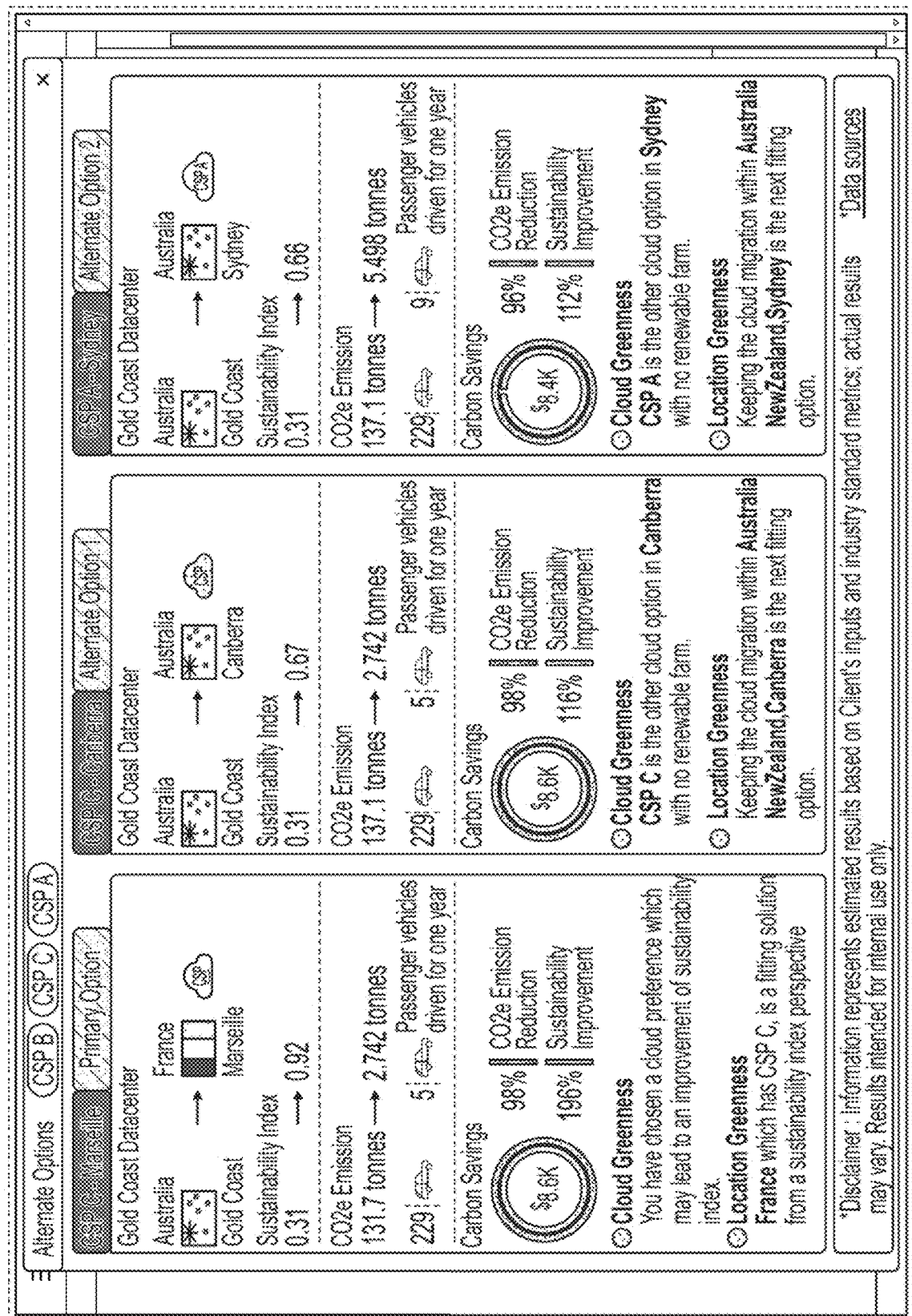
Figure 21B:
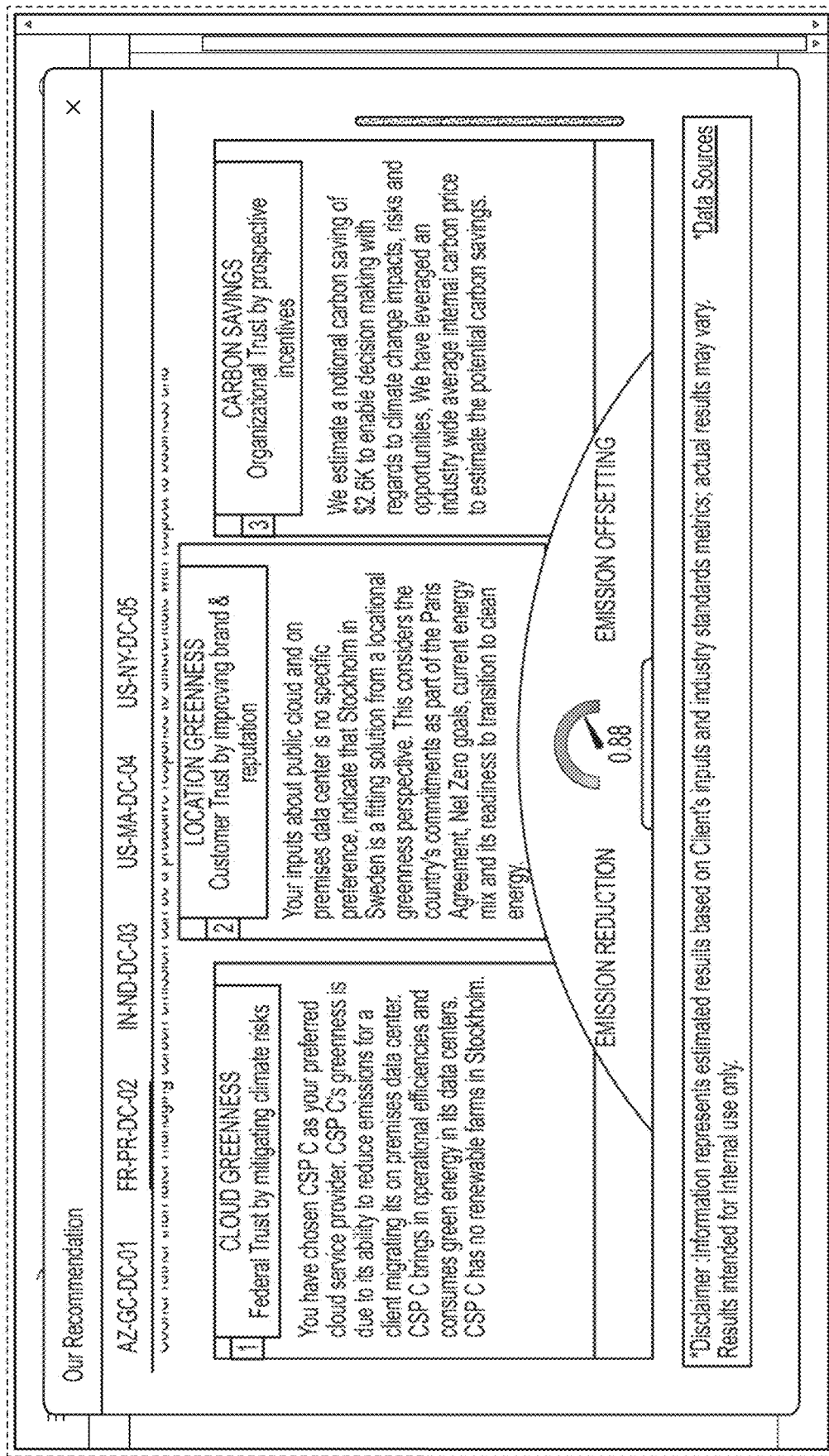
Figure 21C:
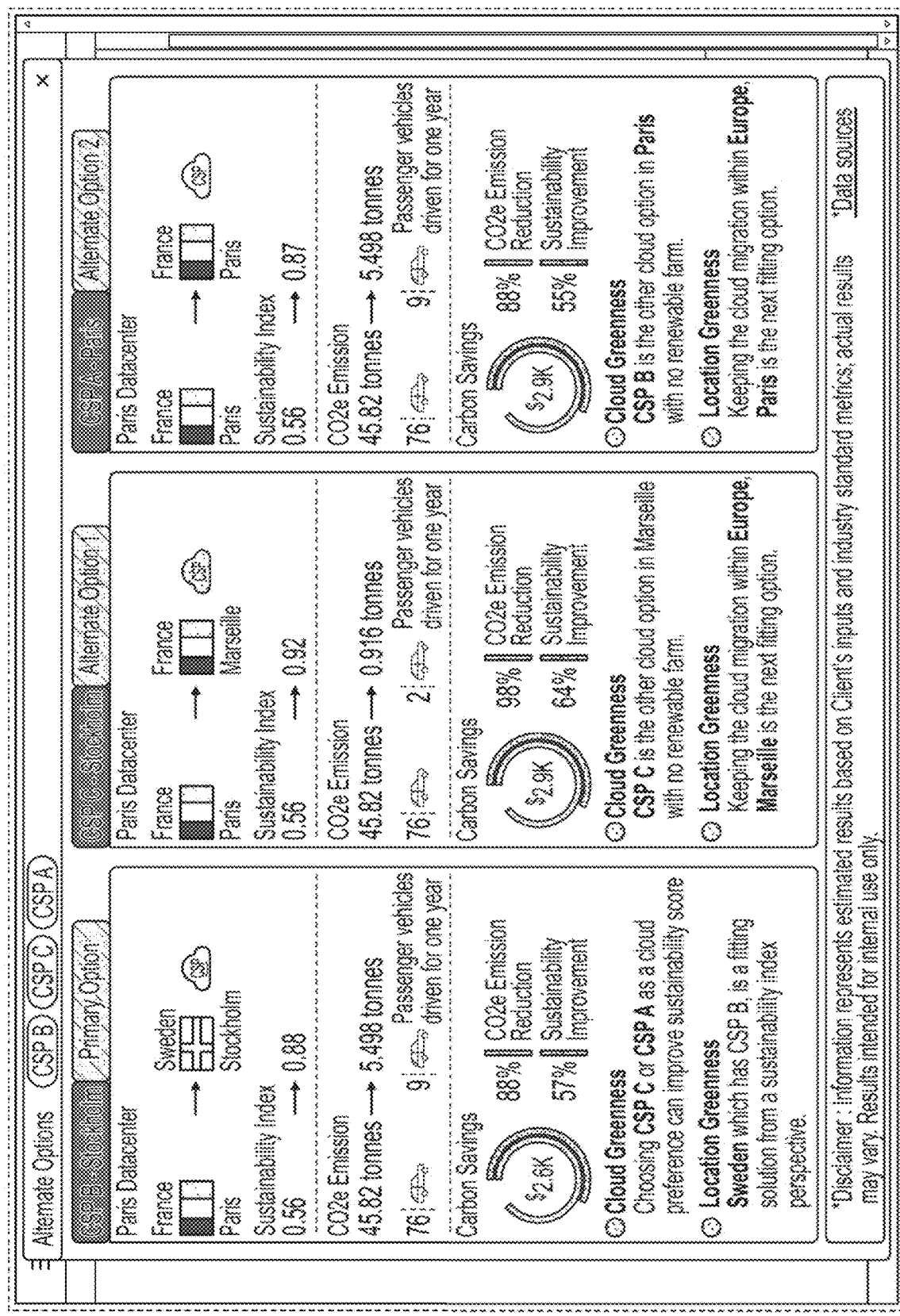
Figure 21D:
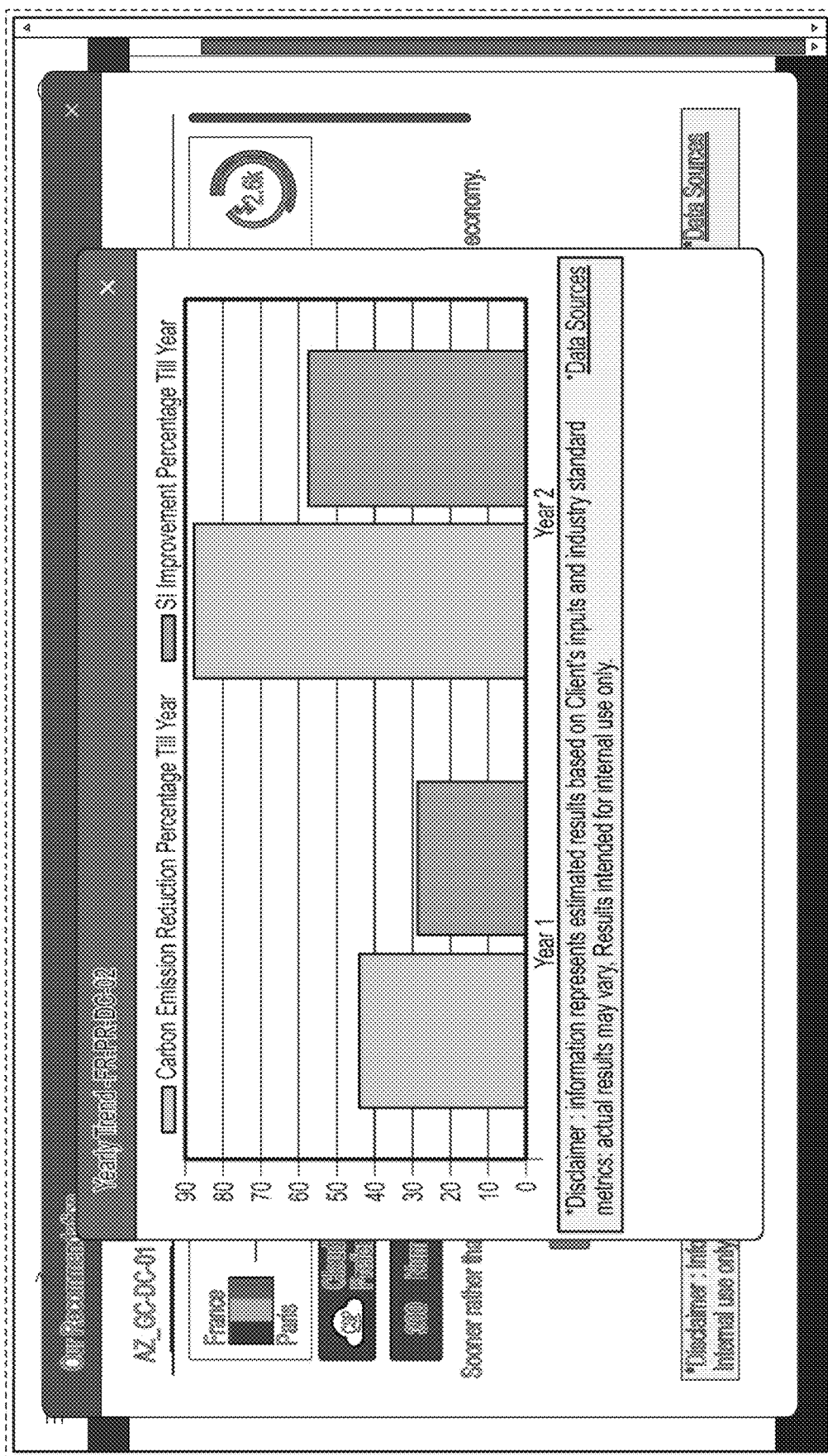
Figure 22A:
FIGS. 22A-29C show an example sequence of screens presented by a system similar or equivalent to the example system of FIG. 5.
Figure 22B:
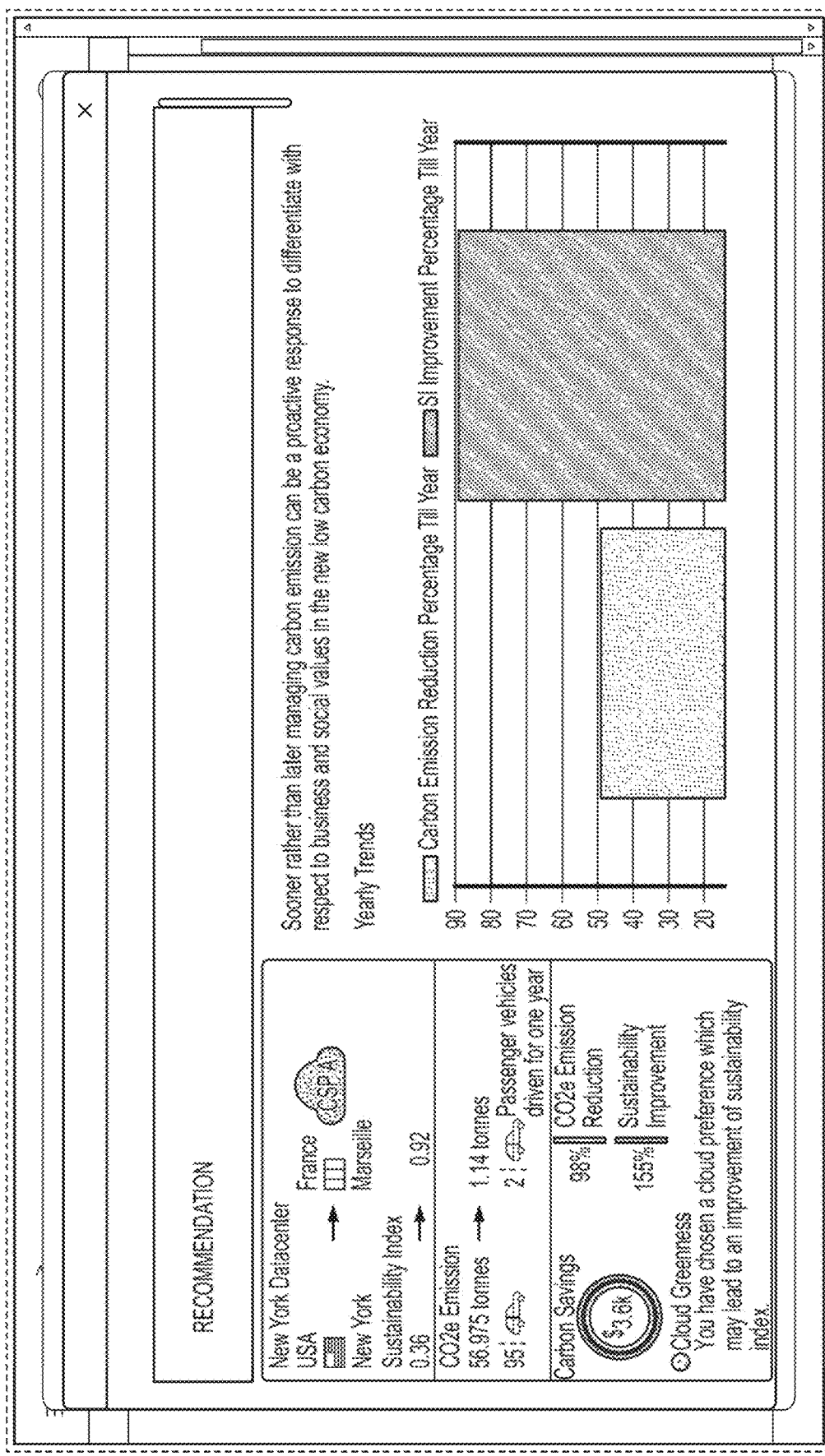
Figure 22C:
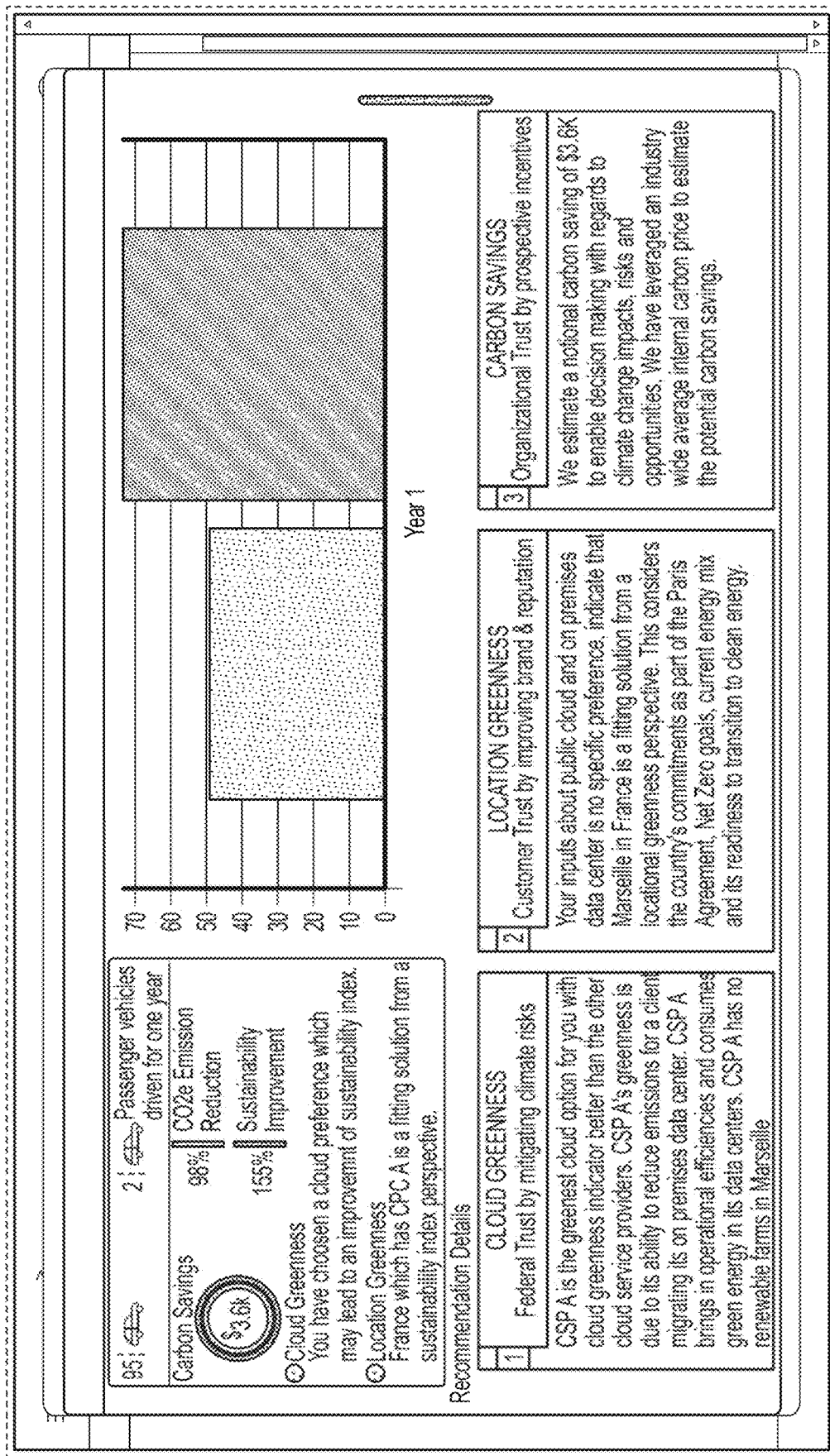
Figure 23:
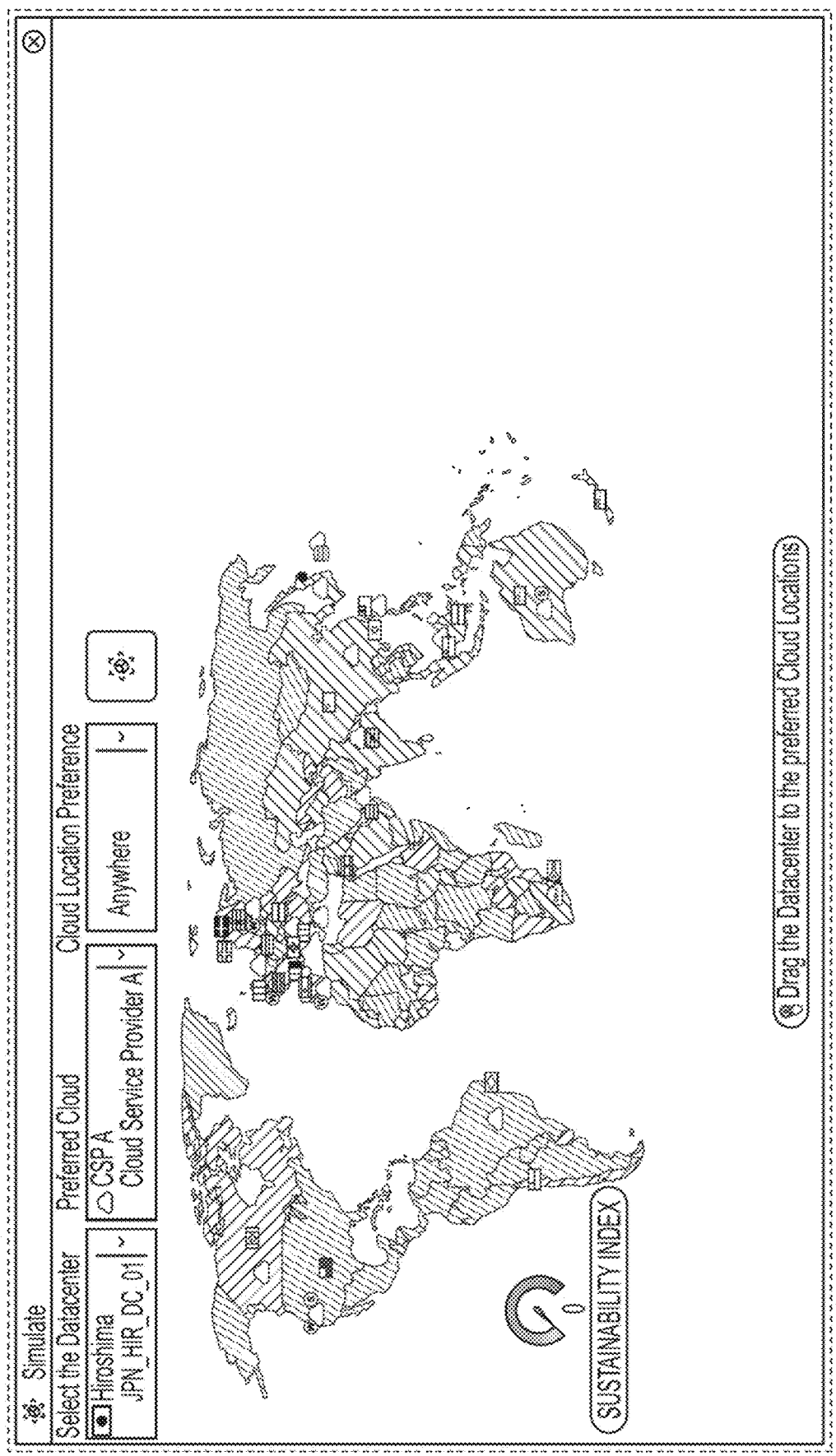
Figure 24:
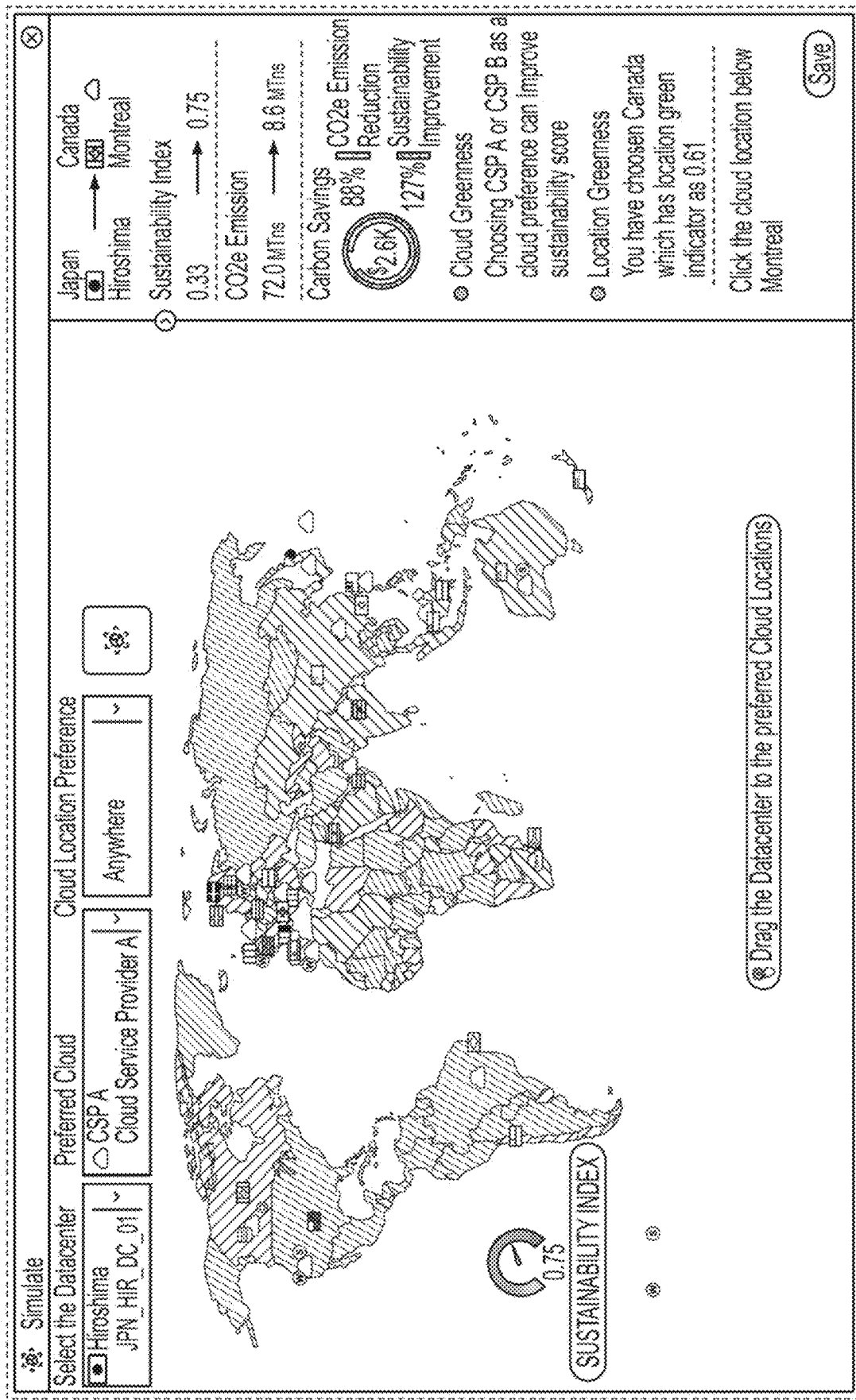
Figure 25:
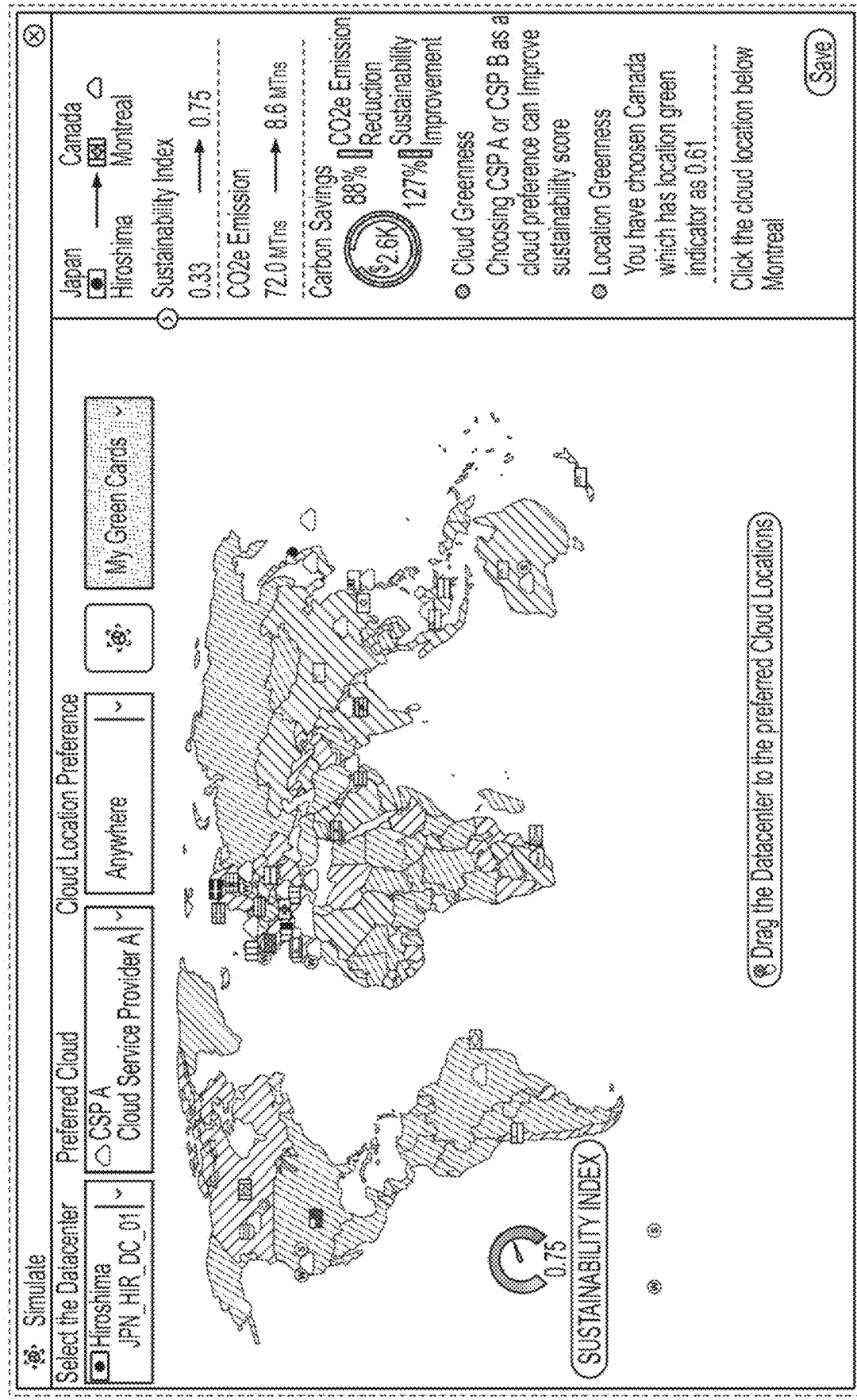
Figure 26:
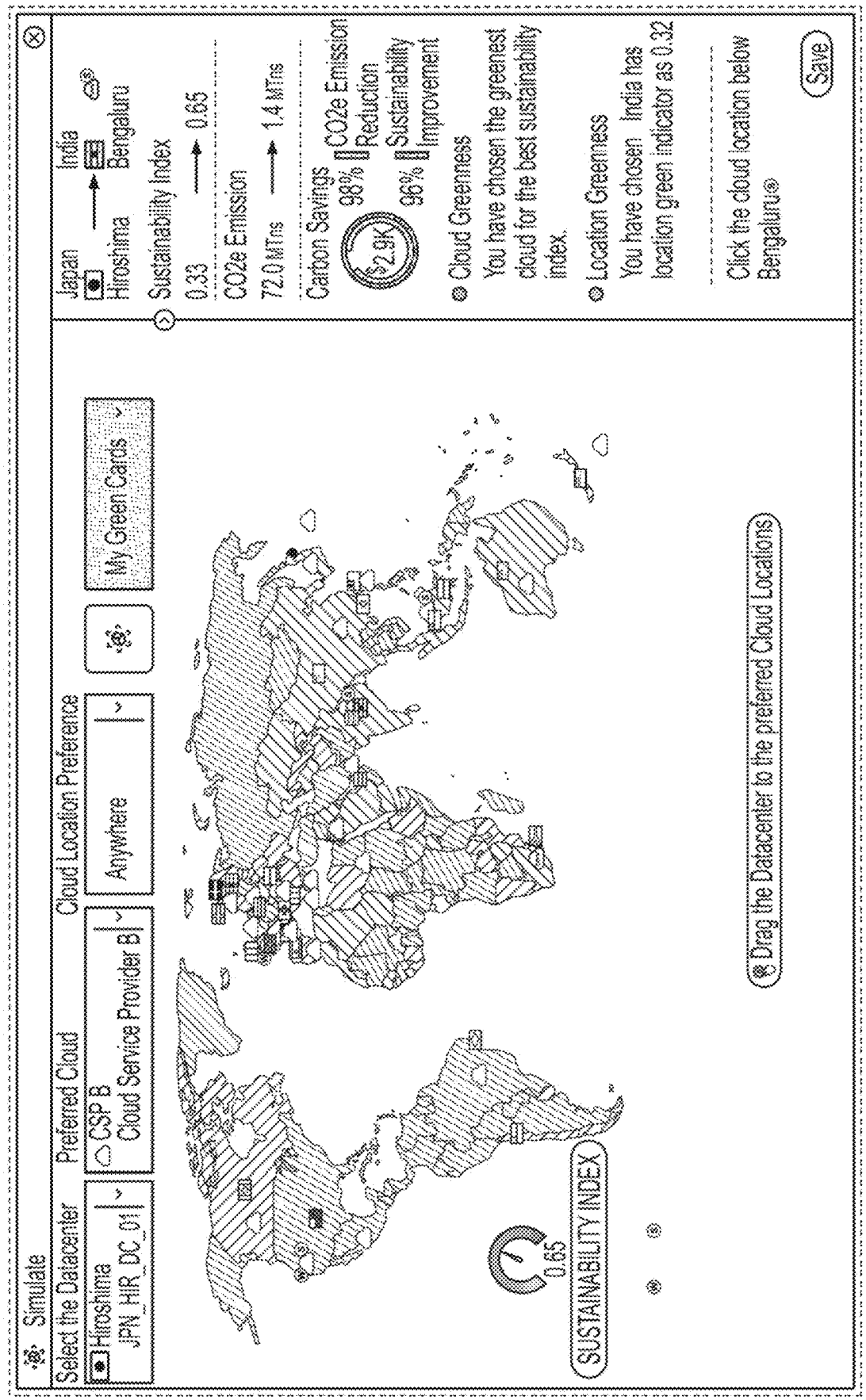
Figure 27:
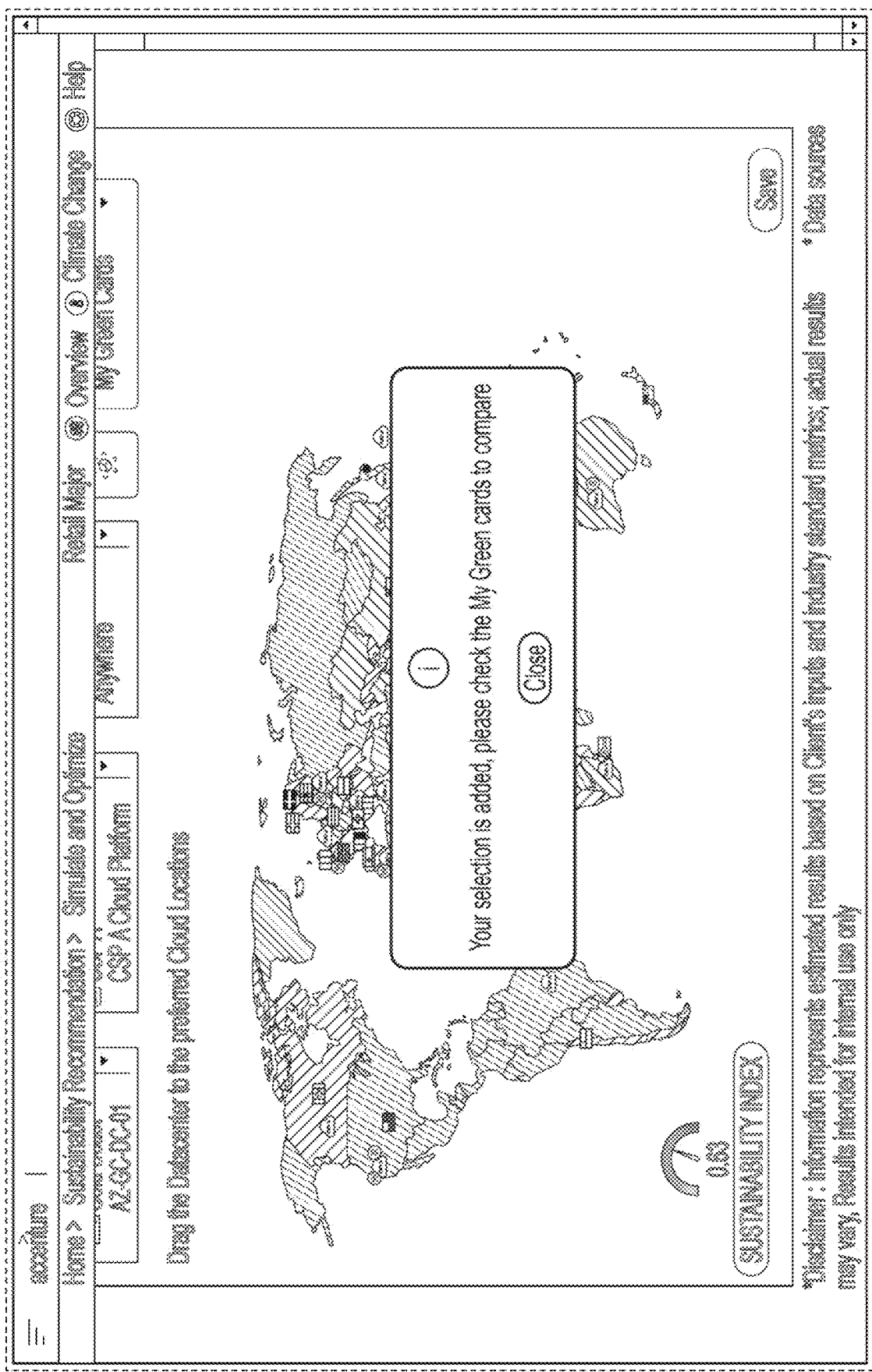
Figure 28A:
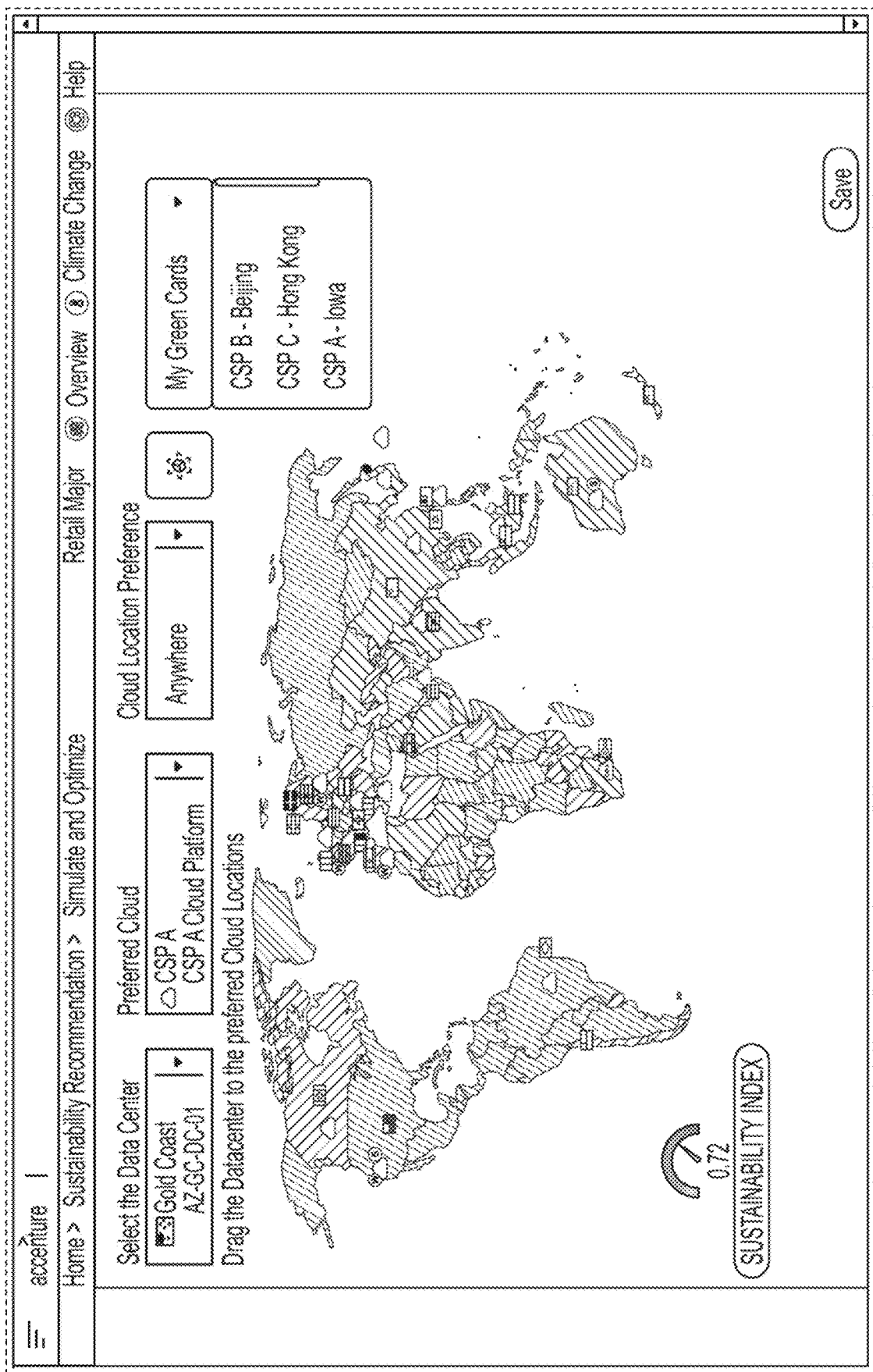
Figure 28B:
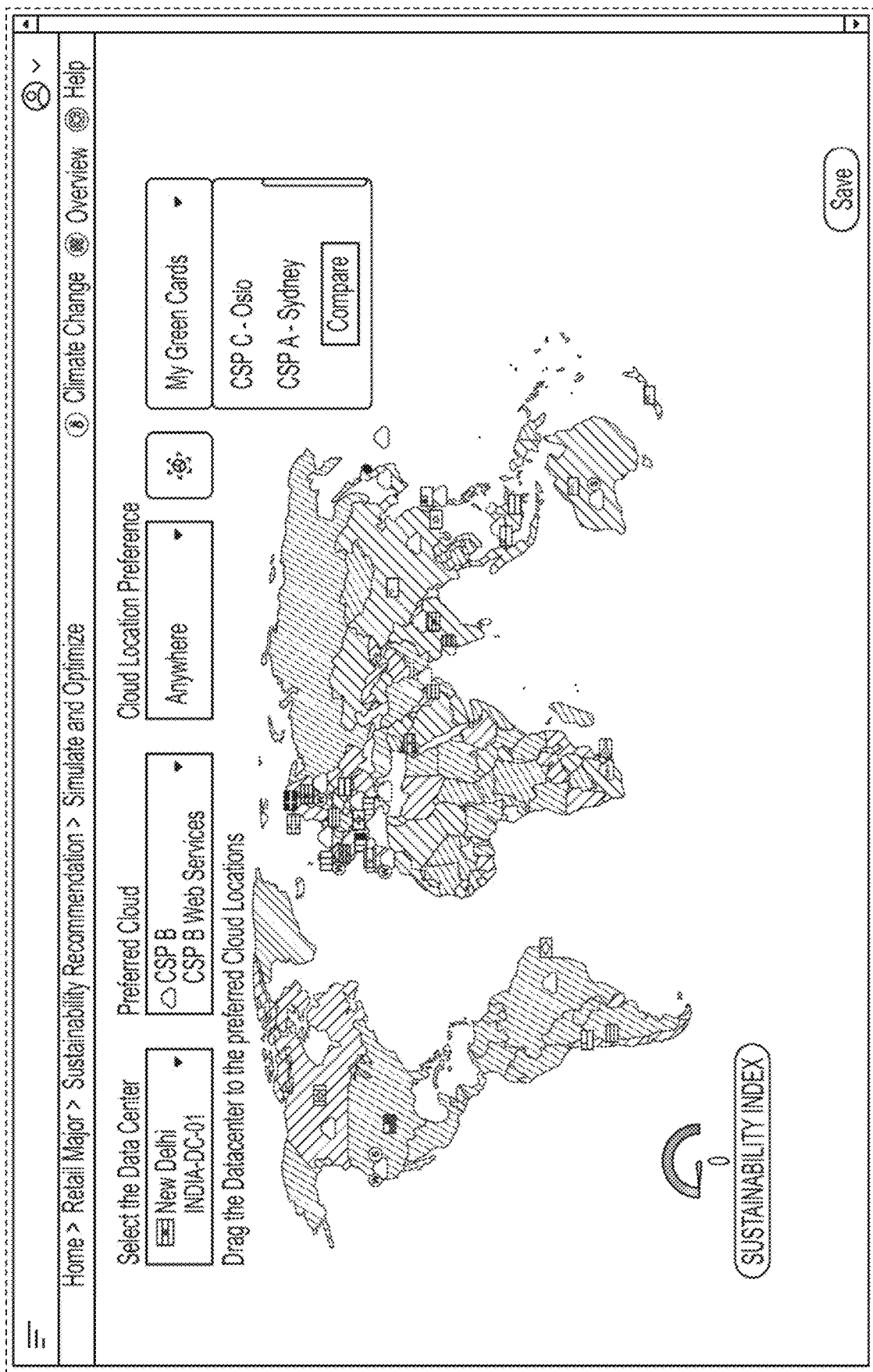
Figure 29A:
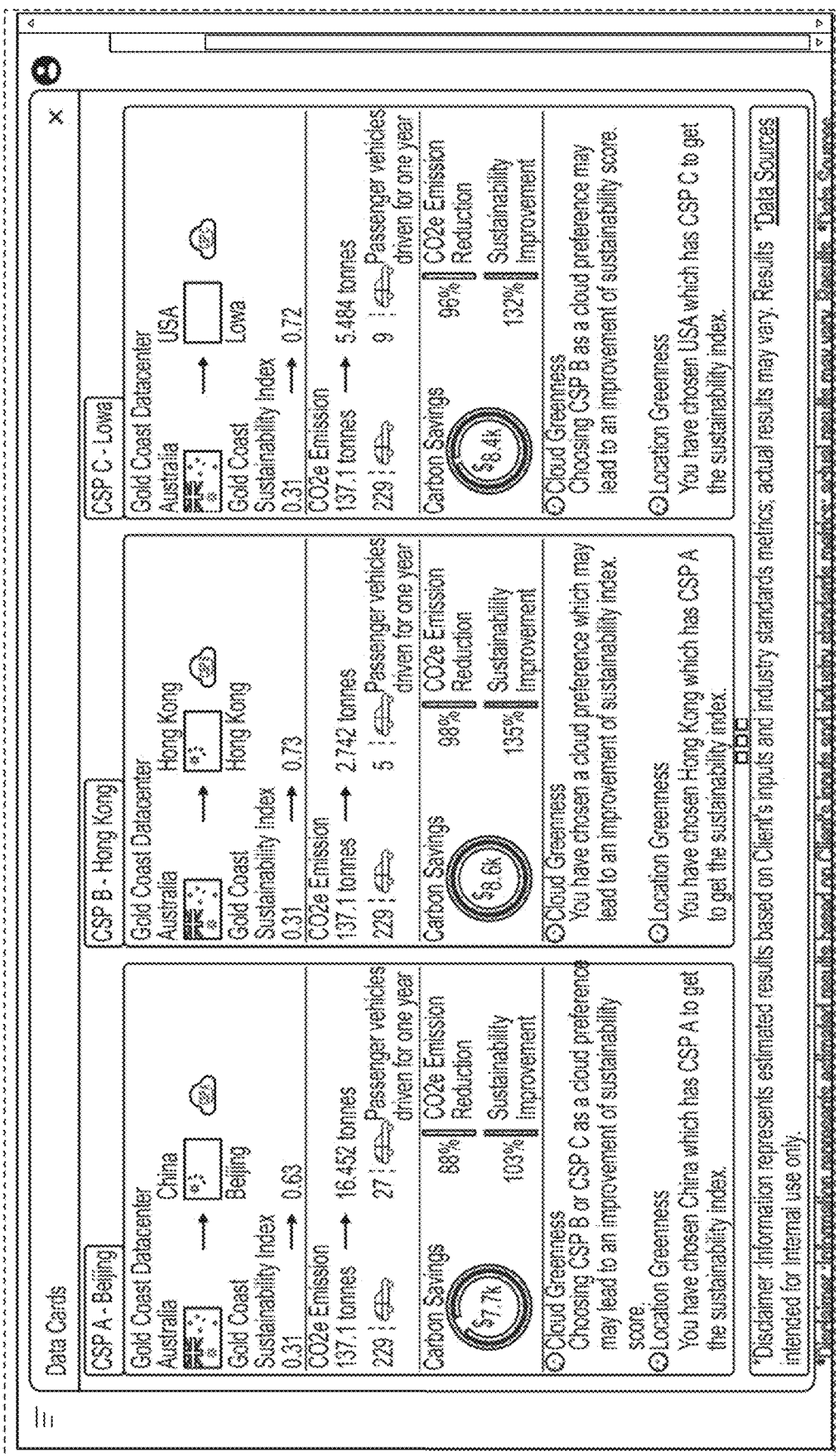
Figure 29B:
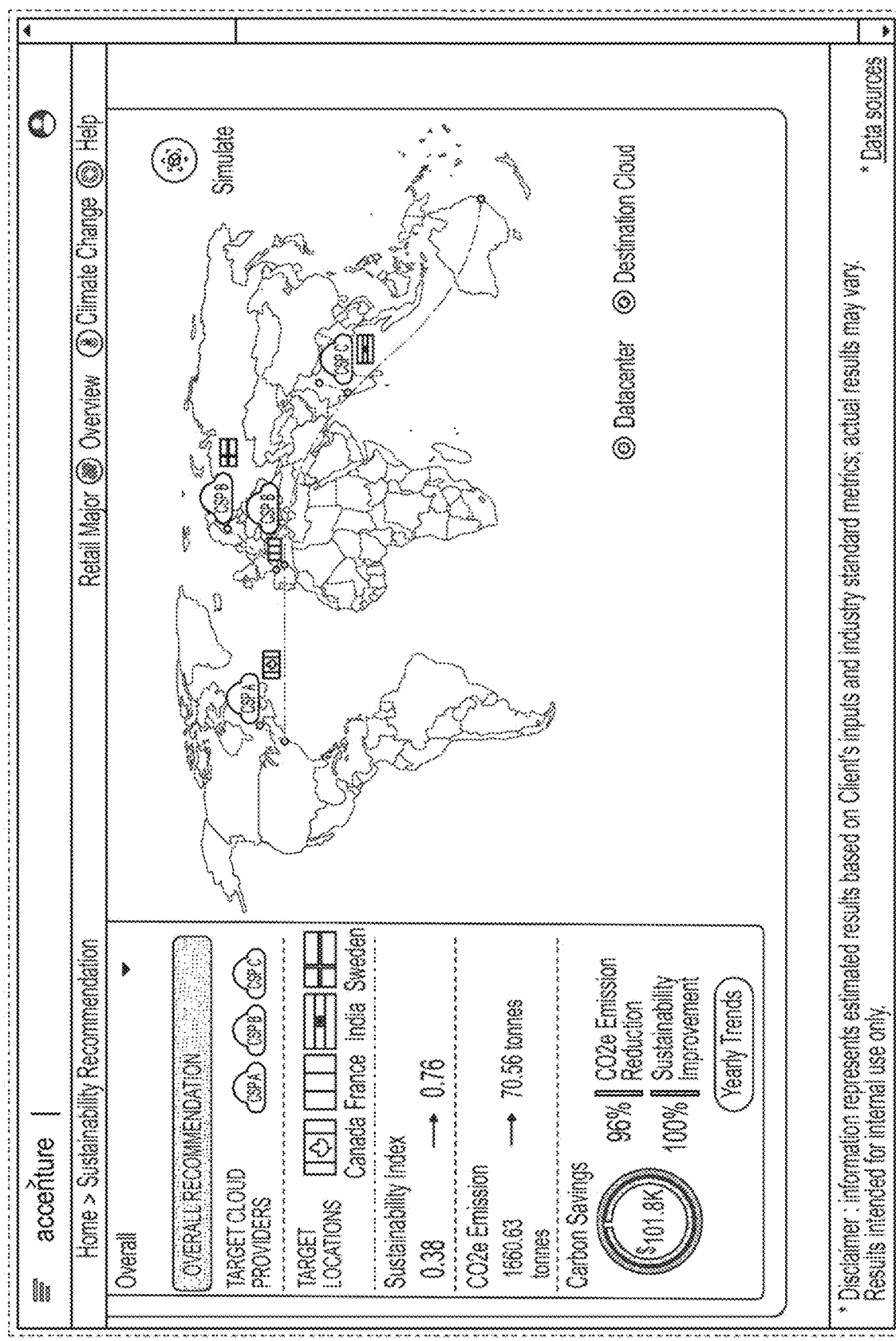
Figure 29C:
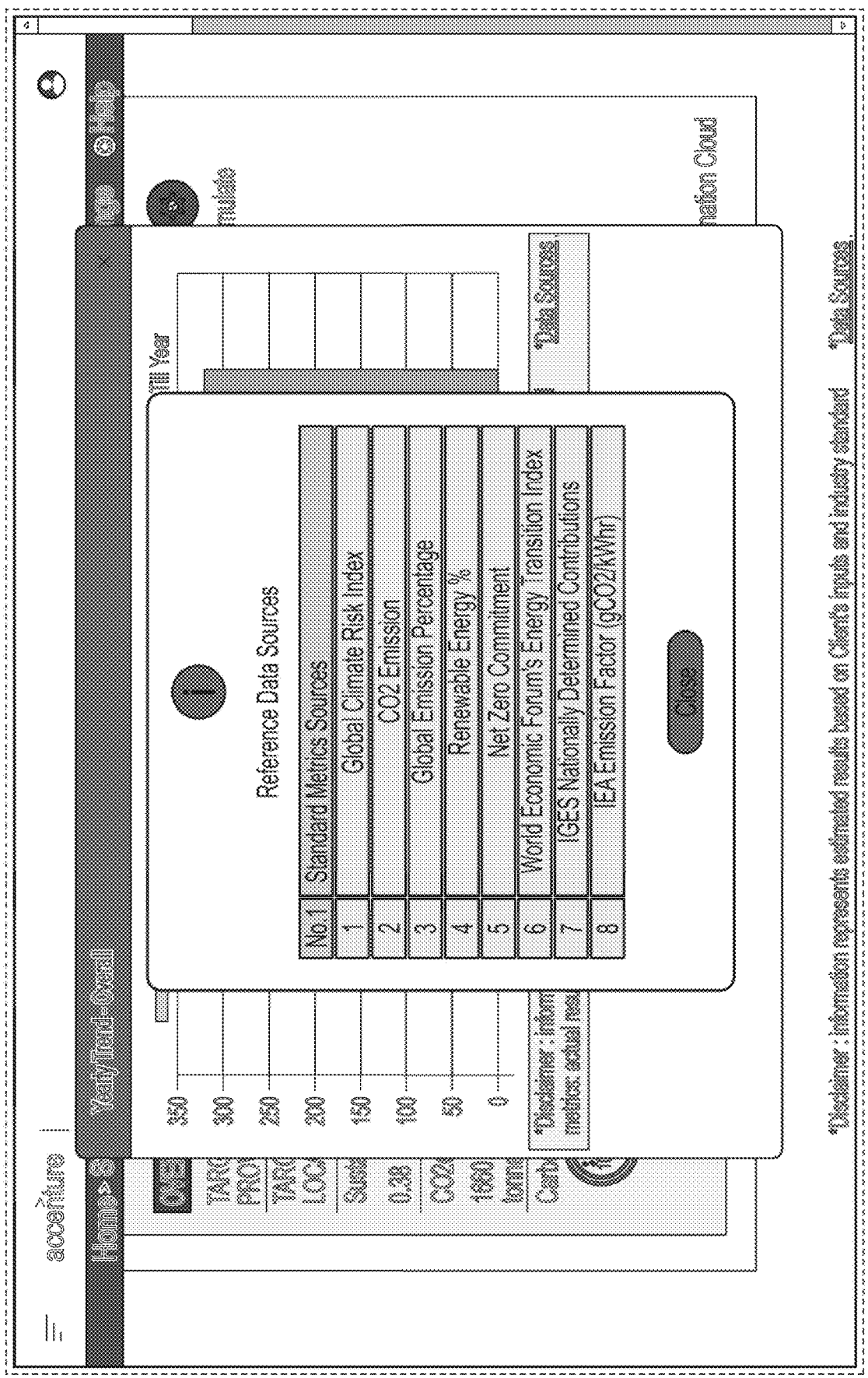
Figure 30:
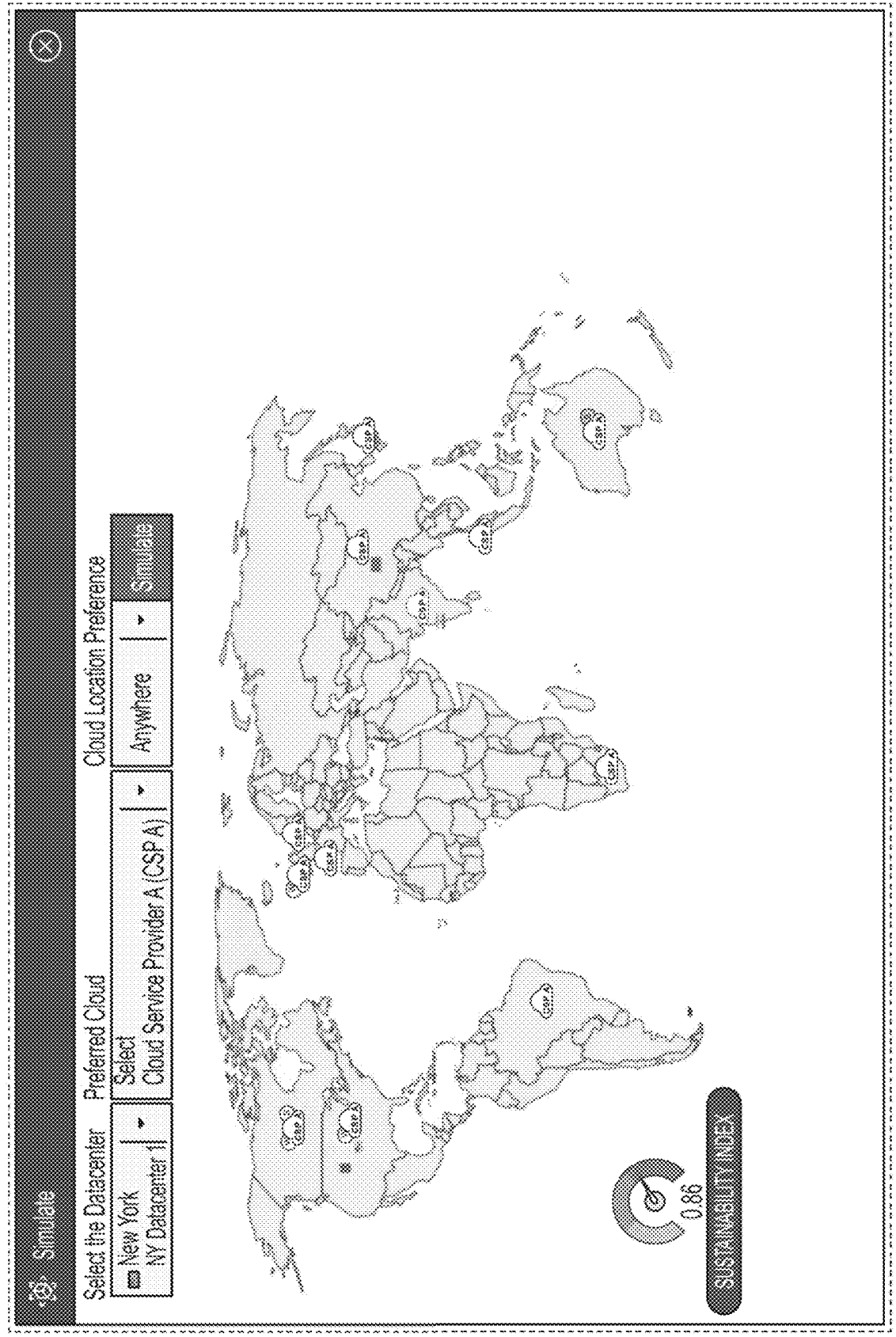
FIGS. 30-38 show another example sequence of screens presented by a system similar or equivalent to the example system of FIG. 5.
Figure 31:
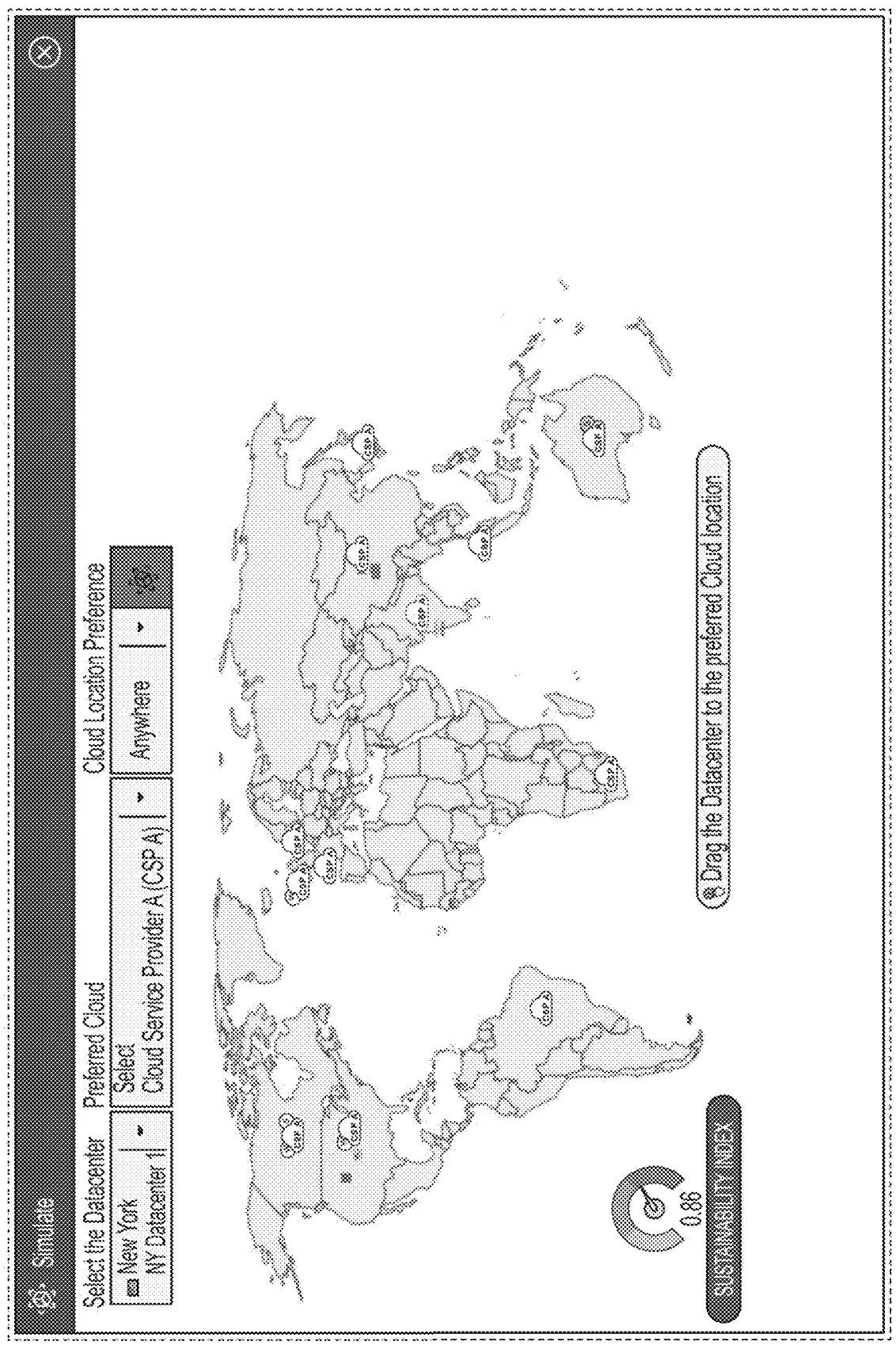
Figure 32:
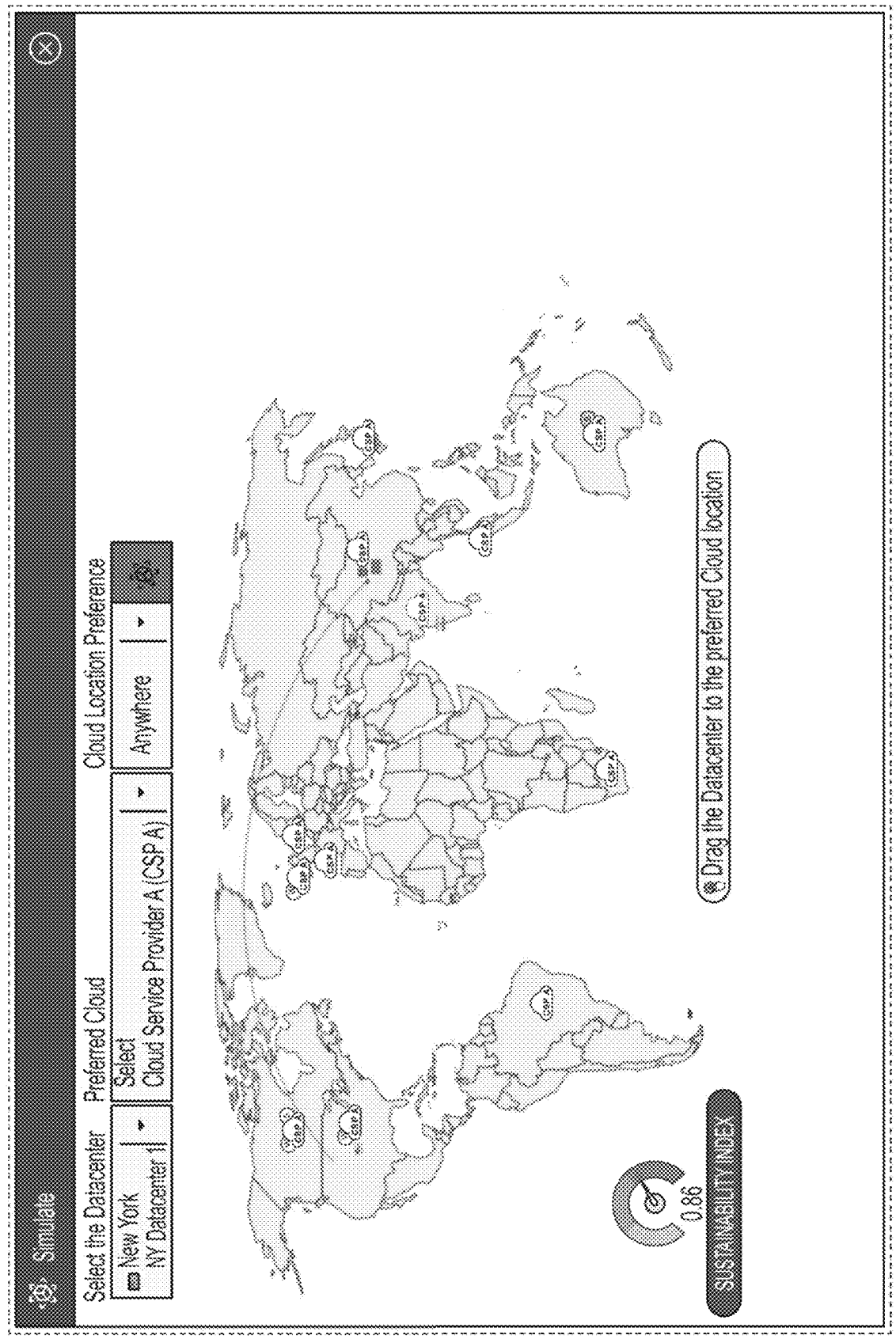
Figure 33:
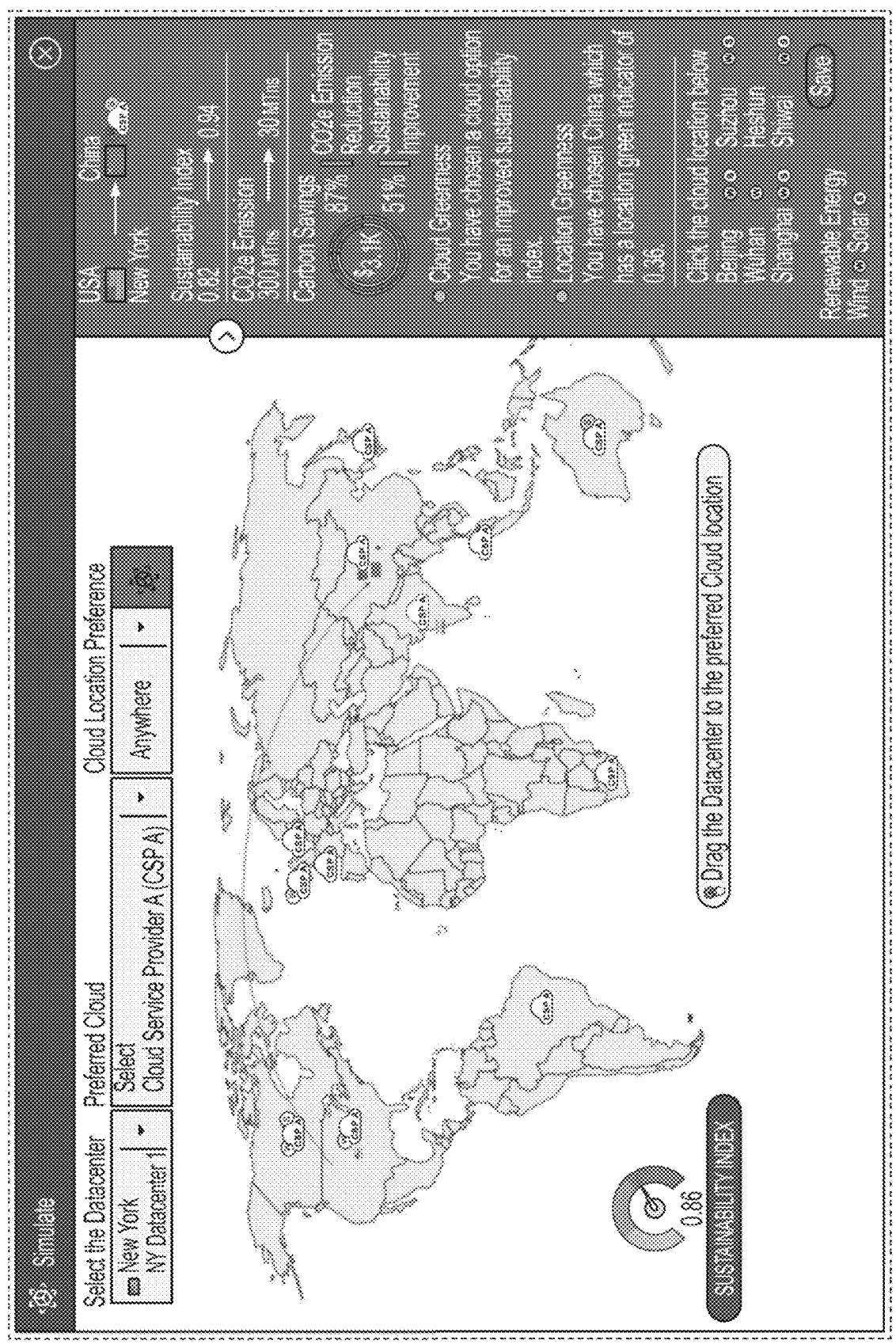
Figure 34:
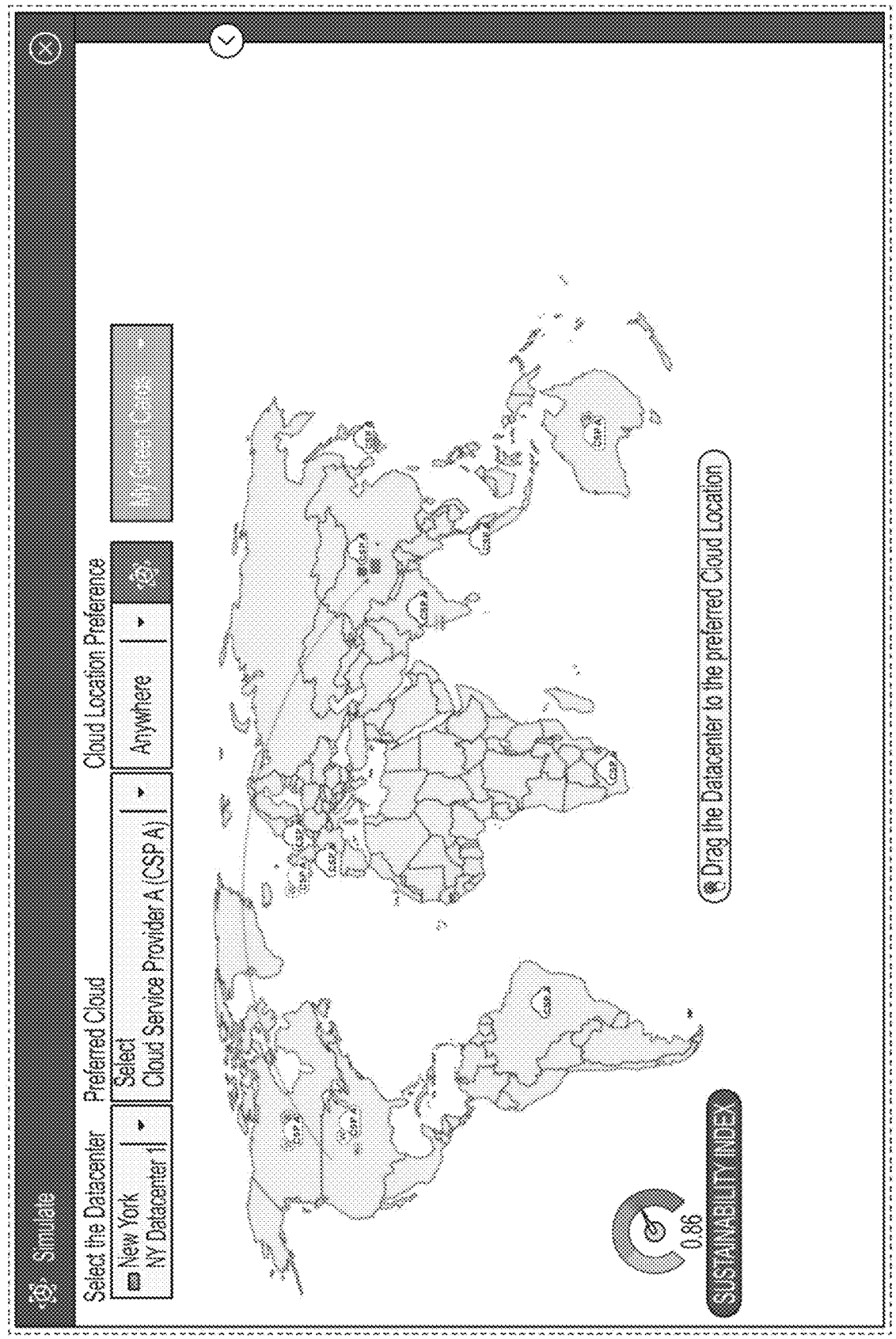
Figure 35:
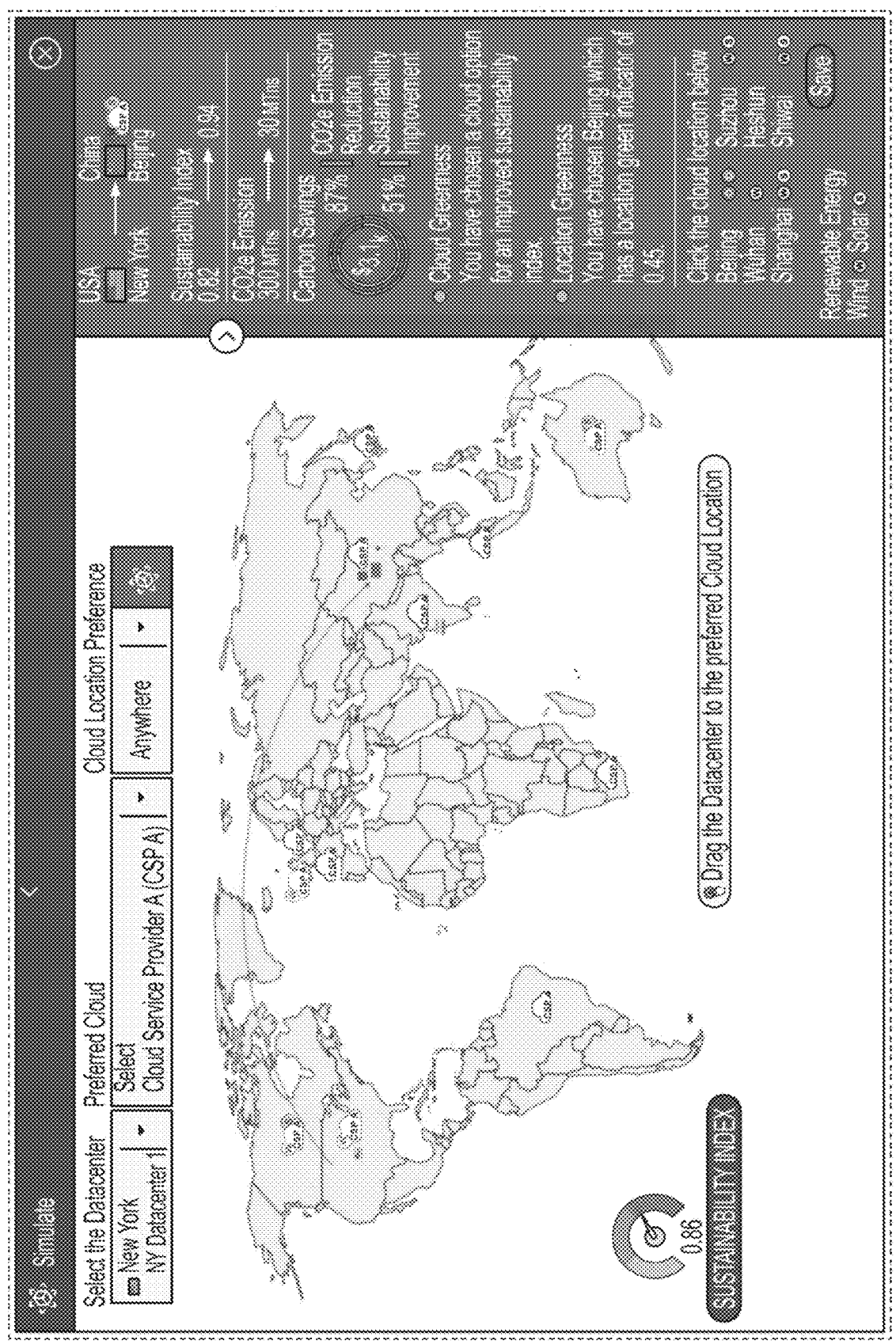
Figure 36:
Figure 37:
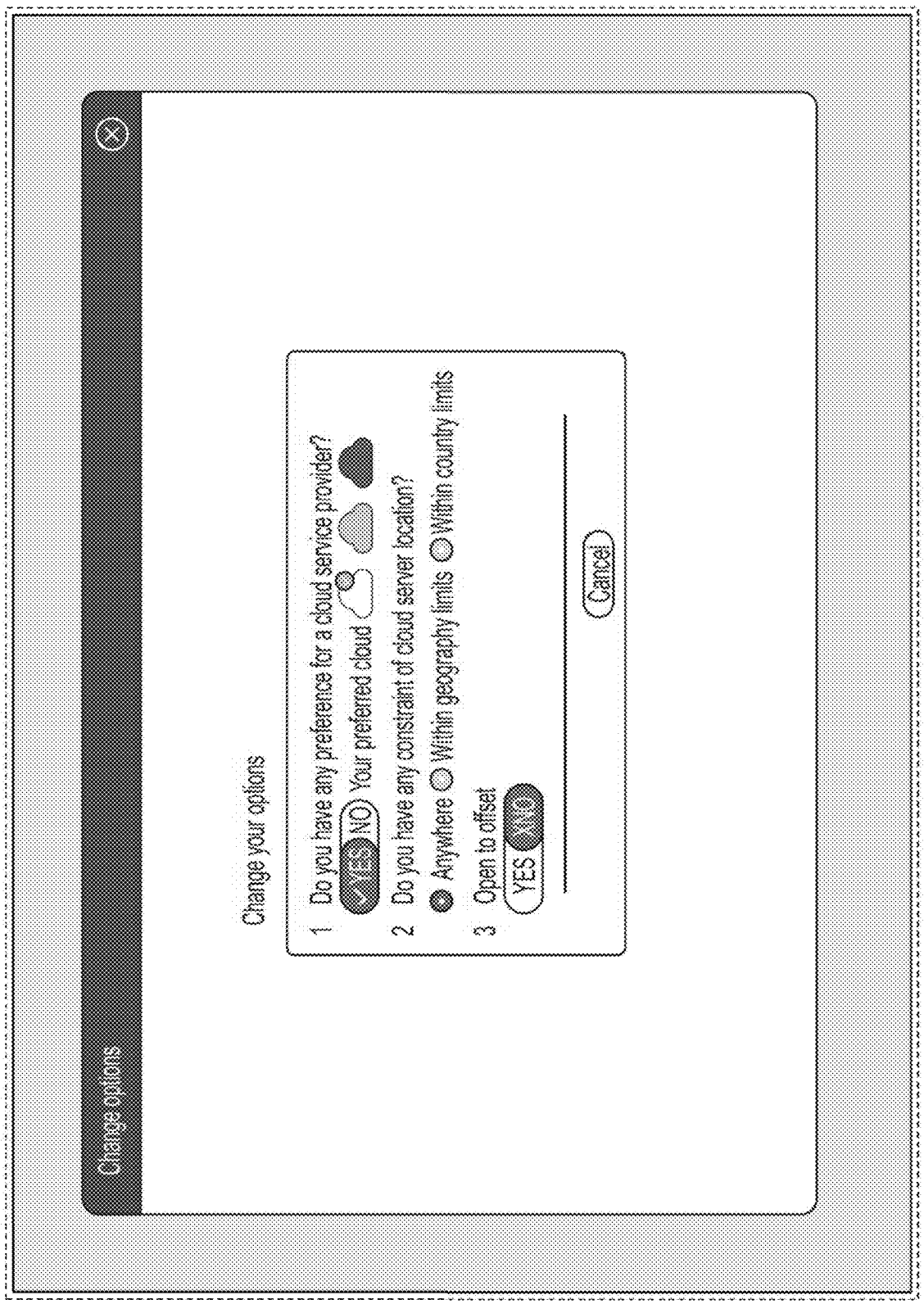
Figure 38:
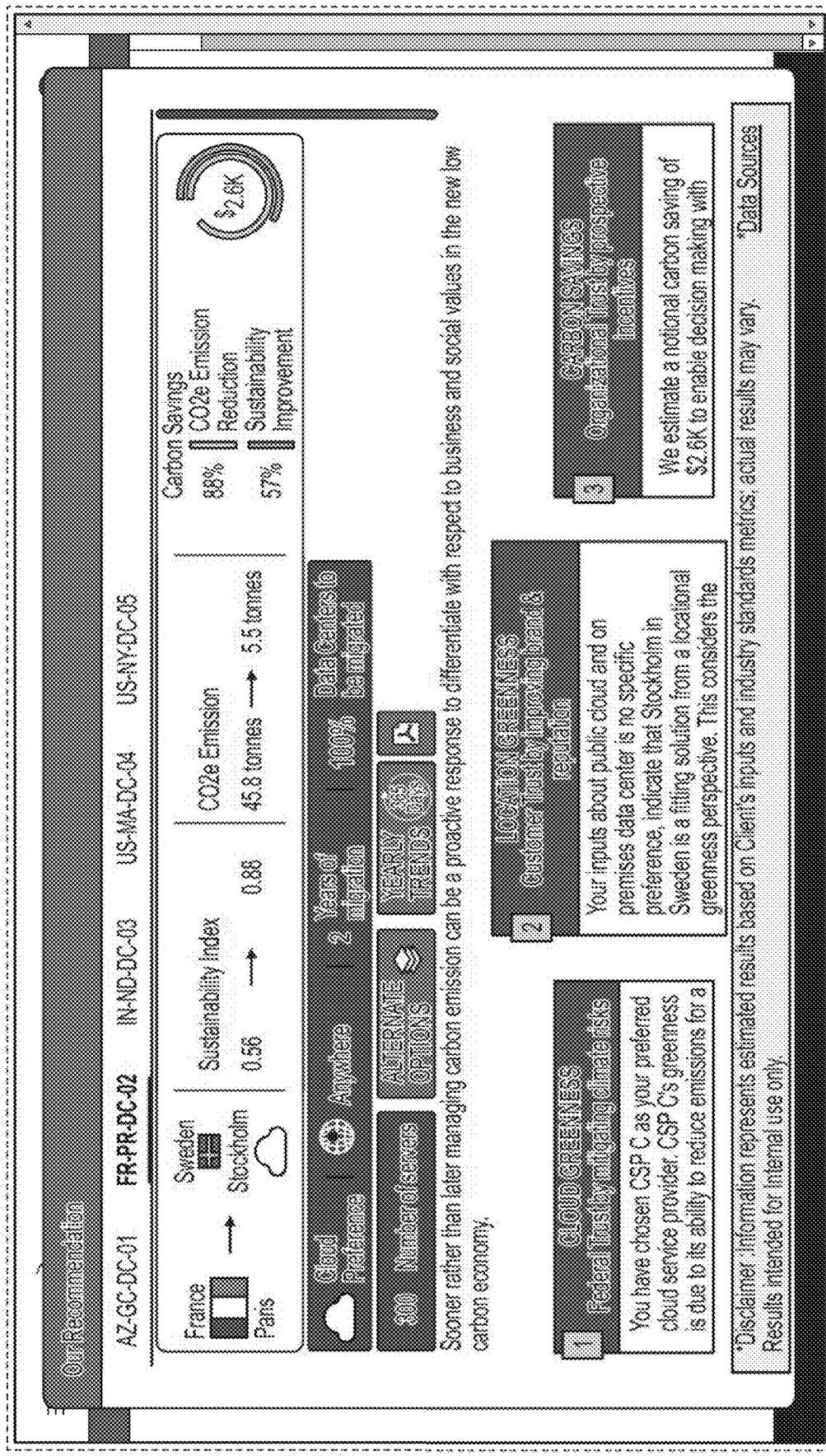

FIGS. 6A, and 6B show an example home screen presented by a system similar or equivalent to the Green Cloud Advisor system as described above with reference to one or more of FIGS. 1-5. In some examples, the screen depicted in FIG. 6A may be presented on a display of a computing device (e.g., associated with the user). A drop-down menu, as depicted in FIG. 6A, allows a user to select a client name and industry group from various possible options, e.g., consumer goods and retail, energy, financial services, etc. As depicted in FIG. 6B, a user may optionally select to retain or delete existing data from a previous session with the system.

FIGS. 7-21D show an example sequence of screens presented by a system similar or equivalent to the Green Cloud Advisor system as described above with reference to one or more of FIGS. 1-5. In some examples, the screens depicted in FIGS. 7-21D may represent a graphical user interface that is presented (e.g., on a display of a computing device) at each of various time-sequential stages based on user interaction with the graphical user interface. In general, the screens depicted in FIGS. 7-15D are associated with data collection processes as described above with reference to FIGS. 1-2 (e.g., as carried out at least in part by the data modelling engine of the Green Cloud Advisor system). More specifically, the screens depicted in FIGS. 7-11 are associated with the collection of data associated with data center locations (e.g., DC demographics data), the screens depicted in FIGS. 12A-13E are associated with the collection of data associated with a data center energy profile (e.g., DC energy profiling data, emission factors data, etc.), and the screens depicted in FIGS. 14A-15D are associated with the collection of data associated with migration preferences (e.g., DC migration strategy data).

As depicted in the screens depicted in FIGS. 7-15D, additional data entry items can be revealed based on a user indication (e.g., selecting "yes" or "no" in response to a question) of availability of data, e.g., whether or not the user is able or willing to provide answers to particular questions. As such, the Green Cloud Advisor system may adjust the algorithms utilized to generate customized CSP migration recommendations and sustainability index calculations based in part on answers provided by a user.

As depicted in FIGS. 14A-15D, migration preferences can include questions related to percentages of each DC to be migrated to a CSP, and further percentages to be migrated to cloud, colocation, retiring, and/or retaining options. Selection of each of the options to migrate to cloud, colocation, retiring, and retaining can reveal additional questions for data entry by the user to specify preferences for the option.

The screens depicted in FIGS. 16A-18 are associated with sustainability assessment processes as described above with reference to FIGS. 1 and 3 (e.g., as carried out at least in part by the sustainability analysis engine of the Green Cloud Advisor system). FIGS. 16A-18 depicts a screen displaying an initial sustainability assessment of the entered DCs including a total number of servers, energy consumption of the total number of servers, and CO2 emission of the total number of servers. A user may select one or more of the DCs presented on the global map in the user interface to reveal additional details about the selected DC.

Similarly, the screens depicted in FIGS. 17-21D are associated with sustainability recommendation processes as described above with reference to FIGS. 1 and 4 (e.g., as carried out at least in part by the sustainability recommendation engine of the Green Cloud Advisor system). The sustainability recommendation presented to a user in the user interface can include a target migration locations, a calculated sustainability index, CO2 emission reduction, carbon savings (e.g., CO2 emission reduction and sustainability improvement) determined for the target migration locations. A user may select to display a sustainability recommendation on a per DC basis, as depicted in FIGS. 18-22C. A sustainability recommendation for each DC can include a presentation of user indicated preferences for the DC and sustainability index calculation, CO2e emission, and carbon savings for the recommended CSP migration strategy. Alternative options for CSP migration for each DC can be presented to the user, where sustainability index, CO2e emission, and carbon savings for each alternative CSP migration strategy can be presented to the user. A user may select to view yearly trends (e.g., one year or multiple years) for each of the CSP migration strategies for a selected DC, including a carbon emission reduction percentage per year and sustainability index improvement percentage per year.

FIGS. 22A-29C show an example sequence of screens presented by a system similar or equivalent to the example system of FIG. 5, FIGS. 30-38 show another example sequence of screens presented by a system similar or equivalent to the example system of FIG. 5. In some examples, the screens depicted in FIGS. 22A-29C and/or 30-38 may represent a graphical user interface that is presented (e.g., on a display of a computing device) at each of various time-sequential stages based on user interaction with the graphical user interface. In these two examples, the presentation of the graphical user interface may at least in part be managed by one or more engines that are similar or equivalent to the simulation engine of FIG. 5. In general, the screens depicted in FIGS. 22A-29C and/or 30-38, may represent a graphical user interface that is leveraged by a user to perform one or more simulations in which one or more cloud computing frameworks are deployed in place of computing resources of one or more existing datacenters. As depicted in FIGS. 22A-29C and/or 30-38, the graphical user interface may provide the user with one or more visualizations and a dashboard to communicate the various pros and cons of the one or more cloud computing frameworks evaluated by the user. Furthermore, as depicted in FIGS. 22A-29C and/or 30-38, the graphical user interface may include several user input elements that allow the user to specify and adjust various parameters of the simulation (e.g., selected datacenter, preferred cloud service provider, preferred location of cloud computing framework, etc.).

In general, as described above with reference to FIG. 5, a user may interact with a simulation environment presented in the user interface, as depicted in FIGS. 22A-29C and/or 30-38, to specify parameters for DCs that they are looking to migrate, specify preferences for CSP migration (e.g., preferred locations, etc.). The user may interact with entities representative of the DC and/or CSP presented in the simulation environment (e.g., perform "drag and drop" operations) to indicate additional and/or alternative preferences for CSP migration.

The user may select to simulate the results of the CSP migration based on a current set of preferences/parameters indicated through the user interface, where the simulation engine generates a set of one or more green cards based on the set of preferences/parameters and a current configuration of the one or more algorithms utilized by the system.

Results of the simulation, e.g., generated green cards, can be presented in a dashboard of the user interface, where the user may select to revisit the previous set of preferences/parameters and generate an updated set of preferences/parameters. The updated set of preferences/parameters may then be utilized by the system to update the algorithms in real-time to generate an updated CSP migration strategy.

The user may select to save updated preferences as multiple iterations of the simulation environment are explored, in order to review and compare multiple CSP migration strategies (e.g., multiple green cards).

FIG. 39 is a flow diagram of an example process 4100 for generating customized recommendations for environmentally-conscious cloud computing frameworks for replacing computing resources of existing datacenters. For convenience, the process 4100 will be described as being performed by a system of one or more computers, located in one or more locations, and programmed appropriately in accordance with this specification. For example, the Green Cloud Advisor system as described above with reference to one or more of FIGS. 1-5, appropriately programmed, can perform the process 4100.

The system receives a first set of data indicating one or more characteristics of an existing datacenter (step 4110). For example, this may correspond to the Green Cloud Advisor system of one or more of FIGS. 1-5 receiving client DC input data. In some implementations, the system may receive the first set of data through a user interface. In some examples, the user interface may correspond to the Green Cloud Advisor interface depicted in one or more of the screens depicted in FIGS. 7-40, and the first set of data may correspond to data received in one or more of the screens depicted in FIGS. 7-13E (e.g., "Data Center Locations" and "Data Center Energy Profile" screens) and/or one or more of the screens depicted in FIGS. 23-29 (e.g., "Simulate" screens).

The system receives a second set of data indicating one or more preferred characteristics of a cloud computing framework for replacing computing resources of the existing datacenter (step 4120). For example, this may correspond to the Green Cloud Advisor system of one or more of FIGS. 1-5 receiving client DC input data (e.g., DC migration strategy data). In some examples, the second set of data may correspond to data received in one or more of the screens depicted in FIGS. 14A-15D (e.g., "Migration Preferences" screens) and/or one or more of the screens depicted in FIGS. 22A-29C, 30-38, (e.g., "Simulate" screens). In some implementations, the system may also receive the second set of data through the user interface.

The system determines a first set of one or more measures for the existing datacenter based on the first set of data (step 4130). In some implementations, the first set of one or more measures may include a measure of environmental sustainability associated with the existing datacenter. In some examples, this may correspond to one or more processes performed by the sustainability analysis engine as described above with reference to FIGS. 1 and 3.

The system identifies one or more candidate computing frameworks for replacing the computing frameworks for replacing computing resources of the existing datacenter based on the second set of data (step 4140). In some examples, the system identifies the one or more candidate computing frameworks from among a plurality of different cloud computing frameworks. For example, this may correspond to the Green Cloud Advisor system described above with reference to FIGS. 1-5 identifying one or more cloud computing frameworks as potential candidates for replacing computing resources of one or more existing datacenters based on one or more preferences specified by the user (e.g., preferred cloud computing framework location, quantity of computing resources to be migrated to the cloud, preferred CSP, etc.). In some examples, this may correspond to one or more processes performed by the data modelling engine and/or the sustainability analysis engine as described above with reference to FIGS. 1-3.

The system determines a second set of one or more measures for each candidate cloud computing framework identified based on the first and second sets of data (step 4150). In some implementations, the second set of one or more measures may include a measure of environmental sustainability associated with each candidate cloud computing framework. In some examples, this may correspond to one or more processes performed by the sustainability analysis engine as described above with reference to FIGS. 1 and 3.

The system presents data indicating at least a portion of the first set of one or more measures, data identifying characteristics of the one or more candidate cloud computing frameworks, and data indicating at least a portion of the second set of one or more measures (step 4160). In some implementations, the system may also present the aforementioned data through the user interface. In some examples, this may correspond to one or more processes performed by the sustainability recommendation engine as described above with reference to FIGS. 1 and 4. For example, the aforementioned data may correspond to data presented in one or more of the screens depicted in FIGS. 19-22C (e.g., "Sustainability Recommendation" screens) and/or FIGS. 22A-29C, 30-38, (e.g., "Simulate" and "Data Cards" screens). Furthermore, the data indicating at least a portion of the first set of one or more measures may also correspond to data presented in one or more of the screens depicted in FIGS. 16A-18 (e.g., "Sustainability Assessment" screens).

In some implementations, the first set of data may include data indicating a location of the existing datacenter, a rate at which the existing datacenter consumes energy, a rate at which a facility or building that houses the existing datacenter consumes energy, a Power Utilization Effectiveness (PUE) of the existing datacenter, an uninterruptible power source (UPS) load of the existing datacenter, an amount of energy generated onsite for the existing datacenter, a distribution of energy purchased for the existing datacenter, carbon offsets procured for the existing datacenter or an organization associated with the existing datacenter, contractual or financial agreements for purchasing green power for the existing datacenter, or a combination thereof. For example, such data may correspond to that which is specified by the user in one or more of the screens depicted in FIGS. 7-13E.

Furthermore, in some implementations, the second set of data may include data indicating a preferred location of the cloud computing framework, a preferred cloud service provider (CSP) for the cloud computing framework, a preferred quantity of computing resources of the existing datacenter that are to be replaced by the cloud computing framework, a preferred amount of time to migrate from the computing resources of the existing datacenter to the cloud computing framework, or a combination thereof. For example, such data may correspond to that which is specified by the user in one or more of the screens depicted in FIGS. 14A-15D.

In some examples, process 4100 may further include one or more steps in which the system presents, through the user interface, an interactive user interface comprising multiple questions and multiple user input elements for receiving answers to the multiple questions. In these examples, the first and second sets of data may include data indicating one or more answers received through one or more of the user input elements, respectively. For example, the interactive interface may correspond to the interactive interface shown in one or more of the screens depicted in FIGS. 7-15D (e.g., particularly FIGS. 12A-15D). Such screens include questionnaire screens and/or other screens with user input elements.

In at least some of these examples, process 4100 may further include one or more steps in which the system determines, based on the first set of data, that answers were received for a particular number of the questions, and select, from among multiple different mathematical models, a particular mathematical model based on the particular number of questions for which answers were received. In such examples, to identify the one or more candidate cloud computing frameworks (e.g., at step 4140) and determine the second set of one or more measures for each of the one or more candidate cloud computing frameworks identified (step 4150), the system may use the particular mathematical model to identify one or more candidate cloud computing frameworks for replacing the computing resources of the existing datacenter and use the particular mathematical model to determine a second set of one or more measures for each candidate cloud computing framework identified. For instance, the particular mathematical model may correspond to a model upon which the knowledge model described above with reference to FIGS. 1-4 is based. That is, the particular model may be leveraged by the data modelling engine to generate the knowledge model reflective of the data collected. Such additional steps may be beneficial when the user fails to provide all of the necessary information during the data collection process. In some examples, a higher fidelity mathematical model may be used in situations where the user provides at least a threshold amount of the necessary information during the data collection process, and lower fidelity mathematical model may be used in situations where the user provides less than the threshold amount of the necessary information during the data collection process.

In some implementations, to identify one or more candidate cloud computing frameworks for replacing the computing resources of the existing datacenter based at least in part on the second set of data (step 4140), the system may identify a plurality of candidate cloud computing frameworks for replacing the computing resources of the existing datacenter based at least in part on the second set of data. In some examples, the plurality of candidate cloud computing frameworks identified may include a first candidate cloud computing framework that is associated with a first cloud service provider (CSP) and a second candidate cloud computing framework that is associated with a second CSP, the second CSP being different from the first CSP. For example, this may correspond to the Green Cloud Advisor system of FIG. 1 identifying a cloud computing framework that is associated with CSP A as a candidate for replacing computing resources of the existing datacenter and a cloud computing framework that is associated with CSP C as a candidate for replacing computing resources of the existing datacenter (e.g., as is the case in the example of FIGS. 19-22C). For example, data generated in association with the one or more aforementioned steps may correspond to data presented in data presented in one or more of the screens depicted in FIGS. 19-22C. In some examples, process 4100 in these implementations may further include one or more steps in which the system generates a list of one or more locations, where each location included on the list is representative of a location of one or more of the plurality of candidate cloud computing frameworks identified. In these examples, to present, through the user interface, data identifying the one or more characteristics of each of the one or more candidate cloud computing frameworks (e.g., at step 4160), the system may present, through the user interface, data indicating the generated list of one or more locations. For example, this list may correspond to one or more of the lists that are presented in the bottom right corner of each of one or more of the screens depicted in FIGS. 25-28B. In at least some of the aforementioned examples, process 4100 may further include one or more steps in which the system receives, through the user interface, data indicating a selection of a particular location from the generated list of one or more locations, the particular location being representative of a location of a particular set of one or more of the plurality of candidate cloud computing frameworks identified, and presents additional data identifying one or more characteristics of each of the particular set of one or more candidate cloud computing frameworks through the user interface in response to receiving data indicating the selection of the particular location. For example, this may correspond to one or more actions that are performed by the system when the user selects an item on one or more of the lists that are presented in the bottom right corner of each of one or more of the screens depicted in FIGS. 25-28B.

In some of the aforementioned implementations, process 4100 may further include one or more steps in which the system ranks the plurality of candidate cloud computing frameworks based at least in part on the second set of one or more measures determined for each candidate cloud computing framework. In some examples, to present, through the user interface, data identifying the one or more characteristics of each of the one or more candidate cloud computing frameworks (e.g., at step 4160), in such implementations, the system may present, through the user interface, data identifying the one or more characteristics of each of the plurality of candidate cloud computing frameworks in an order based on ranking. For example, data generated in association with the one or more aforementioned steps may correspond to data presented in one or more of the screens depicted in FIGS. 21A-D (e.g., "Alternate Options" screens).

In other examples, process 4100 may further include one or more steps in which the system selects, from among the plurality of candidate cloud computing frameworks identified, a set of one or more of the plurality of the cloud computing frameworks based on the ranking. In these examples, to present, through the user interface, data identifying the one or more characteristics of each of the one or more identified candidate cloud computing frameworks and data indicating at least a portion of the second set of one or more measures determined for each candidate cloud computing framework (e.g., at step 4160), the system may present, through the user interface, data identifying one or more characteristics of each of the selected set of one or more of the plurality of candidate cloud computing frameworks and data indicating at least a portion of the second set of one or more measures determined for each candidate cloud computing framework in the selected set of one or more of the plurality of candidate cloud computing frameworks. For example, the data identifying one or more characteristics of each of the selected set of one or more of the plurality of candidate cloud computing frameworks may correspond to data presented in one or more of the screens depicted in FIGS. 19-22C. In some of these examples, to present, through the user interface, data identifying the one or more characteristics of each of the selected set of one or more of the plurality of candidate cloud computing frameworks (e.g., at step 4160), the system may present, through the user interface, data identifying the one or more characteristics of each of the selected set of one or more of the plurality of candidate cloud computing frameworks in an order based on ranking. For example, data generated in association with the one or more aforementioned steps may correspond to data presented in one or more of the screens depicted in FIGS. 21A-D (e.g., "Alternate Options" screens).

In some implementations, process 4100 may further include one or more steps in which the system may, for each of the one or more candidate cloud computing frameworks identified, compute a quantitative difference between the measure of environmental sustainability associated with the existing datacenter and the measure of environmental sustainability associated with the respective candidate cloud computing framework, and present data indicating the computed quantitative difference through the user interface. For example, the quantitative difference may correspond to one or more of the values determined by the sustainability analysis engine as described above with reference to FIGS. 1 and 3. In some examples, the data indicating the computed quantitative difference may correspond to data presented in one or more of the screens depicted in FIGS. 19-22C, 25-30.

In some examples, process 4100 may further include one or more steps in which the system may, for each of one or more measures included in the second set of one or more measures determined for each of the one or more candidate cloud computing frameworks identified, compute a quantitative difference between the respective measure included in the second set of one or more measures determined for the respective candidate cloud computing framework and a corresponding measure in the first set of one or more measures determined for the existing datacenter. In these examples, to present, through the user interface, data indicating at least a portion of the first set of one or more measures determined for the existing datacenter and data indicating at least a portion of the second set of one or more measures determined for each candidate cloud computing framework identified (e.g., at step 4160), the system may present, through the user interface, data indicating the computed quantitative differences between one or more measures included in the second set of one or more measures and one or more corresponding measures included in the first set of one or more measures, respectively. For example, the quantitative differences may correspond to one or more of the values determined by the sustainability analysis engine as described above with reference to FIGS. 1 and 3. In some examples, the data indicating the computed quantitative differences may correspond to data presented in one or more of the screens depicted in FIGS. 19-22C, 22A-29C.

In some examples, the first set of one or more measures determined for the existing datacenter further may include one or more measures of energy consumption associated with operating the existing datacenter, one or more measures of carbon emissions associated with operating the existing datacenter, one or more costs associated with operating the existing datacenter, or a combination thereof. For example, these measures may correspond to one or more of the values determined by the sustainability analysis engine and/or the sustainability recommendation engine as described above with reference to FIGS. 1 and 3-4. In some examples, the second set of one or more measures determined for each candidate cloud computing framework identified may further include one or more measures of energy consumption associated with operating the respective candidate cloud computing framework, one or more measures of carbon emissions associated with operating the respective candidate cloud computing framework, one or more costs associated with operating the respective candidate cloud computing framework, or a combination thereof. For example, these measures may correspond to one or more of the values determined by the sustainability analysis engine and/or the sustainability recommendation engine as described above with reference to FIGS. 1 and 3-4.

In some examples, process 4100 may further include one or more steps in which the system may identify, based on the first set of data, an additional set of data associated with a location of the existing datacenter. In such examples, to determine the first set of one or more measures for the existing datacenter based at least in part on the first set of data (e.g., at step 4130), the system may determine a first set of one or more measures for the existing datacenter based at least in part on the first set of data and further on the additional set of data associated with the location of existing datacenter. For example, this may correspond to the data modelling engine as described above with reference to FIGS. 1-2 obtaining data representing one or more of the industry standard inputs, public cloud hosting detail, and CSP benchmarks. In some such examples, the additional set of data associated with the location of existing datacenter includes data indicating one or more economic incentive programs for reducing carbon emissions for which the existing datacenter is eligible, carbon taxes associated with the location of the existing datacenter, current emission factors of the location of the existing datacenter, future greenness aspirations of one or more governing bodies associated with the location of the existing datacenter, a level of readiness of one or more governing bodies associated with the location of the existing datacenter to transition to green energy, or a combination thereof.

In some examples, to determine the second set of one or more measures for each candidate cloud computing framework identified based at least in part on the first and second sets of data (e.g., at step 4150), the system may determine a second set of one or more measures for each candidate cloud computing framework identified based at least in part on the first and second sets of data and further on an additional set of data associated with the respective candidate cloud computing framework. In such examples, the additional set of data associated with the respective candidate cloud computing framework may include data indicating one or more economic incentive programs for reducing carbon emissions for which the respective candidate cloud computing framework is eligible, carbon taxes associated with a location of the respective candidate cloud computing framework, current emission factors of the location of the respective candidate cloud computing framework, future greenness aspirations of one or more governing bodies associated with the location of the respective candidate cloud computing framework, a level of readiness of one or more governing bodies associated with the location of the respective candidate cloud computing framework to transition to green energy, a level of sustainability associated with a cloud service provider (CSP) associated with the respective candidate cloud computing framework, or a combination thereof. For example, this may correspond to the data modelling engine as described above with reference to FIGS. 1-2 obtaining data representing one or more of the industry standard inputs, public cloud hosting detail, and CSP benchmarks. Additionally or alternatively, this may correspond to the sustainability recommendation engine as described above with reference to FIGS. 1 and 4 obtaining data from one or both of the input data repository and the sustainability assessment repository and/or generating data associated with one or more recommendations.

In some examples, to present, through the user interface, data indicating the computed quantitative differences between one or more measures included in the second set of one or more measures and one or more corresponding measures included in the first set of one or more measures (e.g., at step 4160), respectively, the system may, for each of the one or more candidate cloud computing frameworks identified, present, through the user interface, data indicating one or more of an estimated reduction in energy consumption achievable by replacing the computing resources of the existing datacenter with the respective candidate cloud computing framework, an estimated reduction in carbon emissions achievable by replacing the computing resources of the existing datacenter with the respective candidate cloud computing framework, and an estimated reduction in operating costs achievable by replacing the computing resources of the existing datacenter with the respective candidate cloud computing framework. For example, the aforementioned data that is presented through the user interface may correspond to data presented in one or more of the screens depicted in FIGS. 19-23, 25-30. In some examples, some or all of the aforementioned data may correspond to that having been generated by the sustainability recommendation engine as described above with reference to FIGS. 1 and 4.

In some implementations, the computing resources of the existing datacenter host a particular set of data, applications, and workloads. In these implementations, to identify one or more candidate cloud computing frameworks for replacing the computing resources of the existing datacenter based at least in part on the second set of data (step 4140), the system may identify, based at least in part on the second set of data, one or more candidate cloud computing frameworks that are each capable of hosting the particular set of data, applications, and workloads.

In some implementations, to present, through the user interface, data identifying the one or more characteristics of each of the one or more candidate cloud computing frameworks (e.g., at step 4160), the system may, for each of the one or more candidate cloud computing frameworks identified, present, through the user interface, data identifying the one or more characteristics of each of the respective candidate cloud computing framework as a recommended cloud computing framework for replacing the computing resources of the existing datacenter. For example, data generated in association with the one or more aforementioned steps may correspond to data presented in one or more of the screens depicted in FIGS. 19-22C (e.g., "Sustainability Recommendation" screens).

In some examples, to present, through the user interface, data indicating at least a portion of the first set of one or more measures determined for the existing datacenter and data indicating at least a portion of the second set of one or more measures determined for each candidate cloud computing framework (e.g., at step 4160), the system may, for each of the one or more candidate cloud computing frameworks identified, present, through the user interface, data representing a comparison of at least a portion of the first set of one or more measures determined for the existing datacenter and at least a portion of the second set of one or more measures determined for the respective candidate cloud computing framework. For example, data generated in association with the one or more aforementioned steps may correspond to data presented in one or more of the screens depicted in FIGS. 19-23, 25-40 (e.g., "Sustainability Recommendation," "Simulate," and "Data Cards" screens).

In some implementations, to present, through the user interface, data identifying the one or more characteristics of each of the one or more candidate cloud computing frameworks (step 4160), the system may, for each of the one or more candidate cloud computing frameworks identified, present, through the user interface, data identifying one or both of a location of the respective candidate cloud computing framework and a cloud service provider (CSP) associated with the respective candidate cloud computing framework. In some implementations, the measure of environmental sustainability associated with the existing datacenter may be indicative of one or both of an estimation of the existing datacenter's current carbon emissions and one or more measures of greenness with a location of the existing datacenter, and the measure of environmental sustainability associated with the respective candidate cloud computing framework may be indicative of one or both of an estimation of the respective candidate cloud computing framework's expected carbon emissions and one or more measures of greenness associated with a location of the respective candidate cloud computing framework. In some examples, the location of the respective candidate cloud computing framework may correspond to one or more of a city or town within which the respective candidate cloud computing framework is located, a state or province within which the respective candidate cloud computing framework is located, and a country within which the respective candidate cloud computing framework is located. Furthermore, in some examples, the location of the existing datacenter may correspond to one or more of a city or town within which the existing datacenter is located, a state or province within which the existing datacenter is located, and a country within which the existing datacenter is located.

In some implementations, to identify, from among the plurality of different cloud computing frameworks, the one or more candidate cloud computing frameworks for replacing the computing resources of the existing datacenter based at least in part on the second set of data (e.g., at step 4140), the system may identify, from among a plurality of cloud computing frameworks having different characteristics, one or more candidate cloud computing frameworks having the one or more preferred characteristics indicated by the second set of data. In at least some of these implementations, the plurality of cloud computing frameworks having different characteristics may include two or more cloud computing frameworks that are associated with two or more different cloud service providers (CSPs), respectively.

In some situations, for some or all of the implementations and examples described above with reference to process 4100, to receive, through the user interface, (i) the first set of data indicating one or more characteristics of the existing datacenter (e.g., at step 4110), the system may receive, through a user interface, (i) a first set of data indicating one or more characteristics of each of a plurality of existing datacenters. Furthermore, in such situations, to identify, from among the plurality of different cloud computing frameworks, the one or more candidate cloud computing frameworks for replacing the computing resources of the existing datacenter based at least in part on the second set of data (e.g., at step 4140), the system may identify, from among a plurality of different cloud computing frameworks, one or more candidate cloud computing frameworks for replacing computing resources of the plurality of existing datacenters based at least in part on the second set of data. In at least some such situations, to receive, through the user interface, (ii) the second set of data indicating one or more preferred characteristics of the cloud computing framework for replacing computing resources of the existing datacenter (e.g., at step 4120), the system may receive, through a user interface, (ii) a second set of data indicating one or more preferred characteristics of each of a plurality of cloud computing frameworks for replacing computing resources of each of the plurality of existing datacenters, respectively.

In some situations, for some or all of the implementations and examples described above with reference to process 4100, the user interface may be a graphical user interface that is presented on a display of a computing device. For example, the computing device may correspond to a desktop computer, a laptop computer, a mobile phone, or a tablet computing device. Such a computing device may be operated by the user of the system.

FIG. 40 is another example process 4200 for generating customized recommendations for environmentally-conscious cloud computing frameworks for replacing computing resources of existing datacenters. Process 4200 includes one or more steps in which the system uses the first and second sets of data described above with reference to FIG. 39 to perform a simulation in which the respective candidate cloud computing framework is deployed as a replacement for the computing resources of the existing datacenter. In these implementations, to determine the measure of environmental sustainability associated with each candidate cloud computing framework the system may determine a measure of environmental sustainability associated with each respective candidate cloud computing framework based at least in part on the simulation. In some examples, this may correspond to one or more processes performed by the simulation engine as described above with reference to FIG. 5. For example, data generated in association with these one or more steps may correspond to data presented in one or more of the screens depicted in FIGS. 22A-29C and/or 30-38, (e.g., "Simulate" screens).

Data representing an existing datacenter is received by the system including a first set of one or more measures including a first measure of environmental sustainability associated with the existing datacenter based in part on a first set of data indicating one or more characteristics of an existing datacenter (4210). In some examples, this may correspond to one or more processes performed by the sustainability analysis engine as described above with reference to FIGS. 1 and 3.

Data representing a plurality of candidate cloud computing frameworks for replacing computing resources of the existing datacenter is received by the system including a second set of one or more measures including a second measure of environmental sustainability associated with each of the plurality of candidate cloud computing frameworks based on a second set of data indicating one or more preferred characteristics of a cloud computing framework for replacing computing resources of the existing datacenter (4220). In some examples, this may correspond to one or more processes performed by the sustainability analysis engine as described above with reference to FIGS. 1 and 3.

The system determines, from the plurality of candidate cloud computing frameworks for replacing computing resources of the existing datacenter, a subset of candidate cloud computing frameworks for presentation in a user interface (4230). In some examples, the system ranks the plurality of candidate cloud computing frameworks based at least in part on the second set of one or more measures determined for each candidate cloud computing framework. In some examples, to present, through the user interface, data identifying the one or more characteristics of each of the one or more candidate cloud computing frameworks, in such implementations, the system may present, through the user interface, data identifying the one or more characteristics of each of the plurality of candidate cloud computing frameworks in an order based on ranking. For example, data generated in association with these one or more steps may correspond to data presented in one or more of the screens depicted in FIGS. 22A-29C and/or 30-38 (e.g., "Simulate" screens).

The system generates, for presentation in the user interface, a visualization of the existing datacenter and the subset of candidate cloud computing frameworks and a dashboard with one or more graphical representations of the first set of one or more measures and the respective second set of one or more measures determined for each of the subset of candidate cloud computing frameworks (4240). For example, the visualization and dashboard may correspond to user interface elements presented in one or more of the screens depicted in FIGS. 22A-29C and/or 30-38 (e.g., "Simulate" screens). That is, in some examples, the visualization and dashboard may correspond to that which is managed by the simulation engine as described above with reference to FIGS. 1 and 5.

The system presents, through the user interface, the visualization of the existing datacenter and each of the subset of candidate cloud computing frameworks and the dashboard with one or more graphical representations of the first set of one or more measures and the respective second set of one or more measures determined for each of the subset of candidate cloud computing frameworks (4260).

As depicted in FIGS. 22A-29C and/or 30-38, the graphical user interface may provide the user with one or more visualizations and a dashboard to communicate the various pros and cons of the one or more cloud computing frameworks evaluated by the user. Furthermore, as depicted in FIGS. 22A-29C and/or 30-38, the graphical user interface may include several user input elements that allow the user to specify and adjust various parameters of the simulation (e.g., selected datacenter, preferred cloud service provider, preferred location of cloud computing framework, etc.).

In some examples, process 4200 may further include one or more steps in which the system receives, through the user interface, a third set of data indicating one or both of an updated set of one or more characteristics of the existing datacenter and an updated set of one or more preferred characteristics of a cloud computing framework for replacing computing resources of the existing datacenter and, in response to receiving the third set of data, an updated version of one or both of the visualization and the dashboard through the user interface. For example, the updated version of the visualization and/or dashboard may correspond to user interface elements presented in one or more of the screens depicted in FIGS. 22A-29C and/or 30-38, (e.g., "Simulate" screens). In some examples, the visualization of the existing datacenter and the one or more candidate cloud computing frameworks may include geographical representations of a location of the existing datacenter and a location of each the one or more candidate cloud computing frameworks. For example, the visualization may correspond to user interface elements presented in one or more of the screens depicted in FIGS. 23-40 (e.g., "Simulate" screens).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

In this specification, the term "database" and "repository" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
  receiving, through a user interface, (i) a first set of data indicating one or more characteristics of an existing datacenter, and (ii) a second set of data indicating one or more preferred characteristics of a cloud computing framework for replacing computing resources of the existing datacenter;
  generating, from (i) the first set of data and (ii) the second set of data, a knowledge model;
  identifying, by the knowledge model, one or more candidate cloud computing frameworks for replacing computing resources of the existing datacenter from among a plurality of different cloud computing frameworks, wherein identifying the one or more candidate cloud computing frameworks comprises determining, by the knowledge model, (iii) an estimated energy reduction at each of one or more candidate cloud computing frameworks by replacing computing resources of the existing datacenter and (iv) an estimated consumption/reduction in carbon emissions at each of the one or more candidate cloud computing frameworks by replacing computing resources of the existing datacenter;

generating, for presentation through the user interface, a sustainability recommendation for replacing computing resources of the existing datacenter with one or more candidate cloud computing frameworks based on (iii) the estimated energy reduction at each of one or more candidate cloud computing frameworks and (iv) the estimated consumption/reduction in carbon emissions at each of the one or more candidate cloud computing frameworks; and replacing computing resources of the existing datacenter with one or more cloud computing frameworks, from among the plurality of different cloud computing frameworks, based on the sustainability recommendation.

2. The method of claim 1, wherein determining, by the knowledge model, (iii) the estimated energy reduction at each of one or more candidate cloud computing frameworks by replacing computing resources of the existing datacenter and (iv) the estimated consumption/reduction in carbon emissions at each of the one or more candidate cloud computing frameworks by replacing computing resources of the existing datacenter comprises:

determining, by the knowledge model, (i) an estimated amount of energy consumed at one or more existing datacenters, (ii) an estimated amount of emissions generated at one or more existing datacenters, (iii) an estimated energy reduction at each of one or more candidate cloud computing frameworks, and (iv) an estimated reduction in an amount of emissions at each of the one or more candidate cloud computing frameworks.

3. The method of claim 2, wherein determining the estimated energy reduction at each of one or more candidate cloud computing frameworks by replacing computing resources of the existing datacenter comprises a quantitative difference between (i) the estimated amount of energy consumed at one or more existing datacenters and (iii) the estimated energy reduction at each of one or more candidate cloud computing frameworks.

4. The method of claim 2, wherein determining the estimated consumption/reduction in carbon emissions at each of the one or more candidate cloud computing frameworks by replacing computing resources of the existing datacenter comprises a quantitative difference between (ii) an estimated amount of emissions generated at one or more existing datacenters and (iv) the estimated reduction in the amount of emissions at each of the one or more candidate cloud computing frameworks.

5. The method of claim 1, wherein generating the sustainability recommendation for replacing computing resources of the existing datacenter with one or more candidate cloud computing frameworks further comprises:

determining one or more of a CO2 reductions savings calculation, a CO2 cost analysis, and a carbon footprint calculation; and determining an economic incentive based on one or more of the determined CO2 reductions savings calculation, CO2 cost analysis, and carbon footprint calculation.

6. The method of claim 1, wherein generating the sustainability recommendation for replacing computing resources of the existing datacenter with one or more candidate cloud computing frameworks further comprises:

determining the sustainability recommendation based on country greenness data, average carbon footprint reduction data, and economic incentive data.

7. The method of claim 1, wherein the sustainability recommendation for replacing computing resources of the existing datacenter with one or more candidate cloud computing frameworks comprises i) new datacenter location advisory information, sustainability index information, and CO2 reduction/savings information.

8. The method of claim 7, further comprising:

determining, from the datacenter location advisory information, a proper subset that are top ranked as sustainable of the one or more candidate cloud computing frameworks for replacing computing resources of the existing datacenter.

9. The method of claim 7, further comprising:

determining, from the sustainability index information, a sustainability index value comprising a measure of improvement in environmental sustainability achievable by replacing computing resources of the existing datacenter with the one or more candidate cloud computing frameworks.

10. One or more non-transitory computer-readable storage media encoded with instructions that, when executed by one or more computers, cause the one or more computers to perform operations comprising:

receiving, through a user interface, (i) a first set of data indicating one or more characteristics of an existing datacenter, and (ii) a second set of data indicating one or more preferred characteristics of a cloud computing framework for replacing computing resources of the existing datacenter;

generating, from (i) the first set of data and (ii) the second set of data, a knowledge model;

identifying, by the knowledge model, one or more candidate cloud computing frameworks for replacing computing resources of the existing datacenter from among a plurality of different cloud computing frameworks, wherein identifying the one or more candidate cloud computing frameworks comprises determining, by the knowledge model, (iii) an estimated energy reduction at each of one or more candidate cloud computing frameworks by replacing computing resources of the existing datacenter and (iv) an estimated consumption/reduction in carbon emissions at each of the one or more candidate cloud computing frameworks by replacing computing resources of the existing datacenter;

generating, for presentation through the user interface, a sustainability recommendation for replacing computing resources of the existing datacenter with one or more candidate cloud computing frameworks based on (iii) the estimated energy reduction at each of one or more candidate cloud computing frameworks and (iv) the estimated consumption/reduction in carbon emissions at each of the one or more candidate cloud computing frameworks; and replacing computing resources of the existing datacenter with one or more cloud computing frameworks from among the plurality of different cloud computing frameworks, based on the sustainability recommendation.

11. The computer-readable storage media of claim 10, wherein determining, by the knowledge model, (iii) the estimated energy reduction at each of one or more candidate cloud computing frameworks by replacing computing resources of the existing datacenter and (iv) the estimated consumption/reduction in carbon emissions at each of the one or more candidate cloud computing frameworks by replacing computing resources of the existing datacenter comprises:

determining, by the knowledge model, (i) an estimated amount of energy consumed at one or more existing datacenters, (ii) an estimated amount of emissions generated at one or more existing datacenters, (iii) an estimated energy reduction at each of one or more candidate cloud computing frameworks, and (iv) an estimated reduction in an amount of emissions at each of the one or more candidate cloud computing frameworks.

12. The computer-readable storage media of claim 11, wherein determining the estimated energy reduction at each of one or more candidate cloud computing frameworks by replacing computing resources of the existing datacenter comprises a quantitative difference between (i) the estimated amount of energy consumed at one or more existing datacenters and (iii) the estimated energy reduction at each of one or more candidate cloud computing frameworks.

13. The computer-readable storage media of claim 11, wherein determining the estimated consumption/reduction in carbon emissions at each of the one or more candidate cloud computing frameworks by replacing computing resources of the existing datacenter comprises a quantitative difference between (ii) an estimated amount of emissions generated at one or more existing datacenters and (iv) the estimated reduction in the amount of emissions at each of the one or more candidate cloud computing frameworks.

14. The computer-readable storage media of claim 10, wherein generating the sustainability recommendation for replacing computing resources of the existing datacenter with one or more candidate cloud computing frameworks further comprises:

determining one or more of a $CO_2$ reductions savings calculation, a $CO_2$ cost analysis, and a carbon footprint calculation; and determining an economic incentive based on one or more of the determined $CO_2$ reductions savings calculation, $CO_2$ cost analysis, and carbon footprint calculation.

15. The computer-readable storage media of claim 10, wherein generating the sustainability recommendation for replacing computing resources of the existing datacenter with one or more candidate cloud computing frameworks further comprises:

determining the sustainability recommendation based on country greenness data, average carbon footprint reduction data, and economic incentive data.

16. The computer-readable storage media of claim 10, wherein the sustainability recommendation for replacing computing resources of the existing datacenter with one or more candidate cloud computing frameworks comprises i) new datacenter location advisory information, sustainability index information, and $CO_2$ reduction/savings information.

17. The computer-readable storage media of claim 16, further comprising:

determining, from the datacenter location advisory information, a proper subset that are top ranked as sustainable of the one or more candidate cloud computing frameworks for replacing computing resources of the existing datacenter.

18. The computer-readable storage media of claim 16, further comprising:

determining, from the sustainability index information, a sustainability index value comprising a measure of improvement in environmental sustainability achievable by replacing computing resources of the existing datacenter with the one or more candidate cloud computing frameworks.

\* \* \* \* \*

UNITED STATES PATENT AND TRADEMARK OFFICE
CERTIFICATE OF CORRECTION

PATENT NO. : 11,693,705 B2  
APPLICATION NO. : 17/665065  
DATED : July 4, 2023  
INVENTOR(S) : Vibhu Sharma et al.

Page 1 of 1

It is certified that error appears in the above-identified patent and that said Letters Patent is hereby corrected as shown below:

In the Claims

In Claim 1, Column 33, Line 14, delete "frameworks," and insert -- frameworks --.

Signed and Sealed this  
Fifteenth Day of August, 2023

Katherine Kelly Vidal  
*Director of the United States Patent and Trademark Office*